(12) United States Patent
Liu et al.

(10) Patent No.: US 11,531,223 B2
(45) Date of Patent: Dec. 20, 2022

(54) LIQUID CRYSTAL DEVICE INCLUDING INSULATING FILM, LIGHT CONTROL WINDOW AND PRODUCTION METHOD

(71) Applicant: JNC CORPORATION, Tokyo (JP)

(72) Inventors: Chien Cheng Liu, Tainan (TW); Yi Cheng Lan, Tainan (TW); Yi Pin Lee, Tainan (TW); Ren Lung Chen, Tainan (TW); Kuie Hua Hsieh, Tainan (TW); Chun Hung Chiang, Tainan (TW); Hiroaki Fujita, Chiba (JP)

(73) Assignee: JNC CORPORATION, Tokyo (JP)

( * ) Notice: Subject to any disclaimer, the term of this patent is extended or adjusted under 35 U.S.C. 154(b) by 351 days.

(21) Appl. No.: 16/432,948

(22) Filed: Jun. 6, 2019

(65) Prior Publication Data

US 2019/0377218 A1    Dec. 12, 2019

(30) Foreign Application Priority Data

Jun. 8, 2018 (JP) .............................. JP2018-110147

(51) Int. Cl.
*G02F 1/1333* (2006.01)
*G02F 1/1341* (2006.01)
(Continued)

(52) U.S. Cl.
CPC .... *G02F 1/133345* (2013.01); *C09K 19/3001* (2013.01); *C09K 19/3003* (2013.01);
(Continued)

(58) Field of Classification Search
CPC ............. G02F 1/133345; G02F 1/1341; G02F 1/1334; G02F 1/13347; G02F 1/13415; G02F 2202/023; H01B 3/422; C09K 19/3001; C09K 19/3003; C09K 19/3059; C09K 19/3402; C09K 19/542; C09K 19/56; C09K 2019/3422; C09K 2019/548; C09K 2019/301; C09K 2019/3016; C09K 2019/3009; C09K 2019/0448;
(Continued)

(56) References Cited

U.S. PATENT DOCUMENTS 5,866,034 A * 2/1999 Han ........................ C08L 79/08
                                                     252/299.4
2002/0180007 A1* 12/2002 Lin ..................... H01L 23/4951
                                                       257/666
(Continued)

FOREIGN PATENT DOCUMENTS

JP    H06273725    9/1994
JP    H09291150    11/1997
(Continued)

*Primary Examiner* — Sophie Hon
(74) *Attorney, Agent, or Firm* — JCIPRNET

(57) ABSTRACT

To prevent arcing discharge of a liquid crystal device. Provided is a liquid crystal device including a liquid crystal layer, a first substrate, a second substrate and an insulating film, wherein the liquid crystal layer is arranged between the first substrate and the second substrate, the first substrate includes electrode 1, the second substrate includes electrode 2, the insulating film is arranged between electrode 1 and electrode 2, and the insulating film is a cured product of a thermosetting polymer composition.

18 Claims, 1 Drawing Sheet

(51) Int. Cl.
*H01B 3/42* (2006.01)
*C09K 19/30* (2006.01)
*C09K 19/34* (2006.01)
*C09K 19/54* (2006.01)
*G02F 1/1334* (2006.01)

(52) U.S. Cl.
CPC ........ C09K 19/3402 (2013.01); C09K 19/542 (2013.01); G02F 1/1334 (2013.01); G02F 1/1341 (2013.01); H01B 3/422 (2013.01); *C09K 2019/301* (2013.01); *C09K 2019/3009* (2013.01); *C09K 2019/3016* (2013.01); *C09K 2019/3422* (2013.01); *C09K 2019/548* (2013.01); *C09K 2323/055* (2020.08); *C09K 2323/057* (2020.08); *G02F 1/13347* (2021.01); *G02F 1/13415* (2021.01)

(58) Field of Classification Search
CPC .... C09K 2019/2078; C09K 2019/2035; C09K 2019/3063; C09K 2323/055; C09K 2323/057
See application file for complete search history.

(56) References Cited

U.S. PATENT DOCUMENTS

| | | | |
|---|---|---|---|
| 2005/0110938 A1* | 5/2005 | Wu | G02F 1/133305 349/158 |
| 2005/0116200 A1* | 6/2005 | Nakanishi | G02F 1/133788 252/299.01 |
| 2006/0134348 A1* | 6/2006 | Momoi | G02F 1/133711 428/1.1 |
| 2008/0003381 A1* | 1/2008 | Satou | C08G 73/16 428/1.1 |
| 2010/0132989 A1* | 6/2010 | Fujihara | C08G 73/1035 174/258 |

FOREIGN PATENT DOCUMENTS

| | | | | |
|---|---|---|---|---|
| JP | 2005105264 | | 4/2005 | |
| JP | 2005105264 A | * | 4/2005 | |
| JP | 2006282995 | | 10/2006 | |
| JP | 2015081336 A | * | 4/2015 | |
| JP | 2016103010 A | * | 6/2016 | G03F 7/004 |
| JP | 2017078856 A | * | 4/2017 | G02B 1/14 |
| WO | 2011096386 | | 8/2011 | |

* cited by examiner

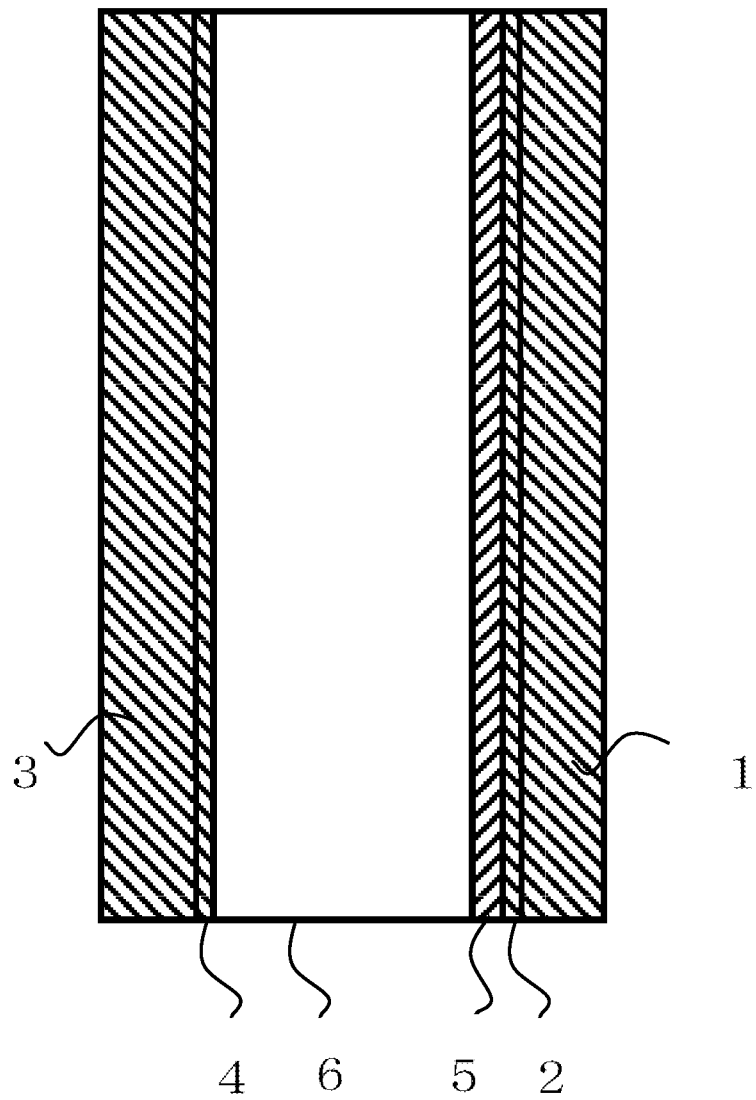

LIQUID CRYSTAL DEVICE INCLUDING INSULATING FILM, LIGHT CONTROL WINDOW AND PRODUCTION METHOD

CROSS-REFERENCE TO RELATED APPLICATIONS

This application claims the priority benefits of Japanese application serial no. 2018-110147, filed on Jun. 8, 2018. The entirety of the above-mentioned patent application is hereby incorporated by reference herein and made a part of this specification.

TECHNICAL FIELD

The invention relates to a liquid crystal device using an insulating film.

BACKGROUND ART

A light control window is a liquid crystal device capable of controlling light by controlling light scattering in a liquid crystal layer. The light control window is used for a building material such as window glass and a partition of a room, an on-vehicle component, and so forth. A hard material and also a soft material such as a plastic film are used for a substrate of the light control window. Light is controlled by adjusting a voltage applied to a liquid crystal composition in the liquid crystal layer interposed between the substrates to change arrangement of molecules of the liquid crystal compound to control light scattering. The light control window is also called a display, an optical shutter, a smart window or the like (Patent literature Nos. 1 and 2).

A polymer-dispersed light control window is a light control window in which a polymer and a liquid crystal composition are present in the liquid crystal layer and the liquid crystal composition is discontinuously dispersed in the polymer. A polymer-network light control window also exists.

In the light control windows of both types, the device is easily produced and a film thickness is easily controlled over a wide area, and therefore the device having a large screen can be prepared. The light control windows of both types do not require a polarizing plate, and therefore light is easily transmitted. The light control windows of both types have a large viewing angle. The light control windows of both types are expected to be applied to light control glass, a projection display, a large-area display and so forth.

A liquid crystal device in which a polymer-network structure and a polymer-dispersed structure are mixed in a liquid crystal layer also exists.

Table 1 describes a relationship of characteristics of the liquid crystal composition in the liquid crystal layer in the liquid crystal device.

Examples of utilizing an insulating film as a color filter protective film of a color liquid crystal display device are disclosed (Patent literature Nos. 3, 4 and 5).

CITATION LIST

Patent Literature

Patent literature No. 1: JP H06-273725 A
Patent literature No. 2: WO 2011/96386 A
Patent literature No. 3: JP H9-291150 A
Patent literature No. 4: JP 2005-105264 A
Patent literature No. 5: JP 2006-282995 A

SUMMARY OF INVENTION

A light control window having a liquid crystal layer utilizes a higher driving voltage in comparison with a liquid crystal display, and therefore arcing is easily generated. Arcing causes destruction of a liquid crystal device of the light control window to damage design or the like.

The invention prevents destruction of the liquid crystal device caused by arcing.

A $1^{st}$ aspect of the invention includes a liquid crystal device including a liquid crystal layer, a first substrate, a second substrate and an insulating film, wherein the liquid crystal layer is arranged between the first substrate and the second substrate, the first substrate includes electrode 1, the second substrate includes electrode 2, the insulating film is arranged between electrode 1 and electrode 2, and the insulating film is a cured product of a thermosetting polymer composition.

A $2^{nd}$ aspect of the invention includes the liquid crystal device according to the $1^{st}$ aspect, wherein the insulating film is in contact with electrode 1.

A $3^{rd}$ aspect of the invention includes the liquid crystal device according to the $2^{nd}$ aspect, wherein the insulating film is in contact with electrode 2.

A $4^{th}$ aspect of the invention includes the liquid crystal device according to any one of the $1^{st}$ to $3^{rd}$ aspects, wherein the liquid crystal layer includes a liquid crystal composition and a polymer.

A $5^{th}$ aspect of the invention includes the liquid crystal device according to any one of the $1^{st}$ to $4^{th}$ aspects, wherein the thermosetting polymer composition is a composition containing polyester amide acid obtained by allowing a mixture of tetracarboxylic dianhydride, diamine and a polyhydroxy compound to react, an epoxy compound, an epoxy curing agent and a solvent, and an insulating film is obtained by (a) applying a thermosetting polymer composition to a substrate, and (b) heating the resulting material.

A $6^{th}$ aspect of the invention includes the liquid crystal device according to the $5^{th}$ aspect, wherein the thermosetting polymer composition satisfies expressions: $0.2 \leq Z/Y \leq 8$ and $0.2 \leq (Y+Z)/X \leq 5$, in which X represents a molar concentration of tetracarboxylic dianhydride, Y represents a molar concentration of diamine and Z represents a molar concentration of a polyhydroxy compound, and an epoxy compound is contained in 20 to 400 parts by weight based on 100 parts by weight of polyester amide acid.

A $7^{th}$ aspect of the invention includes the liquid crystal device according to the $5^{th}$ or $6^{th}$ aspect, wherein a compound having a constitutional unit represented by formula (1) or (2) is a thermosetting polymer composition.

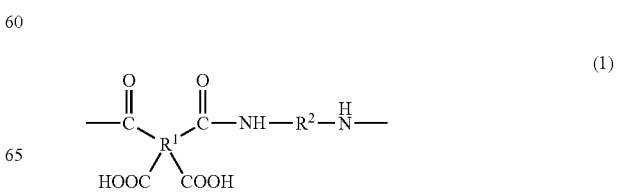

(1)

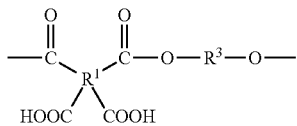
(2)

In formulas (1) and (2), $R^1$ is a residue obtained by eliminating two pieces of —CO—O—CO— from tetracarboxylic dianhydride, and in formula (1), $R^2$ is a residue obtained by eliminating two pieces of —NH$_2$ from diamine, and in formula (2), $R^3$ is a residue obtained by eliminating two pieces of —OH from a polyhydroxy compound.

An 8th aspect of the invention includes the liquid crystal device according to the 7th aspect, wherein tetracarboxylic dianhydride is one or more kinds of compounds selected from 3,3',4,4'-diphenyl ether tetracarboxylic dianhydride, 3,3',4,4'-diphenylsulfone tetracarboxylic dianhydride and 1,2,3,4-butanetetracarboxylic dianhydride.

A 9th aspect of the invention includes the liquid crystal device according to the 7th aspect, wherein diamine is one or more kinds of compounds selected from 3,3'-diaminodiphenyl sulfone and bis(4-(3-aminophenoxy)phenylsulfone.

A 10th aspect of the invention includes the liquid crystal device according to the 7th aspect, wherein the polyhydroxy compound is one or more kinds of compounds selected from diethylene glycol, triethylene glycol, 1,4-butanediol, 1,5-pentanediol, 1,6-hexanediol, 2-hydroxybenzyl alcohol, 4-hydroxybenzyl alcohol, 4,4'-isopropylidene bis(2-phenoxyethanol), 2-(4-hydroxyphenyl)ethanol, a (meth)acrylic acid-modified product of ethylene glycol diglycidyl ether, a (meth)acrylic acid-modified product of propylene glycol diglycidyl ether, a (meth)acrylic acid-modified product of tripropylene glycol diglycidyl ether, a (meth)acrylic acid-modified product of glycerol diglycidyl ether, a (meth)acrylic acid-modified product of bisphenol A diglycidyl ether and a (meth)acrylic acid-modified product of propylene oxide-modified bisphenol A diglycidyl ether.

An 11th aspect of the invention includes the liquid crystal device according to any one of the 1st to 10th aspects, wherein the liquid crystal layer includes compound (3) represented by formula (3), and is positive in dielectric anisotropy.

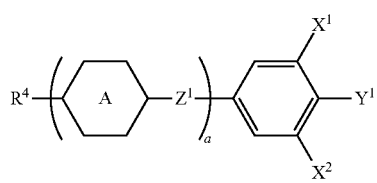
(3)

In formula (3),
ring A is 1,4-cyclohexylene, 1,4-phenylene, 2-fluoro-1,4-phenylene, 2,3-difluoro-1,4-phenylene, 2,6-difluoro-1,4-phenylene, pyrimidine-2,5-diyl, 1,3-dioxane-2,5-diyl or tetrahydropyran-2,5-diyl, $Z^1$ is a single bond, ethylene, carbonyloxy or difluoromethyleneoxy, $R^4$ is alkyl having 1 to 12 carbons, alkoxy having 1 to 12 carbons or alkenyl having 2 to 12 carbons, $X^1$ and $X^2$ are independently hydrogen or fluorine, $Y^1$ is fluorine, chlorine, cyano, alkyl having 1 to 12 carbons in which at least one hydrogen is replaced by fluorine or chlorine, alkoxy having 1 to 12 carbons in which at least one hydrogen is replaced by fluorine or chlorine, or alkenyloxy having 2 to 12 carbons in which at least one hydrogen is replaced by fluorine or chlorine, and a is 1, 2, 3 or 4.

A 12th aspect of the invention includes the liquid crystal device according to any one of the 1st to 10th aspects, wherein the liquid crystal layer includes compound (4) represented by formula (4), and is negative in dielectric anisotropy.

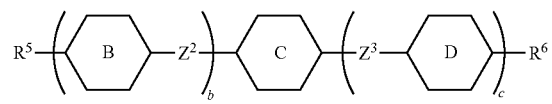
(4)

In formula (4),
ring B and ring D are independently 1,4-cyclohexylene, 1,4-cyclohexenylene, tetrahydropyran-2,5-diyl, 1,4-phenylene, 1,4-phenylene in which at least one hydrogen is replaced by fluorine or chlorine, naphthalene-2,6-diyl, naphthalene-2,6-diyl in which at least one hydrogen is replaced by fluorine or chlorine, chroman-2,6-diyl, or chroman-2,6-diyl in which at least one hydrogen is replaced by fluorine or chlorine, ring C is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl, $Z^2$ and $Z^3$ are independently a single bond, ethylene, carbonyloxy or methyleneoxy, $R^5$ and $R^6$ are independently alkyl having 1 to 12 carbons, alkoxy having 1 to 12 carbons or alkenyl having 2 to 12 carbons, b is 1, 2 or 3,
c is 0 or 1, and
a sum of b and c is 3 or less.

A 13th aspect includes the liquid crystal device according to any one of the 1st to 12th aspects, wherein the liquid crystal layer includes compound (5) represented by formula (5).

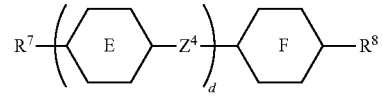
(5)

In formula (5),
ring E and ring F are independently 1,4-cyclohexylene, 1,4-phenylene, 2-fluoro-1,4-phenylene, 2,5-difluoro-1,4-phenylene or pyrimidine-2,5-diyl, $Z^4$ is a single bond, ethylene or carbonyloxy, $R^7$ and $R^8$ are independently alkyl having 1 to 12 carbons, alkoxy having 1 to 12 carbons, alkenyl having 2 to 12 carbons, or alkenyl having 2 to 12 carbons in which at least one hydrogen is replaced by fluorine or chlorine, and d is 1, 2 or 3.

A 14th aspect of the invention includes the liquid crystal device according to any one of the 1st to 13th aspects, wherein the liquid crystal layer includes a liquid crystal composition, and a polymer obtained by polymerizing a composition containing compound (6) represented by formula (6).

$$P^1-Z^5-P^2 \quad (6)$$

In formula (6), $Z^5$ is alkylene having 1 to 80 carbons, and in the alkylene, at least one hydrogen may be replaced by alkyl having 1 to 5 carbons, fluorine, chlorine or $P^3$, and at least one piece of —$CH_2$— may be replaced by —O—, —CO—, —COO—, —OCO—, —NH—, —N($R^9$)—, —CH=CH—, —C≡C— or a divalent group having 5 to 35 carbons obtained by eliminating hydrogen from monocyclic hydrocarbon, fused polycyclic hydrocarbon, a heteromonocyclic compound or a fused heterocyclic compound, and in the divalent group, at least one hydrogen may be replaced by $R^9$ or $P^3$, $R^9$ is alkyl having 1 to 12 carbons, and in the alkyl, at least one piece of —$CH_2$— may be replaced by —O—, —CO—, —COO— or —OCO—, and in the alkyl, at least one piece of —$CH_2$— may be replaced by —O—, —CO—, —COO— or —OCO—, $P^1$, $P^2$ and $P^3$ are independently a polymerizable group, hydrogen, fluorine, chlorine, trifluoromethyl, trifluoromethoxy, cyano, alkyl having 1 to 20 carbons or alkenyl having 2 to 20 carbons, and in the alkyl and the alkenyl, at least one hydrogen may be replaced by fluorine or chlorine, and at least one piece of —$CH_2$— may be replaced by —O—, —CO—, —COO— or —OCO—, and at least one hydrogen may be replaced by alkyl having 1 to 12 carbons, and in the alkyl, at least one piece of —$CH_2$— may be replaced by —O—, —CO—, —COO— or —OCO—, and at least one of $P^1$ and $P^2$ is a polymerizable group.

A 15$^{th}$ aspect of the invention includes the liquid crystal device according to the 14$^{th}$ aspect, wherein $P^1$, $P^2$ and $P^3$ are independently any one of formula (P-1) to formula (P-6).

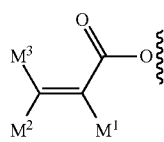
(P-1)

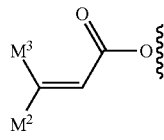
(P-2)

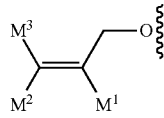
(P-3)

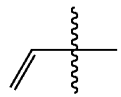
(P-4)

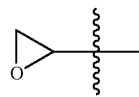
(P-5)

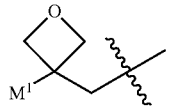
(P-6)

In formula (P-1) to formula (P-6), $M^1$, $M^2$ and $M^3$ are independently hydrogen, fluorine, alkyl having 1 to 5 carbons, or alkyl having 1 to 5 carbons in which at least one hydrogen is replaced by fluorine or chlorine.

A 16$^{th}$ aspect of the invention includes the liquid crystal device according to any one of the 1$^{st}$ to 15$^{th}$ aspects, wherein the thermosetting polymer composition contains a photopolymerization initiator.

A 17$^{th}$ aspect of the invention includes the liquid crystal device according to any one of the 1$^{st}$ to 16$^{th}$ aspects, wherein the liquid crystal layer includes a liquid crystal light control layer, and is cloudy during no current flow.

An 18$^{th}$ aspect of the invention includes the liquid crystal device according to any one of the 1$^{st}$ to 16$^{th}$ aspects, wherein the liquid crystal layer includes a liquid crystal light control layer, and is cloudy during current flow.

A 19$^{th}$ aspect of the invention includes the liquid crystal device according to any one of the 1$^{st}$ to 18$^{th}$ aspects, wherein the first substrate is a glass plate, an acrylic plate or a plastic film, and the second substrate is a glass plate, an acrylic plate or a plastic film.

A 20$^{th}$ aspect of the invention includes a light control window, including the liquid crystal device according to any one of the 1$^{st}$ to 19$^{th}$ aspects.

A 21$^{st}$ aspect of the invention includes a liquid crystal display apparatus, including the liquid crystal device according to any one of the 1$^{st}$ to 20$^{th}$ aspects, and a light source apparatus.

A 22$^{nd}$ aspect of the invention includes a method for producing a light crystal device, comprising: curing a thermosetting polymer composition on a first substrate; inserting a mixture of a liquid crystal composition and a polymerizable compound between the first substrate and a second substrate; and performing UV exposure to the mixture.

A 23$^{rd}$ aspect of the invention includes the method for producing the light crystal device according to the 22$^{nd}$ aspect, wherein an insulating film is obtained by curing.

A 24$^{th}$ aspect of the invention includes the method for producing the light crystal device according to the 23$^{rd}$ aspect, wherein curing is made by curing of the thermosetting polymer composition.

A 25$^{th}$ aspect of the invention includes the method for producing the light crystal device according to the 24$^{th}$ aspect, wherein curing is made by thermosetting.

A 26$^{th}$ aspect of the invention includes the method for producing the light crystal device according to the 22$^{nd}$ aspect, wherein inserting is made in a state in which an electrode 1 on the first substrate and an electrode 2 on the second substrate are arranged facing with each other.

A 27$^{th}$ aspect of the invention includes a method for producing a liquid crystal device, comprising:

placing a mixture containing a liquid crystal composition and a polymerizable compound on an electrode on electrode 1 on a first substrate;

adhering between an adhesive space and a second substrate; and bonding between the first substrate and the second substrate through the mixture and the adhesive spacer.

A 28th aspect of the invention includes a method for producing the liquid crystal device according to the 27th aspect, wherein placing is made by dropwise addition.

BRIEF DESCRIPTION OF DRAWINGS

FIG. 1 shows an example of a cross-sectional view of a liquid crystal device.

DESCRIPTION OF EMBODIMENTS

In a liquid crystal device according to any one of 1st to 19th aspects, destruction caused by arcing can be prevented.

In a liquid crystal device according to any one of 20th to 21st aspects, destruction caused by arcing can be prevented.

In a liquid crystal device produced by the method according to any one of 22nd to 27th aspects, destruction of a liquid crystal device caused by arcing can be prevented.

Phenomenon

In the invention, a term "room temperature" means 1° C. to 30° C.

In the invention, a term "atmospheric pressure" means 900 hPa to 1100 hPa.

Compound

In the invention, a term "liquid crystal compound" is a generic term for (A) a compound having a liquid crystal phase as a pure substance, and (B) a compound serving as a component of a liquid crystal composition. Specific examples of the liquid crystal compound include 1,4-cyclohexylene and 1,4-phenylene. The liquid crystal compound has a six-membered ring, and has a rod-like molecular structure in many cases.

In the invention, a term "polymerizable compound" means a compound to be added for the purpose of forming a polymer.

In the invention, a term "polyhydroxy compound" means a compound containing two or more hydroxyl groups.

Composition

In the invention, a term "liquid crystal composition" means a composition exhibiting a liquid crystal phase.

In the invention, a term "polymerizable composition" means a mixture containing the polymerizable compound and the liquid crystal composition.

In the invention, a term "polymer composition" means a composition obtained by polymerizing the mixture of the polymerizable compounds. A polymerizable compound in which polymerization is incomplete is also included in the polymer composition in several cases.

In the invention, a term "thermosetting polymer composition" means a raw material for an insulating film.

In the invention, a term "reaction solvent" means a solvent to be used in a synthetic reaction for the purpose of forming polyester amide acid.

In the invention, a term "liquid crystal composite" means a mixture containing the liquid crystal composition and the polymer. A composition obtained by polymerizing the polymerizable compound in the polymerizable composition is also the liquid crystal composite.

Device

In the invention, a term "liquid crystal device" means a device having the liquid crystal composition therein and including an electrode.

In the invention, a term "light control window" means a window having a light control function capable of turning the device to be transparent or cloudy by voltage application. One example of the light control window includes a smart window.

As shown in FIG. 1, the liquid crystal device can be prevented from causing arcing by inserting the insulating film between electrode 1 (2) and electrode 2 (4).

Specifically, an optical device including liquid crystal layer (6), substrate (1), substrate (3), and insulating film (5) has a basic structure of the liquid crystal device.

The liquid crystal layer is arranged between substrate (1) and substrate (3), substrate (1) includes electrode 1 (2), and substrate (3) includes electrode 2 (4).

The insulating film is arranged between electrode 1 of a first substrate and electrode 2 of a second substrate.

The structure described above can prevent the liquid crystal device from causing arcing, and from being destructed.

The "substrate" is preferably a substrate that transmits light, and is further preferably transparent for giving service as the optical device.

The "insulating film" is preferably an insulating film that transmits light, and is further preferably transparent for giving service as the optical device.

The "electrode" is preferably an electrode that transmits light, and is further preferably transparent for giving service as the optical device.

The liquid crystal composition contains a plurality of liquid crystal compounds. An additive is preferably added to the liquid crystal composition for the purpose of further adjusting physical properties. Specific examples of the additive include an optically active compound, an antioxidant, an ultraviolet light absorber, a dye, an antifoaming agent, a polymerizable compound, a polymerization initiator, a polymerization inhibitor and a polar compound.

In the chemical formula of the invention, a designation in which a character is surrounded by a hexagonal shape corresponds to a six-membered ring or a fused ring.

In the liquid crystal compound, alkyl, alkoxy, alkenyl or the like preferably has a straight-chain form because a temperature range exhibiting the liquid crystal phase extends. With regard to a configuration of a 1,4-cyclohexylene skeleton, trans is preferred for increasing a transition temperature from the liquid crystal phase to an isotropic phase.

In the liquid crystal device according to the first aspect of the invention, a defect caused by arcing generated by applying an electric field to the liquid crystal device can be suppressed by having the insulating film on at least one surface of the first substrate and the second substrate facing each other. Accordingly, appearance of the device and a yield in a production process can be improved.

For securing light control performance by the liquid crystal layer containing the polymer, a voltage between the electrodes when the light control window is turned on is preferably about 10 V to about 250 V, further preferably about 20 V to about 120 V, and still further preferably about 30 V to about 100 V. The voltage between the electrodes of the light control window is higher than the voltage of a liquid crystal display.

In the liquid crystal device according to the sixth aspect of the invention, the thermosetting polymer composition is applied onto a surface of the substrate, a coating film is formed by removing a solvent by heating (prebaking), and the coating film is cured by performing heat treatment. The surface is flattened and insulating properties between the electrodes are improved by coating the substrate and the electrode with the insulating film. The defect caused by arcing generated by applying the electric field thereto can be suppressed by the insulating film.

Configuration of a Liquid Crystal Device

The liquid crystal layer may be formed of the liquid crystal composition having positive or negative dielectric anisotropy, or the liquid crystal composite containing a phase-separated polymer and the liquid crystal composition as obtained by polymerizing the polymerizable composition being a mixture of the liquid crystal composition and the polymerizable compound by heat or light.

The liquid crystal layer may include the additive such as the optically active compound, the antioxidant, the ultraviolet light absorber, the dye, the antifoaming agent, the polymerizable compound, the polymerization initiator and the polymerization inhibitor. The liquid crystal device includes an AM device, and a polymer-network and polymer-dispersed liquid crystal device.

The substrate may be a glass plate, an acrylic plate or a plastic film. One of the substrates may be formed of an opaque material. The substrate includes the electrode. Specific examples of the electrode include tin-doped indium oxide, ITO), $SnO_2$ and an electroconductive polymer. Specific examples of a method for stacking the electrode on the substrate include vapor deposition and application. In addition, a thickness of each layer of electrode 1 and electrode 2 is about 20 to about 120 nanometers, preferably about 40 to about 100 nanometers, and particularly preferably about 50 to about 80 nanometers. The thickness of each layer of the electrode may be identical to or different from each other according to design.

The liquid crystal device may incorporate an alignment film. The alignment film is preferably a thin film such as polyimide or polyvinyl alcohol. Specific examples of the alignment film include a polyimide alignment film obtained by applying a polyimide resin composition on the substrate, and thermally curing the coating at a temperature of about 180° C. or higher, and applying a rubbing treatment to the resulting coating with a cotton fabric or a rayon fabric.

For obtaining a uniform thickness between the substrates, a spacer is preferably inserted between the substrates. Glass particles, plastic particles, alumina particles, a photograph spacer or the like can serve as the spacer. A thickness of the light control layer is preferably about 2 to about 50 micrometers, and further preferably about 5 to about 20 micrometers. A sealant may be used when a pair of substrates are bonded with each other. An epoxy-based thermosetting composition or the like can serve as the sealant.

A means for curing is preferably irradiation with ultraviolet light. Specific examples of a means for irradiation with ultraviolet light include a low-pressure mercury lamp (including a bactericidal lamp and a fluorescent chemical lamp, a black light or the like), a high-pressure discharge lamp (including a high-pressure mercury lamp, a metal halide lamp or the like), and a short arc discharge lamp (including an ultra high-pressure mercury lamp, a Xenon lamp, a Mercury-Xenon lamp or the like). The metal halide lamp, the Xenon lamp, the high-pressure mercury lamp, the ultra high-pressure mercury lamp or the like as described above are general. When the photopolymerization initiator is used, a wavelength of ultraviolet light for irradiation is preferably in an absorption wavelength region of the photopolymerization initiator. As the wavelength of ultraviolet light for irradiation preferably, an absorption wavelength region of the liquid crystal composition is preferably avoided. The wavelength of ultraviolet light for irradiation is preferably about 330 to about 400 nanometers, and further preferably about 350 to about 400 nanometers. The composition can be cured at room temperature or at room temperature or higher.

The light control window may have a light source apparatus, a light absorption layer, a diffuse reflection plate or the like on a back surface of the device. Thus, a function such as mirror reflection, diffuse reflection, retroreflection and hologram reflection may be added thereto.

Insulating Film

Polyester Amide Acid

A polyester compound used in the invention has constitutional units represented by general formulas (1) and (2). In formula (1) and formula (2), $R^1$ is a residue obtained by eliminating two pieces of —CO—O—CO— from tetracarboxylic dianhydride, $R^2$ is a residue obtained by eliminating two pieces of —$NH_2$ from diamine, and $R^3$ is a residue obtained by eliminating two pieces of —OH from a polyhydroxy compound.

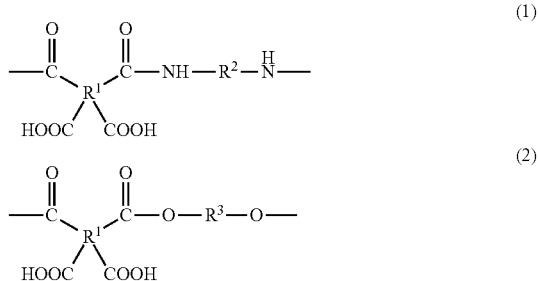

Synthesis of polyester amide acid requires the solvent. For handling such a material, a liquid or gelled composition containing polyester amide acid and the solvent is preferred. Moreover, for conveying such a material, the solvent is preferably removed from a mixture containing polyester amide acid.

Moreover, a raw material of polyester amide acid may contain a styrene-maleic anhydride copolymer, and may contain the additive. Specific examples of polyester amide acid include silicon-containing monoamine.

Specific examples of tetracarboxylic dianhydride include 3,3',4,4'-diphenyl ether tetracarboxylic dianhydride, (hereinafter, occasionally abbreviated as ODPA), 1,2,3,4-butanetetracarboxylic dianhydride, 3,3',4,4'-benzophenone tetracarboxylic dianhydride, 2,2',3,3'-benzophenone tetracarboxylic dianhydride, 2,3,3',4'-benzophenone tetracarboxylic dianhydride, 3,3',4,4'-diphenylsulfone tetracarboxylic dianhydride, 2,2',3,3'-diphenylsulfone tetracarboxylic dianhydride, 2,3,3',4'-diphenylsulfone tetracarboxylic dianhydride, 2,2',3,3'-diphenyl ether tetracarboxylic dianhydride, 2,3,3',4'-diphenyl ether tetracarboxylic dianhydride, 2,2-[bis(3,4-dicarboxyphenyl]hexafluoropropane dianhydride, ethylene glycol bis(anhydrotrimellitate) (trade name; TMEG-100, New Japan Chemical Co., Ltd.), cyclobutanetetracarboxylic dianhydride, methylcyclobutanetetracarboxylic dianhydride, cyclopentane tetracarboxylic dianhydride, cyclohexanetetracarboxylic dianhydride and ethanetetracarboxylic dianhydride.

Because transparency of the insulating film is high, 3,3',4,4'-diphenylsulfone tetracarboxylic dianhydride, 3,3',4,4'-diphenyl ether tetracarboxylic dianhydride, 2,2-[bis(3,4-dicarboxyphenyl]hexafluoropropane dianhydride, 1,2,3,4-butanetetracarboxylic dianhydride and TMEG-100 are preferred, and 3,3',4,4'-diphenyl ether tetracarboxylic dianhydride, 3,3',4,4'-diphenylsulfone tetracarboxylic dianhydride and 1,2,3,4-butanetetracarboxylic dianhydride are further preferred.

Specific examples of the polyhydroxy compound include ethylene glycol, diethylene glycol, triethylene glycol, tetraethylene glycol, polyethyleneglycol having weight average molecular weight of 1,000 or less, propylene glycol, dipropylene glycol, tripropylene glycol, tetrapropylene glycol, polypropylene glycol having weight average molecular weight of 1,000 or less, 1,2-butanediol, 1,3-butanediol, 1,4-butanediol, 1,2-pentanediol, 1,5-pentanediol, 2,4-pentanediol, 1,2,5-pentanetriol, 1,2-hexanediol, 1,6-hexanediol, 2,5-hexanediol, 1,2,6-hexanetriol, 1,2-heptanediol, 1,7-heptanediol, 1,2,7-heptanetriol, 1,2-octanediol, 1,8-octanediol, 3,6-octanediol, 1,2,8-octanetriol, 1,2-nonanediol, 1,9-nonanediol, 1,2,9-nonanetriol, 1,2-decanediol, 1,10-decanediol, 1,2,10-decanetriol, 1,2-dodecanediol, 1,12-dodecanediol, glycerol, trimethylolpropane, pentaerythritol, dipentaerythritol, tris(2-hydroxyethyl)isocyanurate, bisphenol A (2,2-bis(4-hydroxyphenyl)propane), bisphenol (bis(4-hydroxyphenyl)sulfone), bisphenol (bis(4-hydroxyphenyl)methane), 4,4'-isopropylidene bis(2-phenoxyethanol), 2,2-bis(4-hydroxycyclohexyl)propane, 4,4'-dihydroxydicyclohexyl, 2-hydroxybenzyl alcohol, 4-hydroxybenzyl alcohol, 2-(4-hydroxyphenyl)ethanol, diethanolamine, triethanolamine, glycerol monoallyl ether, trimethylolpropane monoallyl ether, pentaerythritol monoallyl ether, pentaerythritol diallyl ether, dipentaerythritol monoallyl ether, dipentaerythritol diallyl ether, dipentaerythritol triallyl ether, dipentaerythritol tetraallyl ether, sorbitolmonoallyl ether, sorbitol diallyl ether, sorbitol triallyl ether, sorbitoltetraallyl ether, glycerol mono(meth)acrylate, trimethylolpropane mono(meth)acrylate, pentaerythritol mono(meth)acrylate, pentaerythritol di(meth)acrylate, dipentaerythritol mono(meth)acrylate, dipentaerythritol di(meth)acrylate, dipentaerythritol tri(meth)acrylate, dipentaerythritol tetra(meth)acrylate, sorbitol mono(meth)acrylate, sorbitol di(meth)acrylate, sorbitol tri(meth)acrylate, sorbitol tetra(meth)acrylate, a (meth)acrylic acid-modified product of ethylene glycol diglycidyl ether, a (meth)acrylic acid-modified product of propylene glycol diglycidyl ether, a (meth)acrylic acid-modified product of tripropylene glycol diglycidyl ether, a (meth)acrylic acid-modified product of glycerol diglycidyl ether, a (meth)acrylic acid-modified product of bisphenol A diglycidyl ether, a (meth)acrylic acid-modified product of propylene oxide-modified bisphenol A diglycidyl ether, a (meth)acrylic acid-modified product of bisphenol S diglycidyl ether, a (meth)acrylic acid-modified product of propylene oxide-modified bisphenol S diglycidyl ether, a (meth)acrylic acid-modified product of bisphenol F diglycidyl ether, a (meth)acrylic acid-modified product of propylene oxide-modified bisphenol F diglycidyl ether, a (meth)acrylic acid-modified product of bixylenol diglycidyl ether, a (meth)acrylic acid-modified product of biphenol diglycidyl ether, a (meth)acrylic acid-modified product of fluorenediphenol diglycidyl ether, a (meth)acrylic acid-modified product of cyclohexane-1,4-dimethanol diglycidyl ether, a (meth)acrylic acid-modified product of hydrogenated bisphenol A diglycidyl ether, a (meth)acrylic acid-modified product of tricyclodecane dimethanol diglycidyl ether and a (meth)acrylic acid-modified product of any other compound containing two or more epoxy groups per molecule.

Because solubility with a reaction solvent is good, ethylene glycol, diethylene glycol, triethylene glycol, propylene glycol, 1,4-butanediol, 1,5-pentanediol, 1,6-hexanediol, 1,7-heptanediol, 1,8-octanediol, tris(2-hydroxyethyl)isocyanurate, 2,2-bis(4-hydroxycyclohexyl)propane, 4,4'-dihydroxydicyclohexyl, 2-hydroxybenzyl alcohol, 4-hydroxybenzyl alcohol, 2-(4-hydroxyphenyl)ethanol, 4,4'-isopropylidene bis(2-phenoxyethanol), a (meth)acrylic acid-modified product of ethylene glycol diglycidyl ether, a (meth)acrylic acid-modified product of propylene glycol diglycidyl ether, a (meth)acrylic acid-modified product of glycerol diglycidyl ether, a (meth)acrylic acid-modified product of bisphenol A diglycidyl ether, a (meth)acrylic acid-modified product of propylene oxide-modified bisphenol A diglycidyl ether, a (meth)acrylic acid-modified product of bisphenol S diglycidyl ether, a (meth)acrylic acid-modified product of propylene oxide-modified bisphenol S diglycidyl ether, a (meth)acrylic acid-modified product of bisphenol F diglycidyl ether and a (meth)acrylic acid-modified product of propylene oxide-modified bisphenol F diglycidyl ether are preferred. Further, diethylene glycol, triethylene glycol, 1,4-butanediol, 1,5-pentanediol, 1,6-hexanediol, 2-hydroxybenzyl alcohol, 4-hydroxybenzyl alcohol, 4,4'-isopropylidene bis(2-phenoxyethanol), 2-(4-hydroxyphenyl)ethanol, a (meth)acrylic acid-modified product of ethylene glycol diglycidyl ether, a (meth)acrylic acid-modified product of propylene glycol diglycidyl ether, a (meth)acrylic acid-modified product of tripropylene glycol diglycidyl ether, a (meth)acrylic acid-modified product of glycerol diglycidyl ether, a (meth)acrylic acid-modified product of bisphenol A diglycidyl ether and a (meth)acrylic acid-modified product of propylene oxide-modified bisphenol A diglycidyl ether are further preferred.

Specific examples of diamine include 3,3'-diaminodiphenyl sulfone (hereinafter, occasionally abbreviated as "DDS"), 4,4'-diaminodiphenyl sulfone, 3,4'-diaminodiphenyl sulfone, bis[4-(4-aminophenoxy)phenyl]sulfone, bis[4-(3-aminophenoxy)phenyl]sulfone, bis[3-(4-aminophenoxy)phenyl]sulfone, [4-(4-aminophenoxy)phenyl][3-(4-aminophenoxy)phenyl]sulfone, [4-(3-aminophenoxy)phenyl][3-(4-aminophenoxy)phenyl]sulfone and 2,2-bis[4-(4-aminophenoxy)phenyl]hexafluoropropane.

For improving transparency of the insulating film, 3,3'-diaminodiphenyl sulfone and bis[4-(3-aminophenoxy)phenyl]sulfone are preferred, and 3,3'-diaminodiphenyl sulfone is further preferred.

Specific examples of monohydric alcohol include methanol, ethanol, 1-propanol, isopropyl alcohol, allyl alcohol, benzyl alcohol, propylene glycol monoethyl ether, propylene glycol monomethyl ether, dipropylene glycol monoethyl ether, dipropylene glycol monomethyl ether, cellosolve, ethylene glycol monomethyl ether, diethylene glycol monoethyl ether, diethylene glycol monomethyl ether, phenol, borneol, maltol, linalool, terpineol, dimethylbenzyl carbinol and 3-ethyl-3-hydroxymethyl oxetane.

As monohydric alcohol, isopropyl alcohol, allyl alcohol, benzyl alcohol, propylene glycol monoethyl ether or 3-ethyl-3-hydroxymethyl oxetane is preferred. For improving applicability and compatibility of the thermosetting polymer composition, the composition further preferably contains benzyl alcohol.

Because the transparency of the insulating film is improved, polyester amide acid having three or more acid anhydride groups is preferred. Specific examples of the compound having three or more acid anhydride groups include a styrene-maleic anhydride copolymer. A molar ratio of styrene to maleic anhydride in the styrene-maleic anhydride copolymer is about 0.5 to about 4, preferably about 1 to about 3, further preferably about 1 to about 2, and still further preferably about 1 to about 1.2.

Because a silyl group can be introduced into a terminal by allowing reaction with an acid anhydride group at a terminal of polyester amide acid, an amino silane compound is preferred. Because acid resistance of the insulating film is improved, a thermosetting polymer composition containing polyester amide acid (A) obtained by adding the amino silane compound to be allowed to react is preferred. Both a monohydroxy compound and an amino silane compound having one amino group may be added to be allowed to react.

Specific examples of the amino silane compound include 3-aminopropyltrimethoxysilane, 3-aminopropyltriethoxysilane, 3-aminopropylmethyldimethoxysilane, 3-aminopropylmethyldiethoxysilane, 4-aminobutyltrimethoxysilane, 4-aminobutyltriethoxysilane, 4-aminobutylmethyldiethoxysilane, p-aminophenyltrimethoxysilane, p-aminophenyltriethoxysilane, p-aminophenylmethyldimethoxysilane, p-aminophenylmethyldiethoxysilane, m-aminophenyltrimethoxysilane and m-aminophenylmethyldiethoxysilane.

Because the acid resistance of the insulating film becomes good, as the amino silane compound containing an amino group, 3-aminopropyltriethoxysilane and p-aminophenyltrimethoxysilane are further preferred, and 3-aminopropyltriethoxysilane is further preferred from viewpoints of the acid resistance and the compatibility.

Components of the reaction solvent include diethylene glycol dimethyl ether, diethylene glycol methyl ethyl ether, diethylene glycol diethyl ether, diethylene glycol monoethyl ether acetate, ethylene glycol monoethyl ether acetate, propylene glycol monoethyl ether acetate, methyl 3-methoxypropionate, ethyl 3-ethoxypropionate, ethyl lactate, cyclohexanone, N-methyl-2-pyrrolidone and N,N-dimethylacetamide. Among the above-described compounds, propylene glycol monoethyl ether acetate, methyl 3-methoxypropionate and diethylene glycol methyl ethyl ether are preferred.

For improving solubility of a solution containing polyester amide acid, and facilitating applying the solution, resulting in improving smoothness of the insulating film, the solution containing polyester amide acid preferably satisfies an expression: $0.2 \leq Z/Y \leq 8.0$, further preferably satisfies an expression: $0.7 \leq Z/Y \leq 7.0$, and still further preferably satisfies an expression: $1.0 \leq Z/Y \leq 5.0$.

For improving the solubility of the solution containing polyester amide acid, and facilitating applying the solution, resulting in improving the smoothness of the insulating film, the solution containing polyester amide acid preferably satisfies an expression: $0.2 \leq (Y+Z)/X \leq 5.0$, further preferably satisfies an expression: $0.5 \leq (Y+Z)/X \leq 4.0$, and still further preferably satisfies an expression: $0.6 \leq (Y+Z)/X \leq 2.0$.

Here, X represents a molar concentration of tetracarboxylic dianhydride, Y represents a molar concentration of diamine, and Z represents a molar concentration of a polyhydroxy compound.

Because handling is easy, an amount of the reaction solvent upon preparing polyester amide acid, based on the total amount of 100 parts by weight of tetracarboxylic dianhydride, diamine and a polyhydroxy compound, is preferably about 100 parts by weight or more.

Because handling is easy, a liquid temperature upon preparing polyester amide acid is preferably about 40° C. to about 200° C. Because handling is easy, a reaction time upon preparing polyester amide acid is preferably about 0.2 to about 20 hours.

The order of mixing tetracarboxylic dianhydride, diamine and the polyhydroxy compound upon preparing polyester amide acid is not limited.

When the amino silane compound containing one amino group is allowed to react, generally, after a reaction of tetracarboxylic dianhydride, diamine and the polyhydroxy compound is completed, the solution after the reaction is cooled to 40° C. or lower, and then the amino silane compound having one amino group is added thereto, and is allowed to react at 10° C. to 40° C. for 0.1 to 6 hours.

Because the flatness and the heat resistance are improved, weight average molecular weight of the polyester amide acid is preferably about 1,000 to about 200,000, and further preferably about 2,000 to about 50,000.

Epoxy Compound

For improving the heat resistance and solvent resistance, an epoxy compound is preferably added to a raw material of the insulating film.

Specific examples of the epoxy compound include 3',4'-epoxycyclohexylmethyl-3,4-epoxycyclohexane carboxylate, 1-methyl-4-(2-methyloxiranyl)-7-oxabicyclo[4.1.0]heptane, a mixture of 2-[4-(2,3-epoxypropoxy)phenyl]-2-[4-[1,1-bis[4-([2,3-epoxypropoxy]phenyl)]ethyl)]phenyl]propane and 1,3-bis[4-[1-[4-(2,3-epoxypropoxy)phenyl]-1-[4-[1-[4-(2,3-epoxypropoxy)phenyl]-1-methylethyl]phenyl]ethyl]phenoxy]-2-propanol, 2-[4-(2,3-epoxypropoxy)phenyl]-2-[4-[1,1-bis[4-([2,3-epoxypropoxy]phenyl)]ethyl]phenyl]propane, 1,1,1-tris(4-hydroxyphenyl)ethane triglycidyl ether, 1,3-bis(oxiranylmethyl-5-(2-propenyl)-1,3,5-triazine-2,4,6(1H,3H,5H)-trione, a 1,2-epoxy-4-(2-oxiranyl)cyclohexane adduct of 2,2-bis(hydroxymethyl)-1-butanol, 3,3',5,5'-tetramethyl-4,4'-biphenol diglycidyl ether and a polycondensation hydrogenated product of 4,4'-isopropylidenediphenol and 1-chloro-2,3-epoxypropane.

Because the transparency of the insulating film is increased, and reduction of the transparency of the insulating film can be suppressed in a UV ozone treatment step and an ultraviolet light exposure step, the epoxy compound is preferably an epoxy compound being a polymer. Specific examples of the epoxy compound being the polymer include a compound obtained by allowing glycidyl (meth)acrylate alone, 4-hydroxybutyl (meth)acrylate glycidyl ether alone or one or more kinds selected from glycidyl (meth)acrylate and 4-hydroxybutyl (meth)acrylate glycidyl ether to react with a radical polymerizable compound having no epoxy group. From viewpoints of the flatness, the heat resistance and the solvent resistance, a ratio of the radical polymerizable compound being a raw material of the epoxy compound being a copolymer to the total amount of the polymerizable compound is preferably about 50 to about 99% by weight.

Because compatibility of the epoxy compound obtained by being allowed to react with glycidyl (meth)acrylate with polyester amide acid (A) becomes good, preferred examples of the radical polymerizable compound include methyl (meth)acrylate, ethyl (meth)acrylate, butyl (meth)acrylate, benzyl (meth)acrylate, cyclohexyl (meth)acrylate, 2-hydroxyethyl (meth)acrylate, 3-(meth)acryloxypropyltrimethoxysilane, 3-(meth)acryloxypropyltriethoxysilane, vinyltrimethoxysilane, vinyltriethoxysilane, 3-((meth)acryloyloxy)propyltris(trimethylsiloxy)silane, ethylene glycol di(meth)acrylate, diethylene glycol di(meth)acrylate, 1,4-butanediol (meth)acrylate, 1,3-butanediol di(meth)acrylate, neopentyl glycol di(meth)acrylate, tricylodecane dimethanol di(meth)acrylate, N-phenylmaleimide, N-cyclohexylmaleimide and indene.

Reaction Solvent

The reaction solvent, in the thermosetting polymer composition, to be mixed upon preparing polyester amide acid may be treated and used as a raw material of the insulating film. The treatment includes evaporation, addition of the solvent, or the like. The treatment need not be performed. A solid content of the polymer composition is selected according to a film thickness of the coating film, and in general contained in the polymer composition in the range of about 5 to about 40% by weight.

Specific examples that can be the components of the solvent to be added include ethyl acetate, butyl acetate, propyl acetate, butyl propionate, ethyl lactate, methyl methoxyacetate, ethyl methoxyacetate, butyl methoxyacetate, methyl ethoxyacetate, ethyl ethoxyacetate, 3-methoxybutyl acetate, methyl 3-oxypropionate, ethyl 3-hydroxypropionate, methyl 3-methoxypropionate, ethyl 3-methoxypropionate, methyl 3-ethoxypropionate, ethyl 3-ethoxypropionate, methyl 2-hydroxypropionate, propyl 2-hydroxypropionate, methyl 2-methoxypropionate, ethyl 2-methoxypropionate, propyl 2-methoxypropionate, methyl 2-ethoxypropionate, ethyl 2-ethoxypropionate, methyl 2-hydroxy-2-methylpropionate, ethyl 2-hydroxy-2-methylpropionate, methyl 2-methoxy-2-methylpropionate, ethyl 2-ethoxy-2-methylpropionate, methyl pyruvate, ethyl pyruvate, propyl pyruvate, methyl acetoacetate, ethyl acetoacetate, methyl 2-oxobutanoate, ethyl 2-oxobutanoate, 4-hydroxy-4-methyl-2-pentanone, 1,4-butanediol, propylene glycol monomethyl ether, propylene glycol monoethyl ether acetate, propylene glycol monoethyl ether acetate, propylene glycol monopropyl ether acetate, ethylene glycol monobutyl ether acetate, cyclohexanone, cyclopentanone, diethylene glycol monomethyl ether, diethylene glycol monomethyl ether acetate, diethylene glycol monoethyl ether, diethylene glycol monoethyl ether acetate, diethylene glycol monobutyl ether, diethylene glycol monobutyl ether acetate, diethylene glycol dimethyl ether, diethylene glycol diethyl ether and diethylene glycol methyl ethyl ether.

Other Components

For improving heat resistance and chemical resistance, addition of an epoxy curing agent to the thermosetting polymer composition is preferred. Specific examples of the epoxy curing agent include an acid anhydride-based curing agent, an amine-based curing agent, a phenol-based curing agent, an imidazole-based curing agent, a catalyst type curing agent, and a heat-sensitive acid generator such as a sulfonium salt, a benzothiazolium salt, an ammonium salt and a phosphonium salt. From a viewpoint of avoiding coloring of the insulating film and the heat resistance of the insulating film, an acid anhydride curing agent or an imidazole-based curing agent is preferred.

Specific examples of the acid anhydride curing agent include aliphatic dicarboxylic anhydride such as maleic anhydride, tetrahydrophthalic anhydride, hexahydrophthalic anhydride, methylhexahydrophthalic anhydride, and hexahydrotrimellitic anhydride; and aromatic polyvalent carboxylic anhydride such as phthalic anhydride, and trimellitic anhydride. Because the heat resistance of the insulating film can be improved without adversely affecting solubility of a photosensitive composition in the solvent, as the acid anhydride curing agent, trimellitic anhydride and hexahydrotrimellitic anhydride are particularly preferred.

Specific examples of the imidazole-based curing agent include 2-undecylimidazole, 2-heptadecylimidazole, 2-phenylimidazole, 2-phenyl-4-methylimidazole, 2,3-dihydro-1H-pyrrolo[1,2-a]benzimidazole and 1-cyanoethyl-2-undecylimidazoliumtrimellitate. Because curability of the insulating film can be improved without adversely affecting the solubility of the photosensitive composition in the solvent, as the imidazole-based curing agent, 2-undecylimidazole is particularly preferred.

Because a balance regarding the flatness, the heat resistance, the chemical resistance, the adhesion and foreign matter characteristics is good, an amount of the epoxy compound in the thermosetting resin composition based on 100 parts by weight of the polyester amide acid is preferably about 20 to about 400 parts by weight, and further preferably about 50 to about 200 parts by weight.

For improving film physical properties such as flatness, scratch resistance, application uniformity and adhesive properties, an additive may be occasionally added to the thermosetting polymer composition of the invention. Specific examples of the additive include an adhesion improver such as a compound having a polymerizable double bond, and an anionic, cationic, nonionic, fluorine-based or silicon-based leveling agent and surfactant, and a silane coupling agent; and an antioxidant such as a hindered phenol-based, hindered amine-based, phosphorus-based or sulfur-based compound.

The compound having the polymerizable double bond is not particularly limited as long as the compound has two or more polymerizable double bonds per molecule.

Specific examples of the compound having the polymerizable double bond, and having two polymerizable double bonds per molecule include ethylene glycol di(meth)acrylate, diethylene glycol di(meth)acrylate, triethylene glycol di(meth)acrylate, tetraethylene glycol di(meth)acrylate, polyethylene glycol di(meth)acrylate, epichlorohydrin-modified ethylene glycol di(meth)acrylate, epichlorohydrin-modified diethylene glycol di(meth)acrylate, epichlorohydrin-modified triethylene glycol di(meth)acrylate, epichlorohydrin-modified tetraethylene glycol di(meth)acrylate, epichlorohydrin-modified polyethylene glycol di(meth)acrylate, propylene glycol di(meth)acrylate, dipropylene glycol di(meth)acrylate, tripropylene glycol di(meth)acrylate, tetrapropylene glycol di(meth)acrylate, polypropylene glycol di(meth)acrylate, epichlorohydrin-modified propylene glycol di(meth)acrylate, epichlorohydrin-modified dipropylene glycol di(meth)acrylate, epichlorohydrin-modified tripropylene glycol di(meth)acrylate, epichlorohydrin-modified tetrapropylene glycol di(meth)acrylate, epichlorohydrin-modified polypropylene glycol di(meth)acrylate, glycerol acrylate methacrylate, glycerol di(meth)acrylate, 1,6-hexanediol di(meth)acrylate, epichlorohydrin-modified 1,6-hexanediol di(meth)acrylate, methoxylated cyclohexyl di(meth)acrylate, neopentyl glycol di(meth)acrylate, hydroxy pivalic acid neopentyl glycol di(meth)acrylate, caprolactone-modified hydroxy pivalic acid neopentyl glycol di(meth)acrylate, stearic acid-modified pentaerythritol di(meth)acrylate, allylated cyclohexyl di(meth)acrylate, bis[(meth)acryloxyneopentylglycol]adipate, bisphenol A di(meth)acrylate, ethylene oxide-modified bisphenol A di(meth)acrylate, bisphenol F di(meth)acrylate, ethylene oxide-modified bisphenol F di(meth)acrylate, bisphenol S di(meth)acrylate, ethylene oxide-modified bisphenol S di(meth)acrylate, 1,4-butanediol di(meth)acrylate, 1,3-butylene glycol di(meth)acrylate, dicyclopentanyl diacrylate, ethylene oxide-modified phosphoric acid di(meth)acrylate, caprolactone-ethylene oxide-modified phosphoric acid di(meth)acrylate, epichlorohydrin-modified phthalic acid di(meth)acrylate, tetrabromobisphenol A di(meth)acrylate, triglycerol di(meth)acrylate, neopentylglycol-modified trimethylolpropane di(meth)acrylate and isocyanuric acid ethylene oxide-modified diacrylate.

Specific examples of the compound having the polymerizable double bond, and having three or more polymerizable double bonds per molecule include trimethylolpropane tri (meth)acrylate, ethylene oxide-modified trimethylolpropane tri(meth)acrylate, propylene oxide-modified trimethylolpropane tri(meth)acrylate, epichlorohydrin-modified trimethylolpropane tri(meth)acrylate, glycerol tri(meth)acrylate, epichlorohydrin-modified glycerol tri(meth)acrylate, pentaerythritol tri(meth)acrylate, alkyl-modified dipentaerythritol tri(meth)acrylate, ethylene oxide-modified phosphoric acid tri(meth)acrylate, caprolactone-ethylene oxide-modified phosphoric acid tri(meth)acrylate, caprolactone-modified tris[(meth)acryloxyethyl]isocyanurate, ditrimethylolpropane tetra(meth)acrylate, diglycerol tetra(meth)acrylate, pentaerythritol tetra(meth)acrylate, alkyl-modified dipentaerythritol tetra(meth)acrylate, dipentaerythritol penta(meth)acrylate, alkyl-modified dipentaerythritol penta(meth)acrylate, dipentaerythritol hexa(meth)acrylate, caprolactone-modified dipentaerythritolhexa(meth)acrylate and carboxyl group-containing polyfunctional (meth)acrylate.

As the above-described compound having the polymerizable double bond, the above-described compound may be used alone, or by mixing two or more compounds.

The composition preferably contains the compound having three or more polymerizable double bonds per molecule in about 50% by weight or more based on 100% by weight of the compound having the polymerizable double bond from a viewpoint of the scratch resistance.

Among the above-described compounds having the polymerizable double bonds, isocyanuric acid ethylene oxide-modified diacrylate, isocyanuric acid ethylene oxide-modified triacrylate, trimethylolpropane triacrylate, pentaerythritol triacrylate, pentaerythritol tetraacrylate, dipentaerythritol pentaacrylate, dipentaerythritol hexaacrylate and carboxyl group-containing polyfunctional (meth)acrylate are preferably used from viewpoints of the flatness and the scratch resistance.

As the above-described compound having the polymerizable double bond, commercially available products as described below can be used. Specific examples of isocyanuric acid ethylene oxide-modified diacrylate include Aronix M-215 (trade name; Toagosei Co., Ltd.); specific examples of a mixture of isocyanuric acid ethylene oxide-modified diacrylate and isocyanuric acid ethylene oxide-modified triacrylate include Aronix M-313 (30 to 40% by weight) and M-315 (3 to 13% by weight, hereinafter, abbreviated as "M-315") (trade names for all; Toagosei Co., Ltd., a content in parentheses is a value described in a catalog as a content of isocyanuric acid ethylene oxide-modified diacrylate in the mixture); specific examples of trimethylolpropane triacrylate is Aronix M-309 (trade name; Toagosei Co., Ltd.); specific examples of a mixture of pentaerythritol triacrylate and pentaerythritol tetraacrylate include Aronix M-306 (65 to 70% by weight), M-305 (55 to 63% by weight), M-303 (30 to 60% by weight), M-452 (25 to 40% by weight), and M-450 (less than 10% by weight) (trade names for all; Toagosei Co., Ltd., and a content in parentheses is a value described in catalog printing value of a content of pentaerythritol triacrylate in the mixture); specific examples of a mixture of dipentaerythritol pentaacrylate and dipentaerythritol hexaacrylate include Aronix M-403 (50 to 60% by weight), M-400 (40 to 50% by weight), M-402 (30 to 40% by weight, hereinafter, abbreviated as "M-402"), M-404 (30 to 40% by weight), M-406 (25 to 35% by weight) and M-405 (10 to 20% by weight) (trade names for all; Toagosei Co., Ltd., and a content in parentheses is a catalog printing value of a content of dipentaerythritol pentaacrylate in the mixture); and specific examples of the carboxyl group-containing polyfunctional acrylate include Aronix M-510 and M-520 (hereinafter, abbreviated as "M-520") (trade names for all; Toagosei Co., Ltd.).

The surfactant may be added to the thermosetting polymer composition of the invention for improving the application uniformity. Specific examples of the surfactant include POLYFLOW No. 45, POLYFLOW KL-245, POLYFLOW No. 75, POLYFLOW No. 90 and POLYFLOW No. 95 (trade names for all; Kyoeisha Chemical Co., Ltd.), Disperbyk 161, Disperbyk 162, Disperbyk 163, Disperbyk 164, Disperbyk 166, Disperbyk 170, Disperbyk 180, Disperbyk 181, Disperbyk 182, BYK300, BYK306, BYK310, BYK320, BYK330, BYK342, BYK346, BYK361N, BYK-UV3500 and BYK-UV3570 (trade names for all; BYK Japan KK), KP-341, KP-358, KP-368, KF-96-50CS and KF-50-100CS (trade names for all; Shin-Etsu Chemical Co., Ltd.), SURFLON SC-101, SURFLON KH-40 and SURFLON 5611 (trade names for all; AGC Seimi Chemical Co., Ltd.), Futargent 222F, Futargent 208G, Futargent 251, Futargent 710FL, Futargent 710FM, Futargent 710FS, Futargent 601AD, Futargent 602A, Futargent 650A and FTX-218 (trade names for all; NEOS COMPANY LIMITED); EFTOP EF-351, EFTOPEF-352, EFTOP EF-601, EFTOP EF-801 and EFTOP EF-802 (trade names for all; Mitsubishi Materials Corporation), MEGAFACE F-171, MEGAFACE F-177, MEGAFACE F-410, MEGAFACE F-430, MEGAFACE F-444, MEGAFACE F-4725F, MEGAFACE F-475, MEGAFACE F-477, MEGAFACE F-552, MEGAFACE F-553, MEGAFACE F-554, MEGAFACE F-555, MEGAFACE F-556, MEGAFACE F-558, MEGAFACE F-559, MEGAFACE R-30, MEGAFACE R-94, MEGAFACE RS-75, MEGAFACE RS-72-K, MEGAFACE RS-76-NS and MEGAFACE DS-21 (trade names for all; DIC Corporation), TEGO Twin 4000, TEGO Twin 4100, TEGO Flow 370, TEGO Glide 420, TEGO Glide 440, TEGO Glide 450, TEGO Rad 2200N and TEGO Rad 2250N (trade names for all; Evonik Japan Co., Ltd.), fluoroalkyl benzenesulfonate, fluoroalkyl carboxylate, fluoroalkyl polyoxyethylene ether, fluoroalkyl ammonium iodide, fluoroalkyl betaine, fluoroalkyl sulfonate, diglyceroltetrakis(fluoroalkyl polyoxyethylene ether), fluoroalkyl trimethylammonium salt, fluoroalkyl aminosulfonate, polyoxyethylene nonylphenyl ether, polyoxyethylene octylphenyl ether, polyoxyethylene alkyl ether, polyoxyethylene lauryl ether, polyoxyethylene oleyl ether, polyoxyethylene tridecyl ether, polyoxyethylene cetyl ether, polyoxyethylene stearyl ether, polyoxyethylene laurate, polyoxyethylene oleate, polyoxyethylene stearate, polyoxyethylene laurylamine, sorbitan laurate, sorbitan palmitate, sorbitan stearate, sorbitan oleate, sorbitan fatty acid ester, polyoxyethylene sorbitan laurate, polyoxyethylene sorbitan palmitate, polyoxyethylene sorbitan stearate, polyoxyethylene sorbitan oleate, polyoxyethylene naphthyl ether, alkylbenzene sulfonate and alkyl diphenyl ether disulfonate. At least one selected from the above-described compounds is preferably used.

The thermosetting polymer composition containing any of such a surfactant is preferred as BYK306, BYK342, BYK346, KP-341, KP-358, KP-368, SURFLON 5611, Futargent 710FL, Futargent 710FM, Futargent 710FS, Futargent 650A, MEGAFACE F-477, MEGAFACE F-556, MEGAFACE RS-72-K, MEGAFACE DS-21, and TEGO Twin 4000, and because uniformity in applying the composition is improved, such a surfactant as fluoroalkyl benzenesulfonate, fluoroalkyl carboxylate, fluoroalkyl polyoxyethylene ether, fluoroalkyl sulfonate, fluoroalkyl trimethylammonium salt and fluoroalkyl aminosulfonate.

A content of the surfactant in the thermosetting polymer composition of the invention is preferably about 0.01 to about 10% by weight based on the total amount of the thermosetting polymer composition.

The thermosetting polymer composition of the invention may further contain an adhesion improver from a viewpoint of further improving the adhesion between the insulating film to be formed and the substrate. As an example of such an adhesion improver, a silane-based, aluminum-based or titanate-based coupling agent can be used. Specific examples thereof include a silane-based coupling agent such as 3-glycidyloxypropyldimethylethoxysilane, 3-glycidyloxypropylmethyldiethoxysilane, 3-glycidyloxypropyltrimethoxysilane (for example, Sila-Ace S510; trade name; JNC Corporation), 2-(3,4-epoxycyclohexyl)ethyltrimethoxysilane (for example, Sila-Ace 5530; trade name; JNC Corporation), and 3-mercaptopropyltrimethoxysilane (for example, Sila-Ace 5810; trade name; JNC Corporation); an aluminum-based coupling agent such as acetoalkoxyaluminumdiisopropylate; and a titanate-based coupling agent such as tetraisopropylbis(dioctylphosphite)titanate.

Among the above-described compounds, 3-glycidyloxypropyltrimethoxysilane is preferred because an effect of improving the adhesion is large.

A content of the adhesion improver is preferably about 0.01% by weight or more and about 10% by weight or less based on the total amount of the thermosetting polymer composition.

The thermosetting polymer composition of the invention may further contain an antioxidant from viewpoints of improving the transparency and preventing yellowing when the insulating film is exposed to a high temperature.

The antioxidant such as a hindered phenol-based, hindered amine-based, phosphorus-based or sulfur-based compound may be added to the thermosetting polymer composition of the invention. Among the above-described compounds, a hindered phenol-based compound is preferred from a viewpoint of light resistance. Specific examples thereof include Irganox 1010, Irganox FF, Irganox 1035, Irganox 1035FF, Irganox 1076, Irganox 1076FD, Irganox 1076DWJ, Irganox 1098, Irganox 1135, Irganox 1330, Irganox 1726, Irganox 1425WL, Irganox 1520L, Irganox 245, Irganox 245FF, Irganox 245DWJ, Irganox 259, Irganox 3114, Irganox 565, Irganox 565DD, Irganox 295 (trade names for all; BASF Japan Ltd.), ADK STAB AO-20, ADK STAB AO-30, ADK STAB AO-50, ADK STAB AO-60, ADK STAB AO-70 and ADK STAB AO-80 (trade names for all; ADEKA Corporation). Among the above-described compounds, Irganox 1010 or ADK STAB AO-60 is further preferred.

For improving durability of the insulating film, the antioxidant is preferred added in about 0.1 to about 5 parts by weight of based on the total amount of the thermosetting polymer composition.

Method for Forming an Insulating Film

The thermosetting polymer composition can be obtained by mixing polyester amide acid, an epoxy compound and a solvent, and depending on intended characteristics, selecting and adding an epoxy curing agent, a coupling agent and a surfactant when necessary, and uniformly mixing and dissolving the above-described materials.

A coating film can be formed when the thermosetting polymer composition is applied onto a surface of a member, and the solvent is removed. The solvent can be removed by heating or the like. The coating film of the thermosetting polymer composition on the surface of the member can be formed according to a spin coating method, a roll coating method, a dipping method, a slit coating method or the like. Then, the coating film is temporarily calcined by using a hot plate or an oven or the like. Preliminary calcination conditions are different depending on a kind and a blending ratio of each component. Preliminary calcination is ordinarily performed at about 70 to about 150° C. A time for the preliminary calcination using the oven is about 5 to about 15 minutes. A time of the preliminary calcination using the hot plate is about 1 to about 5 minutes. Then, main calcination is performed for curing the coating film. Main calcination conditions are different depending on a kind and a blending ratio of each component. The main calcination is ordinarily performed at about 180 to about 250° C., and preferably about 200 to about 250° C. A time for the main calcination using the oven is preferably about 30 to about 90 minutes, and preferably about 5 to about 30 minutes if the hot plate is used. The thermosetting polymer composition is processed into the insulating film by the main calcination.

In the insulating film, during heating, 1) a polyamide acid part of polyester amide acid is subjected to cyclodehydration to form an imide bond, 2) carboxylic acid of polyester amide acid reacts with an epoxy compound to increase molecular weight, and 3) the epoxy compound is cured to increase molecular weight, and therefore the insulating film is significantly tough, and is excellent in the transparency, the heat resistance, the chemical resistance, the flatness and the adhesion. Moreover, the insulating film is expected to be also excellent in the light resistance, spattering resistance, the scratch resistance and the applicability for the similar reason.

Liquid Crystal Composition

The liquid crystal layer of the invention includes the liquid crystal composition. The composition is classified into composition A and composition B. Composition A may further contain any other liquid crystal compound, an additive or the like in addition to the liquid crystal compound selected from compound (3) and compound (4). A term "any other liquid crystal compound" means a liquid crystal compound different from compound (3) and compound (4), and a liquid crystal compound such as compound (5), for example. Such a compound is mixed with the composition for the purpose of further adjusting the characteristics. Specific examples of the additive include an optically active compound, an antioxidant, an ultraviolet light absorber, a dye, an antifoaming agent, a polymerizable compound, a polymerization initiator and a polymerization inhibitor.

The liquid crystal composite can be obtained by polymerization of the polymerizable composition. An additive may be added to the polymerizable composition. Specific examples of the additive include a photopolymerization initiator and a polar compound.

The liquid crystal composite containing the liquid crystal composition having positive dielectric anisotropy is suitable for a normal mode light control device that is opaque during no voltage application and is transparent during voltage application. The liquid crystal composite containing the liquid crystal composition having negative dielectric anisotropy is suitable for a reverse mode light control device that is transparent during no voltage application and is opaque during voltage application. From a viewpoint of transparency of the liquid crystal light control device, optical anisotropy ($\Delta n$) of the liquid crystal compound in the liquid crystal composition is preferably 0.16 or more, and further preferably 0.18 or more.

In the liquid crystal layer of the polymer-dispersed liquid crystal device, droplets of the composition are dispersed in the polymer. Each droplet is not continued in a long distance.

In the liquid crystal layer of the polymer-network liquid crystal device, the composition contains the polymer having a three-dimensional network structure, the liquid crystal composition and the like. The liquid crystal composition is continued in the long distance.

A proportion of the liquid crystal composition is preferably about 50% by weight to about 95% by weight based on the weight of the liquid crystal composite for effective light scattering.

Table 1 describes features of compounds (3) to (5) being components of the liquid crystal composition. In Table 1, a symbol L stands for "large" or "high," a symbol M stands for "medium" and a symbol S stands for "small" or "low." The symbols L, M and S are classification based on qualitative comparison of the components. Zero (0) means that a value is zero or close to zero.

TABLE 1

| Compound | Compound (3) | Compound (4) | Compound (5) |
|---|---|---|---|
| Maximum temperature | S to L | S to L | S to L |
| Viscosity | M to L | M to L | S to M |
| Optical anisotropy | M to L | M to L | S to L |
| Dielectric anisotropy | S to L | M to L[1)] | 0 |
| Specific resistance | L | L | L |

[1)]A value of dielectric anisotropy is negative and a symbol shows a magnitude of an absolute value.

Compound (3) positively increases the dielectric anisotropy of the liquid crystal composition. Compound (4) negatively increases the dielectric anisotropy of the liquid crystal composition. Compound (5) decreases the viscosity of the liquid crystal composition. Compound (6) that is not described in Table 1 polymerizes the liquid crystal composition by polymerization.

A preferred combination of the components in the composition include a combination of compound (3) and compound (5), a combination of compound (4) and compound (5), a combination of compound (3), compound (5) and compound (6) or a combination of compound (4), compound (5) and compound (6). A further preferred combination includes a combination of compound (3), compound (5) and compound (6) or a combination of compound (4), compound (5) and compound (6).

For positively increasing the dielectric anisotropy and decreasing the minimum temperature, a proportion of compound (3) based on the total amount of the liquid crystal composition is preferably about 5% by weight to about 90% by weight or less, and further preferably about 20% by weight to about 80% by weight.

A preferred proportion of compound (4) based on the total amount of the liquid crystal composition is about 5% or more for negatively increasing the dielectric anisotropy, and about 90% by weight or less for decreasing the minimum temperature. A further preferred proportion is in the range of about 20% by weight to about 80% by weight.

A preferred proportion of compound (5) based on the total amount of the liquid crystal composition is about 10% by weight or more for decreasing the viscosity, and about 90% by weight or less for adjusting the dielectric anisotropy. A further preferred proportion is in the range of about 20% by weight to about 60% by weight.

In a proportion of compound (6) based on the total amount of the liquid crystal composition, compound (6) is added to the composition mainly for the purpose of adapting the composition to the liquid crystal device utilizing light control. A preferred proportion of the additive is in the range of about 5% by weight to about 40% by weight.

In formula (3), formula (4) and formula (5), $R^4$, $R^5$ and $R^6$ are independently alkyl having 1 to 12 carbons, alkoxy having 1 to 12 carbons or alkenyl having 2 to 12 carbons, and $R^7$ and $R^8$ are independently alkyl having 1 to 12 carbons, alkoxy having 1 to 12 carbons, alkenyl having 2 to 12 carbons, or alkenyl having 2 to 12 carbons in which at least one hydrogen is replaced by fluorine or chlorine. Preferred $R^4$, $R^5$, $R^6$ or $R^7$ is alkyl having 1 to 12 carbons for increasing stability to ultraviolet light and heat, and alkoxy having 1 to 12 carbons for increasing the dielectric anisotropy. Preferred $R^8$ is alkenyl having 2 to 12 carbons for decreasing the viscosity, and alkyl having 1 to 12 carbons for increasing the stability to ultraviolet light and heat. Alkyl is straight-chain alkyl or branched-chain alkyl, but includes no cyclic alkyl. Straight-chain alkyl is preferred to branched-chain alkyl. A same rule applies also to a terminal group of alkoxy, alkenyl or the like.

For decreasing the viscosity, $R^4$, $R^5$ $R^6$ or $R^7$ is preferably alkyl, methyl, ethyl, propyl, butyl, pentyl, hexyl, heptyl, octyl, methoxy, ethoxy, propoxy, butoxy, pentyloxy, hexyloxy, heptyloxy, vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl or 5-hexenyl, 1-propenyl, 3-butenyl, 3-pentenyl, 2,2-difluorovinyl, 3,3-difluoro-2-propenyl, 4,4-difluoro-3-butenyl, 5,5-difluoro-4-pentenyl or 6,6-difluoro-5-hexenyl, and further preferably methyl, ethyl, propyl, butyl, pentyl, methoxy, ethoxy, vinyl, 1-propenyl, 3-butenyl, 3-pentenyl, 2-fluoroethyl, 3-fluoropropyl, 4-fluorobutyl or 5-fluoropentyl.

From a viewpoint of decreasing the viscosity, or the like, $R^4$, $R^5$, $R^6$ or $R^7$ is preferably 1-propenyl, 1-butenyl, 1-pentenyl, 1-hexenyl, 3-pentenyl, or 3-hexenyl, which is trans, 2,2-difluorovinyl, 3,3-difluoro-2-propenyl, 4,4-difluoro-3-butenyl, 5,5-difluoro-4-pentenyl or 6,6-difluoro-5-hexenyl, and further preferably 2,2-difluorovinyl or 4,4-difluoro-3-butenyl. From a viewpoint of decreasing the viscosity, or the like, alkenyl such as 2-butenyl, 2-pentenyl and 2-hexenyl of $R^4$, $R^5$, $R^6$ or $R^7$ is preferably cis.

Ring A is 1,4-cyclohexylene, 1,4-phenylene, 2-fluoro-1,4-phenylene, 2,3-difluoro-1,4-phenylene, 2,6-difluoro-1,4-phenylene, pyrimidine-2,5-diyl, 1,3-dioxane-2,5-diyl or tetrahydropyran-2,5-diyl. Preferred ring A is 1,4-phenylene or 2-fluoro-1,4-phenylene for increasing the optical anisotropy.

Ring B and ring D are independently 1,4-cyclohexylene, 1,4-cyclohexenylene, 1,4-phenylene, 1,4-phenylene in which at least one hydrogen is replaced by fluorine or chlorine, or tetrahydropyran-2,5-diyl. Preferred ring B or ring D is 1,4-cyclohexylene for decreasing the viscosity, tetrahydropyran-2,5-diyl for increasing the dielectric anisotropy, and 1,4-phenylene for increasing the optical anisotropy. Tetrahydropyran-2,5-diyl is:

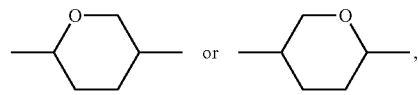

and preferably

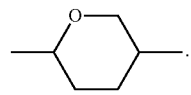

Ring C is typically 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl. Ring C is preferably 2,3-difluoro-1,4-phenylene for decreasing the viscosity. Ring C is 2-chloro-3-fluoro-1,4-phenylene for decreasing the optical anisotropy, and ring C is 7,8-difluorochroman-2,6-diyl for increasing the dielectric anisotropy.

Ring E and ring F are typically independently 1,4-cyclohexylene, 1,4-phenylene, 2-fluoro-1,4-phenylene or 2,5-difluoro-1,4-phenylene. Preferred ring D and ring E are preferably 1,4-cyclohexylene or 1,4-phenylene for decreasing the viscosity or increasing the maximum temperature. With regard to a configuration of 1,4-cyclohexylene, trans is preferred for increasing the maximum temperature.

$Z^1$ is typically a single bond, ethylene, carbonyloxy or difluoromethyleneoxy. $Z^1$ is preferably a single bond for increasing the maximum temperature. $Z^1$ is preferably difluoromethyleneoxy for increasing the dielectric anisotropy. $Z^2$ and $Z^3$ are typically independently a single bond, —CH$_2$CH$_2$—, carbonyloxy or methyleneoxy. $Z^2$ and $Z^3$ are preferably a single bond for decreasing the viscosity. $Z^2$ and $Z^3$ are preferably —CH$_2$CH$_2$— for decreasing the minimum temperature. $Z^2$ and $Z^3$ are preferably methyleneoxy for increasing the dielectric anisotropy. $Z^4$ is typically a single bond, ethylene or carbonyloxy. $Z^4$ is preferably a single bond for increasing the stability to light and heat.

Then, a is 1, 2, 3 or 4. Preferred a is 2 for decreasing the minimum temperature, and is 3 for increasing the dielectric anisotropy. Then, b is 1, 2 or 3, and c is 0 or 1, and a sum of b and c is 3 or less. Preferred b is 1 for decreasing the viscosity, and 2 or 3 for increasing the maximum temperature. Preferred c is 0 for decreasing the viscosity, and 1 for decreasing the minimum temperature. Then, d is 1, 2 or 3. Preferred d is 1 for decreasing the viscosity, and 2 or 3 for increasing the maximum temperature.

$X^1$ and $X^2$ are independently hydrogen or fluorine. $X^1$ and $X^2$ are preferably hydrogen for increasing the maximum temperature. $X^1$ and $X^2$ are preferably fluorine for increasing the dielectric anisotropy.

$Y^1$ is fluorine, chlorine, cyano, alkyl having 1 to 12 carbons in which at least one hydrogen is replaced by fluorine or chlorine, alkoxy having 1 to 12 carbons in which at least one hydrogen is replaced by fluorine or chlorine, or alkenyloxy having 2 to 12 carbons in which at least one hydrogen is replaced by fluorine or chlorine. Preferred $Y^1$ is fluorine for decreasing the viscosity, and cyano for increasing the dielectric anisotropy.

In formula (6), $P^1$, $P^2$ and $P^3$ are independently a polymerizable group. Preferred $P^1$, $P^2$ or $P^3$ is preferably a group represented by formula (P-1) to formula (P-6), further preferably a group represented by formula (P-1), formula (P-2) or formula (P-3), particularly preferably a group represented by formula (P-1) or formula (P-2), and most preferably a group represented by formula (P-1). In the case of formula (P-1), —OCO—CH=CH$_2$ or —OCO—C(CH$_3$)=CH$_2$ is most preferred. A wavy line in formula (P-1) to formula (P-6) shows a site to be bonded.

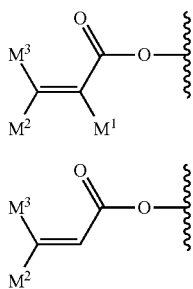

(P-1)

(P-2)

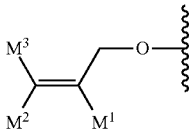

(P-3)

(P-4)

(P-5)

(P-6)

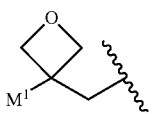

In formula (P-1) to formula (P-6), $M^1$, $M^2$ and $M^3$ are typically independently hydrogen, fluorine, alkyl having 1 to 5 carbons, or alkyl having 1 to 5 carbons in which at least one hydrogen is replaced by fluorine or chlorine. $M^1$ is preferably hydrogen or methyl for increasing reactivity. $M^2$ and $M^3$ are preferably methyl and further preferably hydrogen for increasing the reactivity.

$Z^5$ is alkylene having 1 to 20 carbons, and in the alkylene, at least one hydrogen may be replaced by alkyl having 1 to 5 carbons, and at least one piece of —CH$_2$— may be replaced by —O—, and at least one piece of —CH$_2$— may be replaced by a divalent saturated aliphatic hydrocarbon ring or a divalent aromatic hydrocarbon ring, and in the divalent groups, the number of carbons is 5 to 35. $Z^5$ is preferably alkylene having 1 to 20 carbons, and in the alkylene, at least one hydrogen may be replaced by alkyl having 1 to 5 carbons, and at least one piece of —CH$_2$— may be replaced by —O—.

Compound (3) in the liquid crystal composition is preferably compound (3-1) to compound (3-47) described below for increasing the dielectric anisotropy, and further preferably compound (3-1), compound (3-2), compound (3-3), compound (3-8), compound (3-9), compound (3-13), compound (3-16), compound (3-21), compound (3-22), compound (3-23), compound (3-24), compound (3-27), compound (3-28), compound (3-33), compound (3-36), compound (3-41) or compound (3-42).

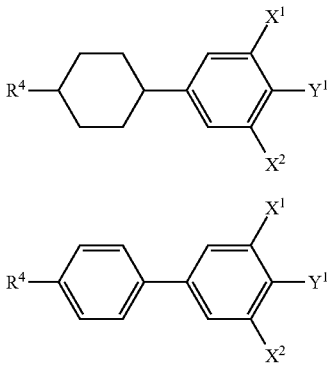

(3-1)

(3-2)

(3-3) 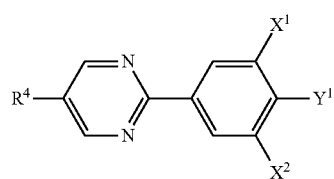
(3-4) 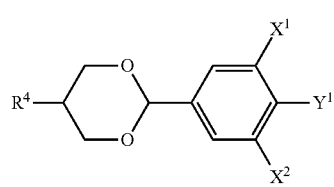
(3-5) 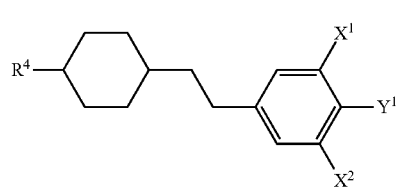
(3-6) 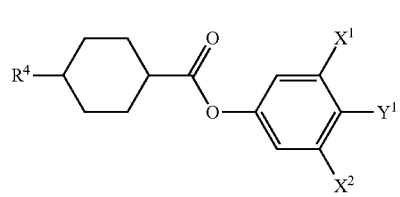
(3-7) 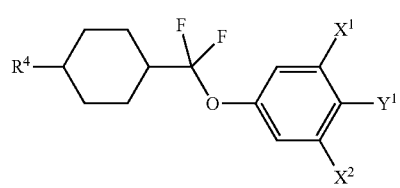
(3-8) 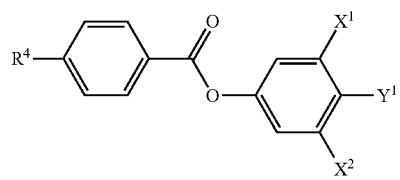
(3-9) 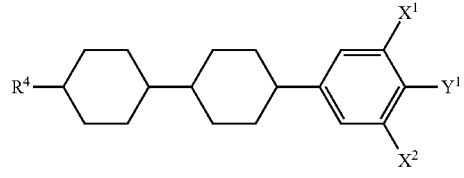
(3-10) 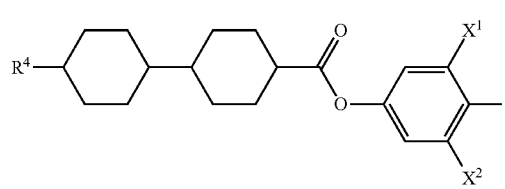
(3-11) 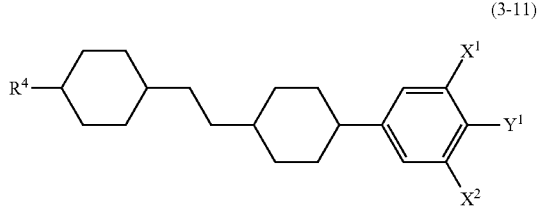
(3-12) 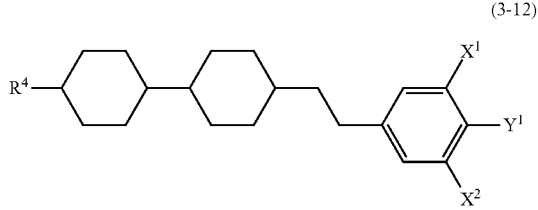
(3-13) 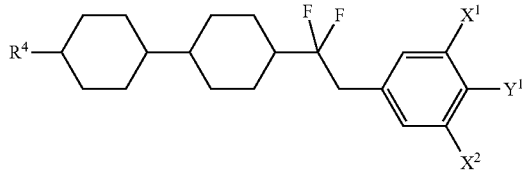
(3-14) 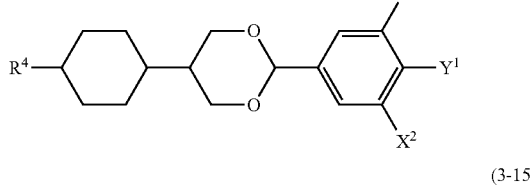
(3-15) 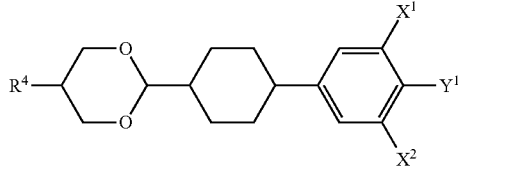
(3-16) 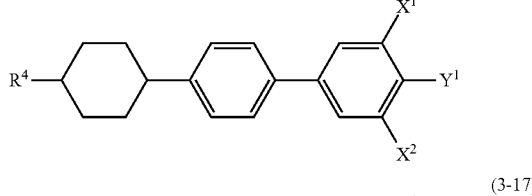
(3-17) 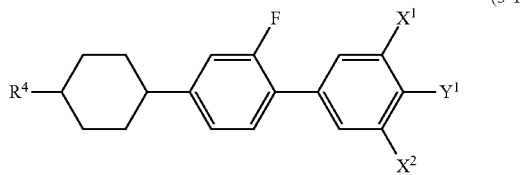
(3-18) 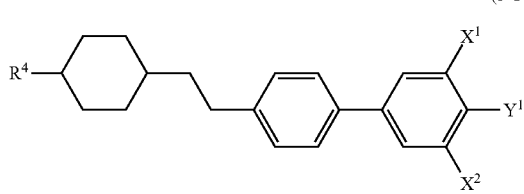

(3-19) 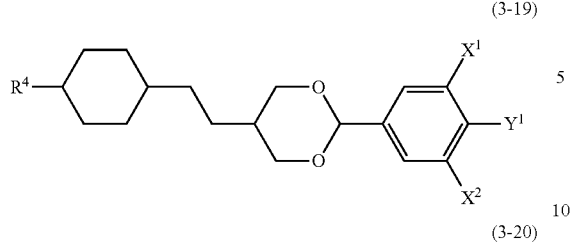
(3-20) 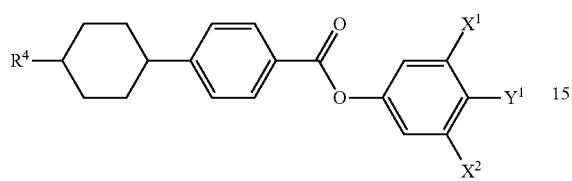
(3-21) 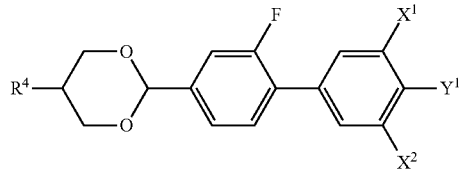
(3-22) 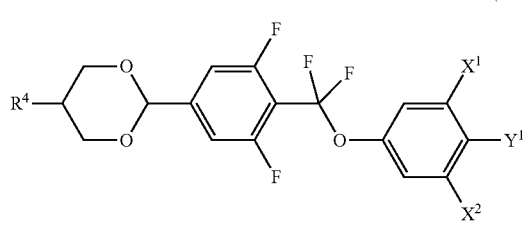
(3-23) 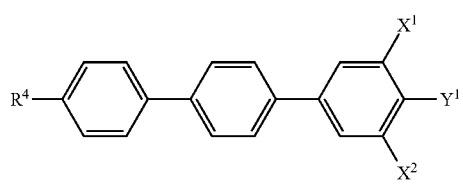
(3-24) 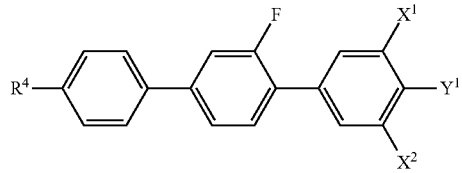
(3-25) 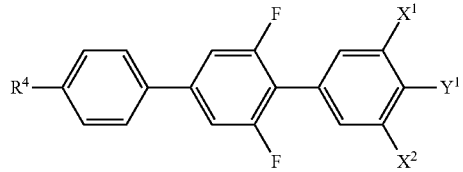
(3-26) 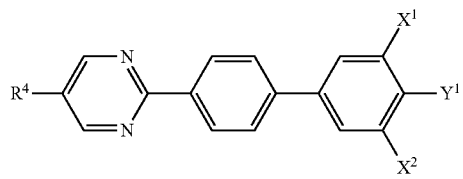
(3-27) 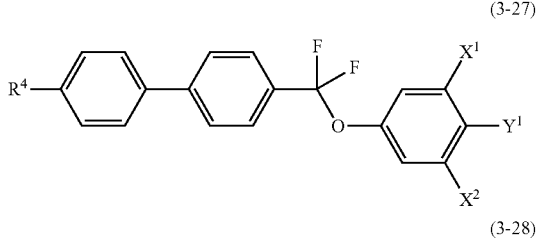
(3-28) 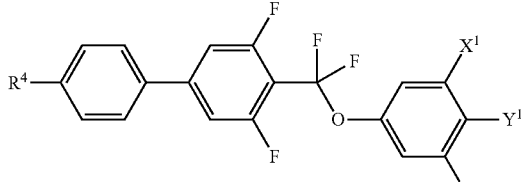
(3-29) 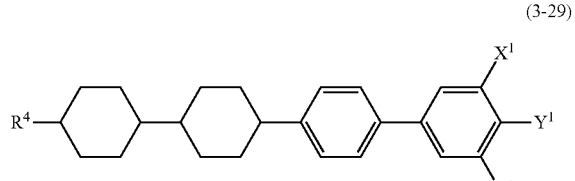
(3-30) 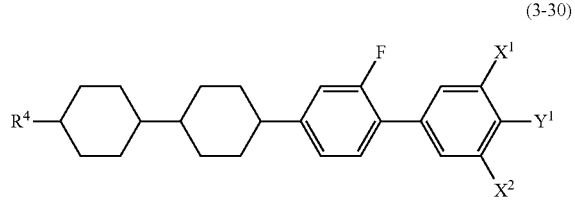
(3-31) 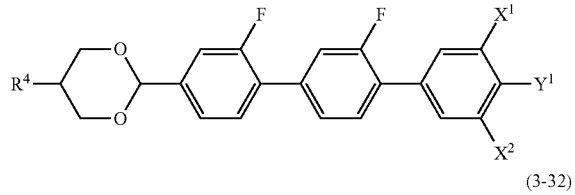
(3-32) 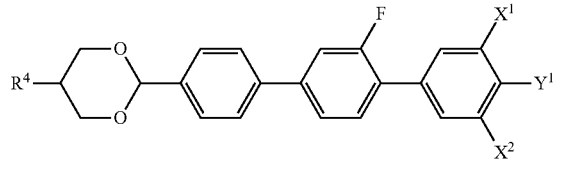
(3-33) 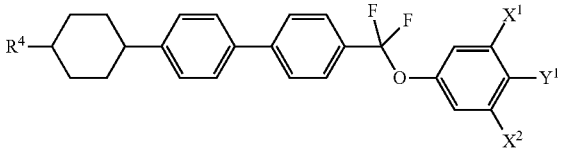
(3-34) 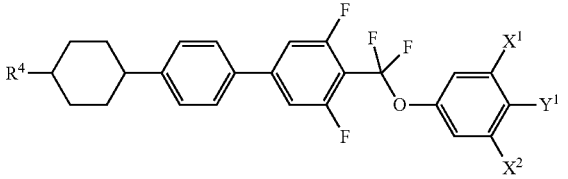

(3-35)
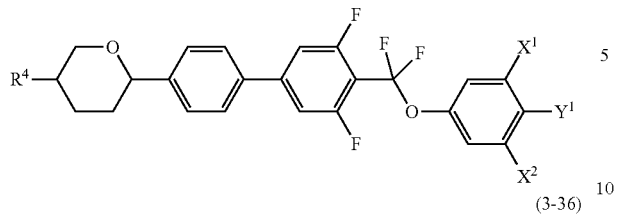

(3-36)
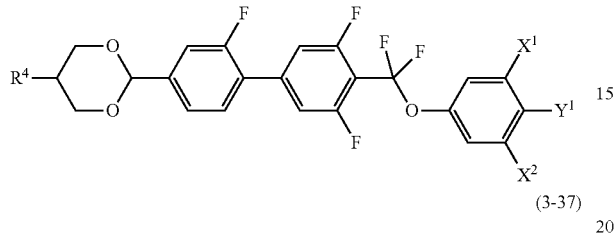

(3-37)
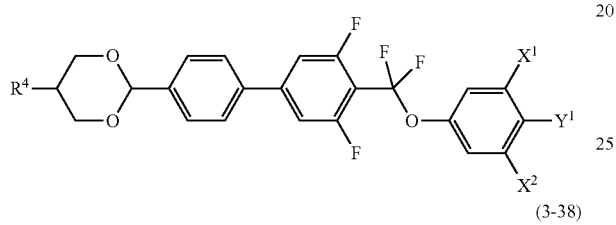

(3-38)
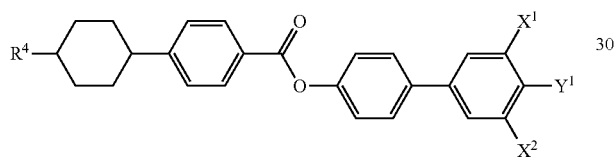

(3-39)
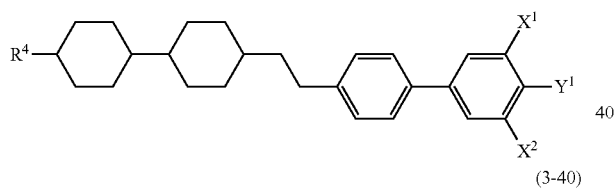

(3-40)
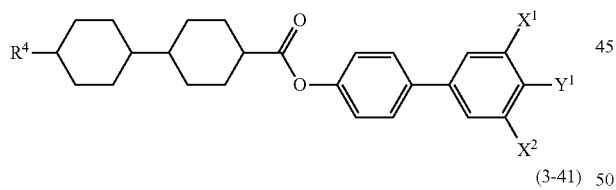

(3-41)
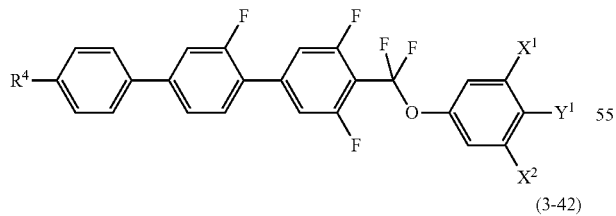

(3-42)
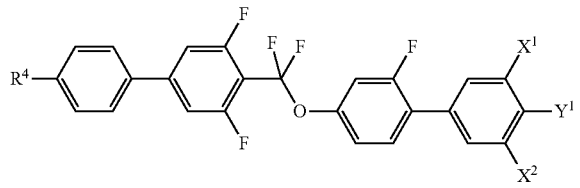

(3-43)
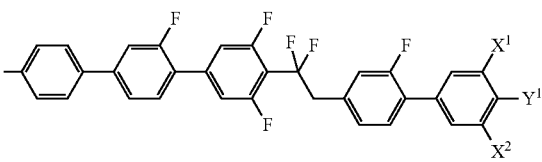

(3-44)
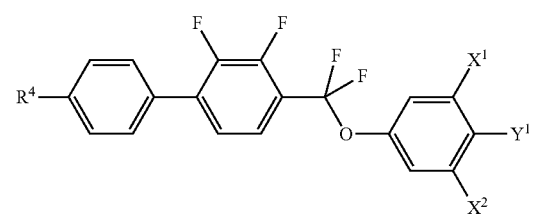

(3-45)
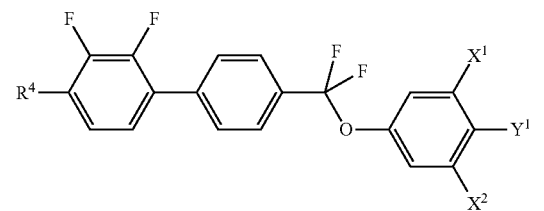

(3-46)
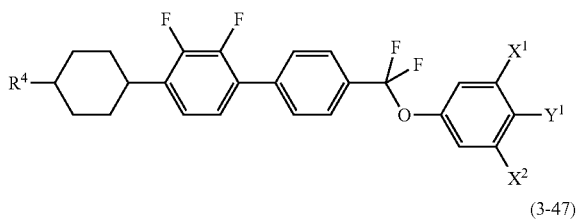

(3-47)
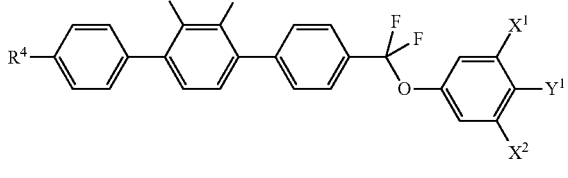

In formula (3-1) to formula (3-47), $R^4$ is alkyl having 1 to 12 carbons, alkoxy having 1 to 12 carbons or alkenyl having 2 to 12 carbons; $X^1$ and $X^2$ are independently hydrogen or fluorine; $Y^1$ is fluorine, chlorine, cyano, alkyl having 1 to 12 carbons in which at least one hydrogen is replaced by fluorine or chlorine, alkoxy having 1 to 12 carbons in which at least one hydrogen is replaced by fluorine or chlorine, or alkenyloxy having 2 to 12 carbons in which at least one hydrogen is replaced by fluorine or chlorine.

Compound (4) in the liquid crystal composition is preferably compound (4-1) to compound (4-22) for negatively increasing the dielectric anisotropy. At least one of second components is preferably compound (4-1), compound (4-2), compound (4-3), compound (4-4), compound (4-6), compound (4-7), compound (4-8), compound (4-9) or compound (4-10).

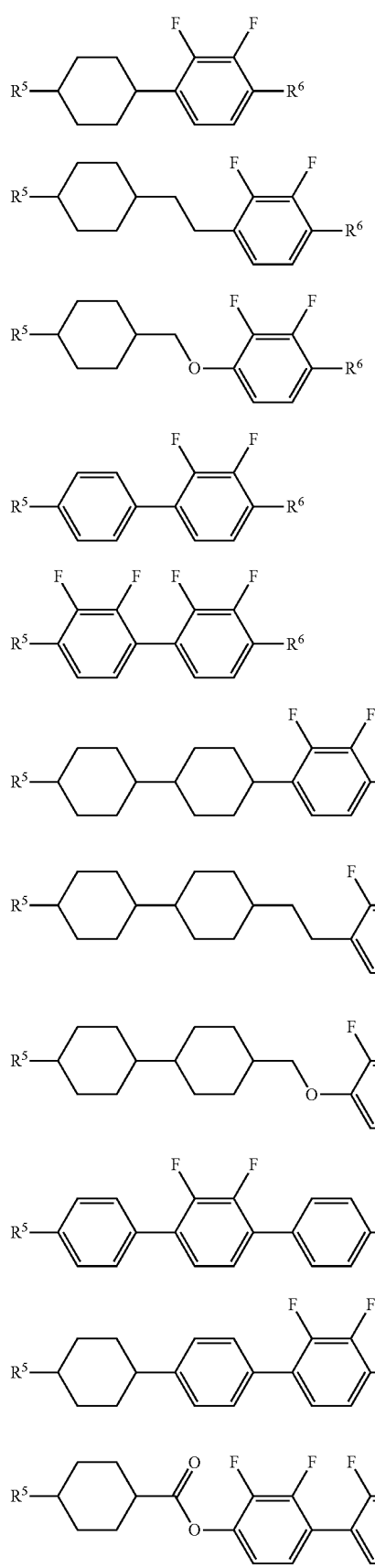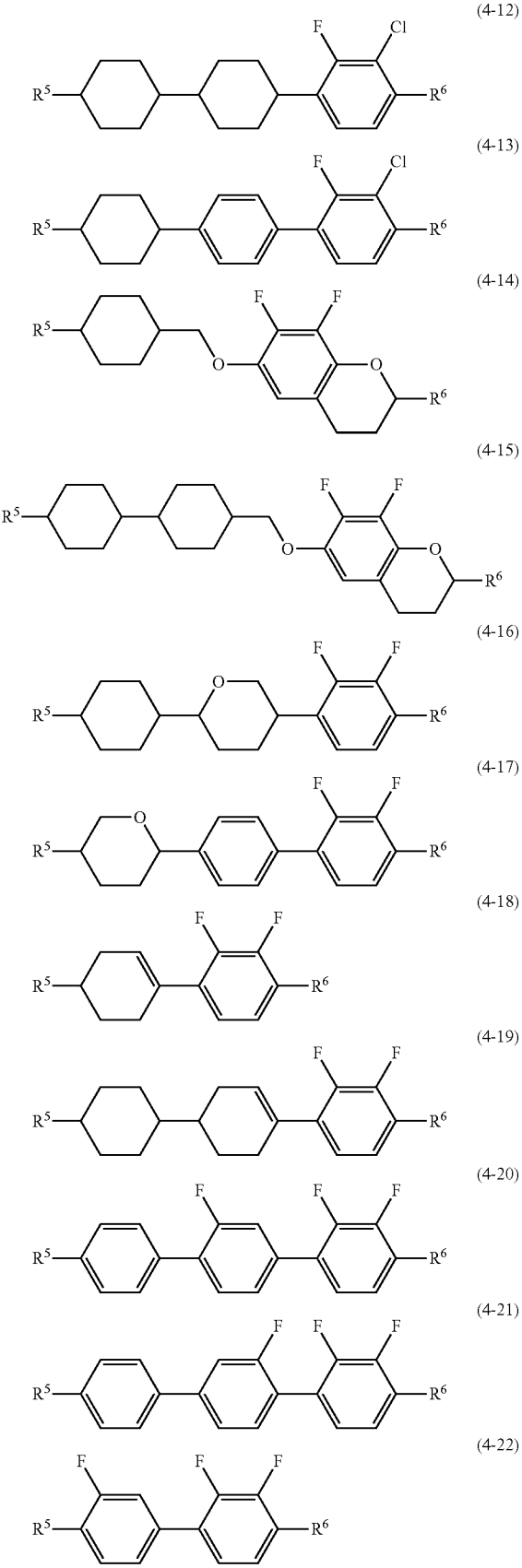

In formula (4-1) to formula (4-22), $R^5$ and $R^6$ are independently alkyl having 1 to 12 carbons, alkoxy having 1 to 12 carbons or alkenyl having 2 to 12 carbons.

Compound (5) in the liquid crystal composition is preferably compound (5-1) to compound (5-23) for decreasing the viscosity of the liquid crystal composition. In the above-described compounds, one of third components is preferably compound (5-1), compound (5-2), compound (5-3), compound (5-5), compound (5-6), compound (5-7), compound (5-8), compound (5-13), compound (5-15), compound (5-16) or compound (5-21).

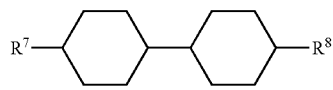
(5-1)

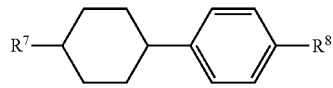
(5-2)

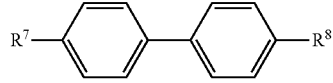
(5-3)

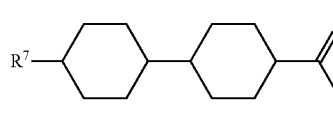
(5-4)

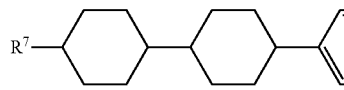
(5-5)

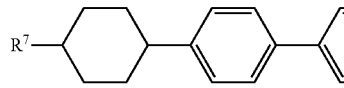
(5-6)

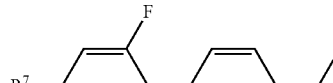
(5-7)

(5-8)

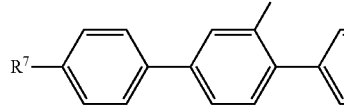
(5-9)

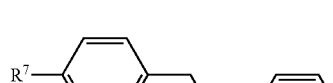
(5-10)

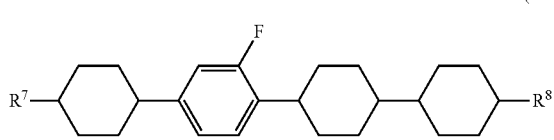
(5-11)

-continued

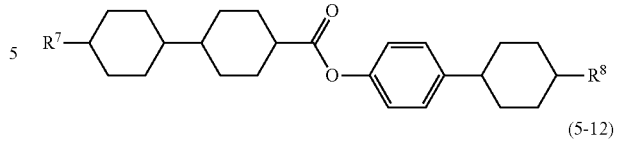
(5-12)

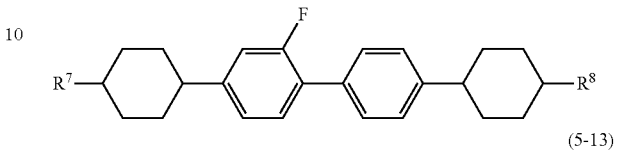
(5-13)

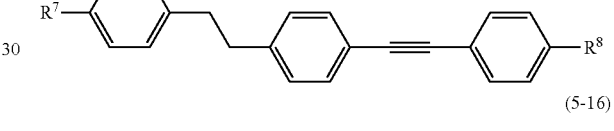
(5-14)

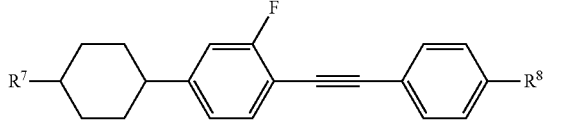
(5-15)

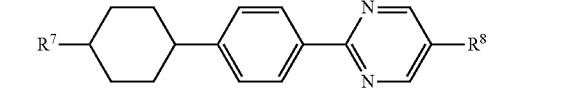
(5-16)

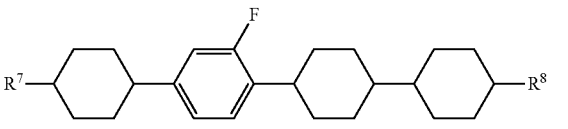
(5-17)

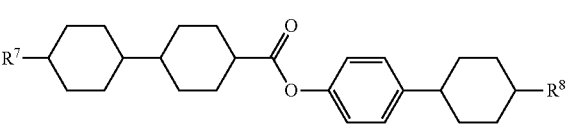
(5-18)

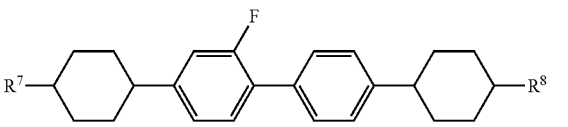
(5-19)

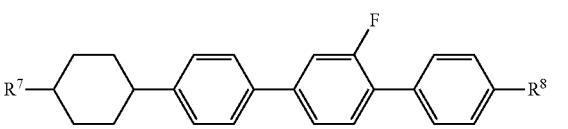
(5-20)

(5-21)

-continued (5-22)
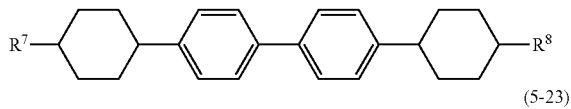

(5-23)
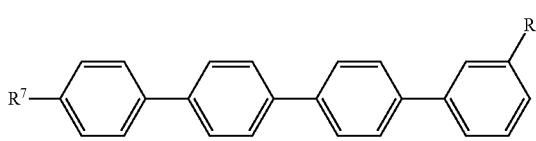

In formula (5-1) to formula (5-23), $R^7$ and $R^8$ are independently alkyl having 1 to 12 carbons, alkoxy having 1 to 12 carbons, alkenyl having 2 to 12 carbons, or alkenyl having 2 to 12 carbons in which at least one hydrogen is replaced by fluorine or chlorine.

Compound (6) is typically compound (7) to compound (11). A polymer is derived from a polymerizable compound. The polymerizable compound in the liquid crystal composition may be a mixture of one or more compounds. Specific examples of a preferred polymerizable compound include compound (7), compound (8), compound (9), compound (10) or compound (11). The polymerizable compound may be a mixture of compounds selected from the group of compound (7) to compound (11). The preferred polymerizable compound contains compound (7), compound (8), compound (9), compound (10), compounds (11) or a mixture thereof in a proportion of about 50% by weight or more.

Specific examples of a preferred polymerizable compound of compound (6) include compound (7).

(7)
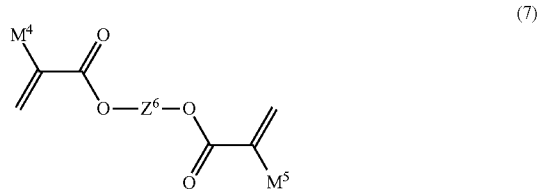

In formula (7), $M^4$ and $M^5$ are independently hydrogen or methyl; and $Z^6$ is alkylene having 20 to 80 carbons, and in the alkylene, at least one hydrogen may be replaced by alkyl having 1 to 20 carbons, fluorine or chlorine, and at least one piece of —$CH_2$— may be replaced by —O—, —CO—, —COO—, —OCO—, —NH—, —N($R^6$)—, —CH=CH— or —C≡C—, in which $R^6$ is alkyl having 1 to 12 carbons, and in the alkyl, at least one piece of —$CH_2$— may be replaced by —O—, —CO—, —COO— or —OCO—.

Specific examples of a preferred polymerizable compound of compound (6) include compound (8).

(8)
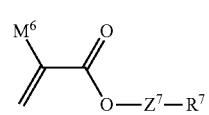

In formula (8), $M^6$ is hydrogen or methyl; $Z^7$ is a single bond or alkylene having 1 to 5 carbons, and in the alkylene, at least one hydrogen may be replaced by fluorine or chlorine, and at least one piece of —$CH_2$— may be replaced by —O—, —CO—, —COO— or —OCO—; and $R^7$ is alkyl having 1 to 20 carbons, and in the alkyl, at least one hydrogen may be replaced by fluorine or chlorine, and at least one piece of —$CH_2$— may be replaced by —O—, —CO—, —COO— or —OCO—, and at least one hydrogen may be replaced by alkyl having 1 to 12 carbons, and in the alkyl, at least one piece of —$CH_2$— may be replaced by —O—, —CO—, —COO— or —OCO—.

Specific examples of a preferred polymerizable compound of compound (6) include compound (9), compound (10) and compound (11).

(9)
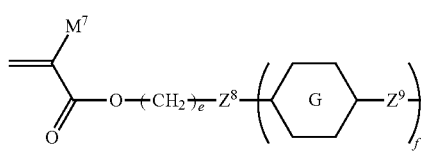

(10)
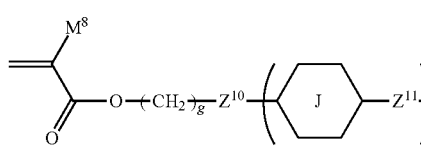

(11)
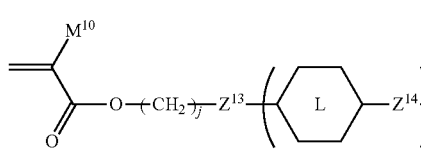

In formula (9), formula (10) and formula (11), ring G, ring I, ring J, ring K, ring L and ring M are independently 1,4-cycloxylene, 1,4-phenylene, 1,4-cyclohexenylene, pyridine-2,5-diyl, 1,3-dioxane-2,5-diyl, naphthalene-2,6-diyl or fluorene-2,7-diyl, and in the divalent groups, at least one hydrogen may be replaced by fluorine, chlorine, cyano, hydroxy, formyl, trifluoroacetyl, difluoromethyl, trifluoromethyl, alkyl having 1 to 5 carbons, alkoxy having 1 to 5 carbons, alkoxycarbonyl having 2 to 5 carbons or alkanoyl having 1 to 5 carbons; $Z^8$, $Z^{10}$, $Z^{12}$, $Z^{13}$ and $Z^{17}$ are independently a single bond, —O—, —COO—, —OCO— or —OCOO—; $Z^9$, $Z^{11}$, $Z^{14}$ and $Z^{16}$ are independently a single bond, —OCH$_2$—, —CH$_2$O—, —COO—, —OCO—, —COS—, —SCO—, —OCOO—, —CONH—, —NHCO—, —CF$_2$O—, —OCF$_2$—, —CH$_2$CH$_2$—, —CF$_2$CF$_2$—, —CH=CHCOO—, —OCOCH=CH—, —CH$_2$CH$_2$COO—, —OCOCH$_2$CH$_2$—, —CH=CH—, —N=CH—, —CH=N—, —N=C(CH$_3$)—, —C(CH$_3$)=N—, —N=N— or —C≡C—; $Z^{15}$ is a single bond, —O— or —COO—; $Y^2$ is hydrogen, fluorine, chlorine, trifluoromethyl, trifluoromethoxy, cyano, alkyl having 1 to 20 carbons, alkenyl having 2 to 20 carbons, alkoxy having 1 to 20 carbons or alkoxycarbonyl having 2 to 20 carbons; f and h are an integer from 1 to 4; k and m are independently an integer from 0 to 3; a sum of k and m is 1 to 4; e, g, i, j, l and n are independently an integer from 0 to 20; and $M^7$ to $M^{12}$ are independently hydrogen or methyl.

Compound (7) is preferably compound (7-1) to compound (7-3), compound (7-4) and compound (7-4-1) and compound (7-4-2).

In formula (7-1), n is an integer from 1 to 6, and in formula (7-2), m is an integer from 5 to 20.

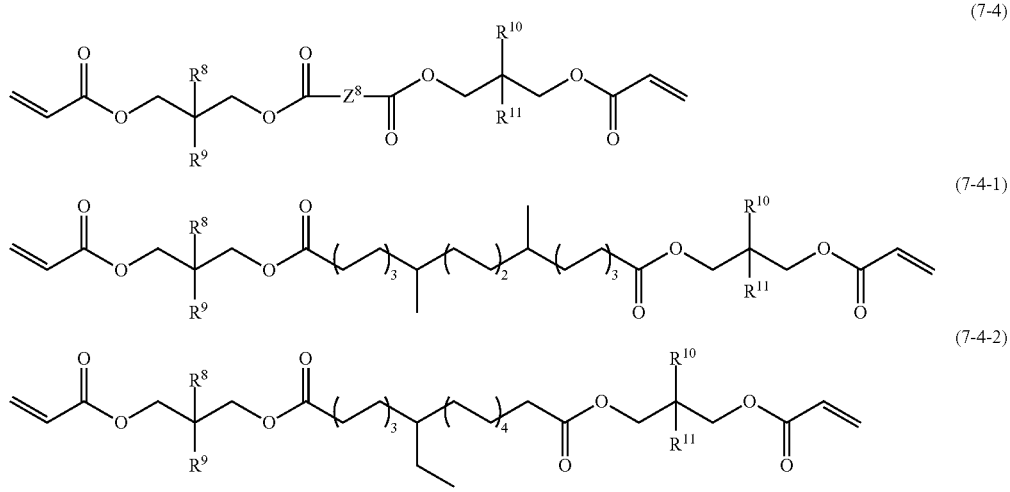

In formula (7-4), $R^8$ and $R^{10}$ are independently alkyl having 1 to 5 carbons, and $R^9$ and $R^{11}$ are independently alkyl having 5 to 20 carbons, and in the alkyl, at least one piece of —CH$_2$— may be replaced by —O—, —CO—, —COO— or —OCO—, and $Z^8$ is alkylene having 10 to 30 carbons, and in the alkylene, at least one piece of —CH$_2$— may be replaced by —O—, —CO—, —COO— or —OCO—.

In formula (7-4-1) and formula (7-4-2), for example, $R^8$ and $R^{10}$ are ethyl, and $R^9$ and $R^{11}$ are independently —CH$_2$OCOC$_9$H$_{19}$, —CH$_2$OCOC$_{10}$H$_{21}$, —CH$_2$OC$_8$H$_{17}$ or —CH$_2$OC$_{11}$H$_{23}$. Compound (8) is preferably compound (8-1) to compound (8-6).

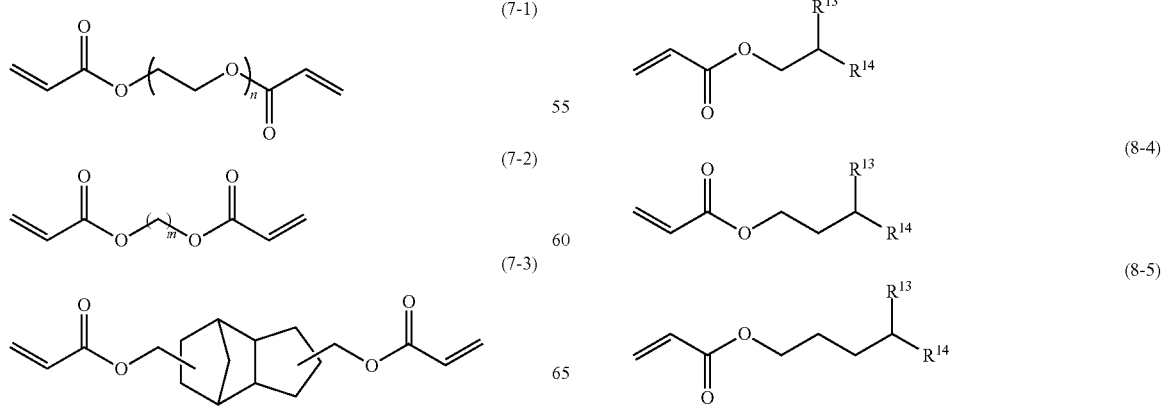

-continued (8-6)

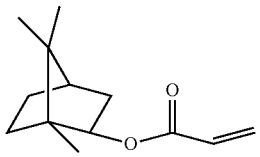

In formula (8-1) to formula (8-5), $R^{12}$ is alkyl having 5 to 20 carbons, and in the alkyl, at least one piece of —$CH_2$— may be replaced by —O—, —CO—, —COO— or —OCO—, and $R^{13}$ and $R^{14}$ are independently alkyl having 3 to 10 carbons, and in the alkyl, at least one piece of —$CH_2$— may be replaced by —O—, —CO—, —COO— or —OCO—.

In formula (9), formula (10) and formula (11), ring G, ring I, ring J, ring K, ring L and ring M are preferably 2-fluoro-1,4-phenylene, 2-methyl-1,4-phenylene, 2-methoxy-1,4-phenylene or 2-trifluoromethyl-1,4-phenylene, and further preferably 1,4-cycloxylene or 1,4-phenylene.

Preferred $Z^8$, $Z^{10}$, $Z^{12}$, $Z^{13}$ or $Z^{17}$ is a single bond or —O—. Preferred $Z^9$, $Z^{11}$, $Z^{14}$ or $Z^{16}$ is a single bond, —$OCH_2$—, —$CH_2O$—, —COO—, —OCO—, —$CH_2CH_2$—, —$CH_2CH_2COO$— or —$OCOCH_2CH_2$—.

Preferred $Y^2$ is cyano, alkyl or alkoxy.

One example of compound (9) includes compound (9-1) to compound (9-24).

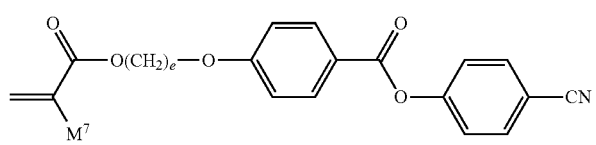
(9-1)

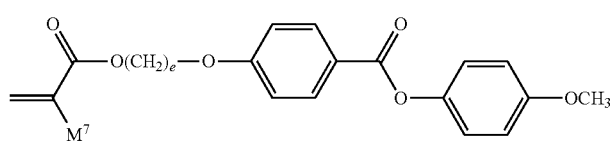
(9-2)

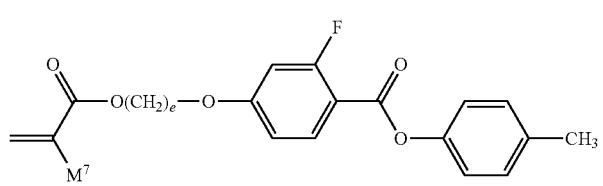
(9-3)

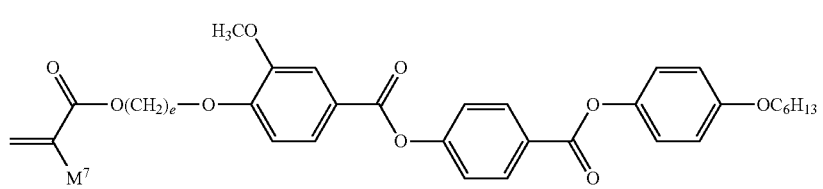
(9-4)

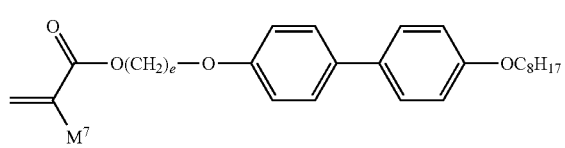
(9-5)

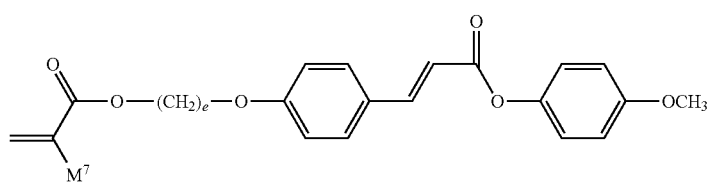
(9-6)

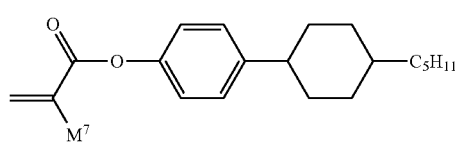
(9-7)

-continued
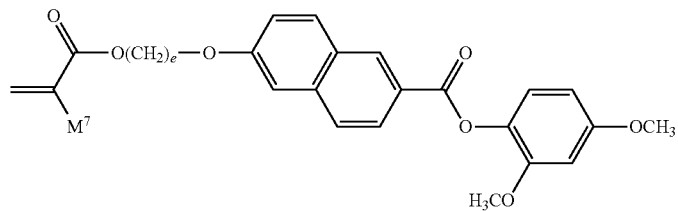
(9-8)
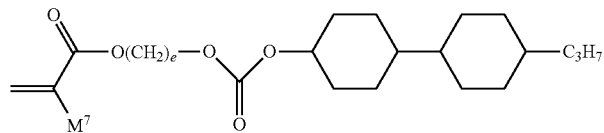
(9-9)
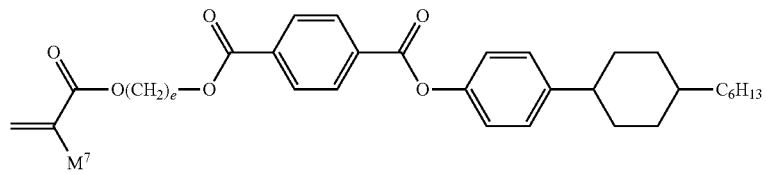
(9-10)
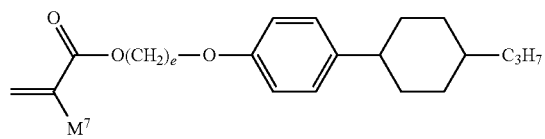
(9-11)
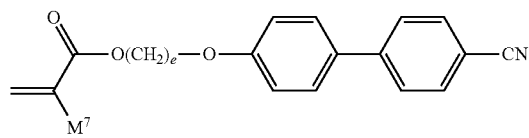
(9-12)
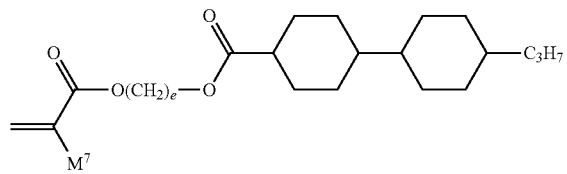
(9-13)
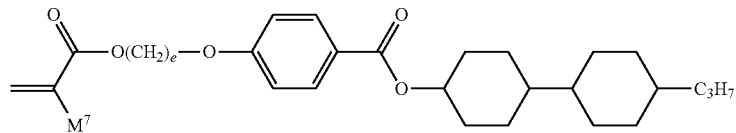
(9-14)
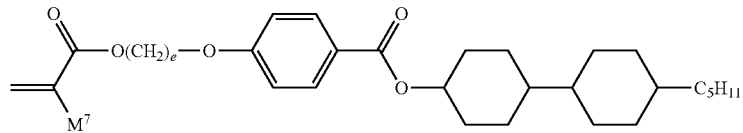
(9-15)
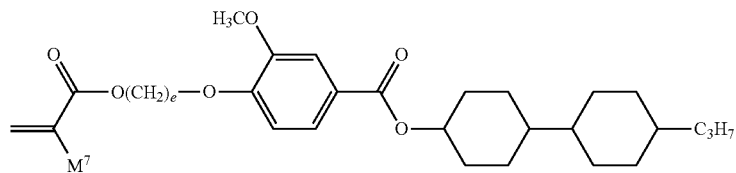
(9-16)
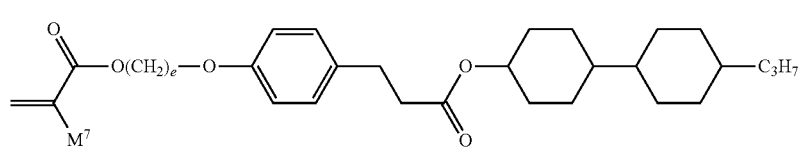
(9-17)

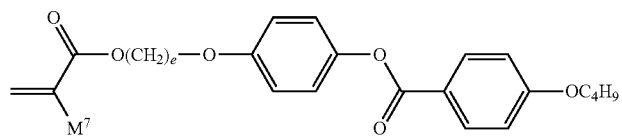 (9-18)
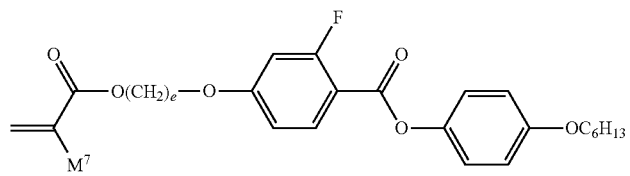 (9-19)
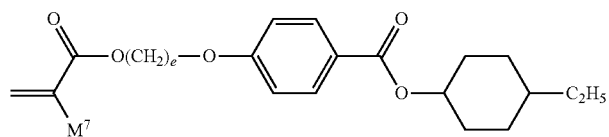 (9-20)
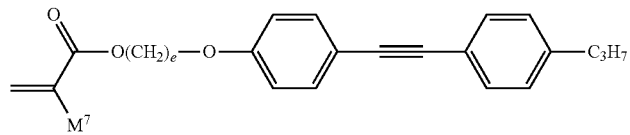 (9-21)
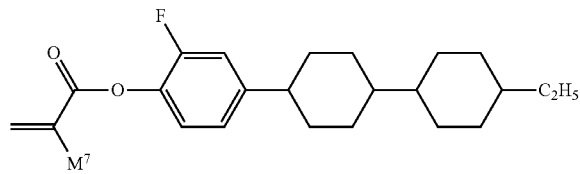 (9-22)
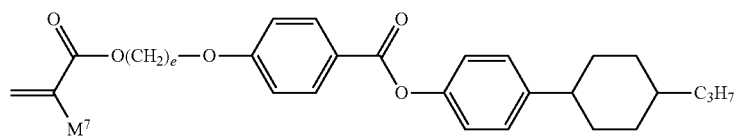 (9-23)
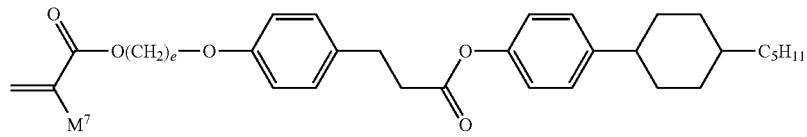 (9-24)
In formula (9-1) to formula (9-24), $M^7$ is hydrogen or methyl, and e is an integer from 1 to 20.
Compound (10) is typically compound (10-1) to compound (10-31).
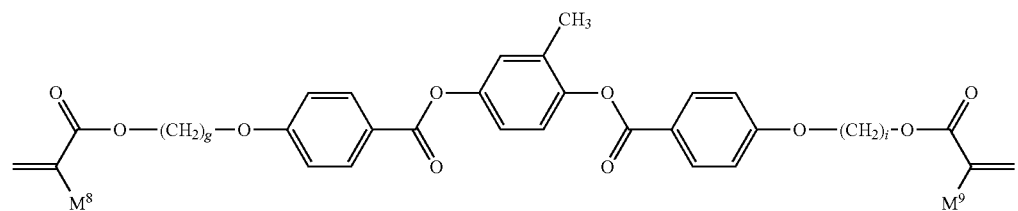 (10-1)

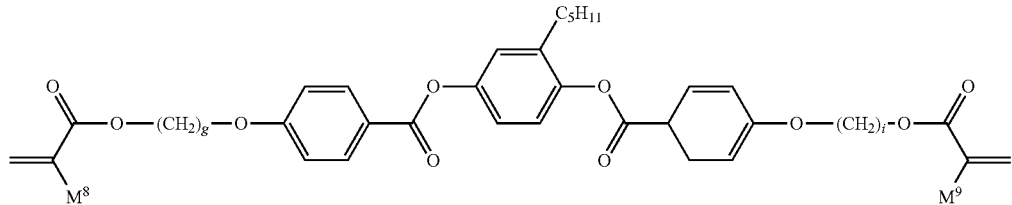
(10-2)
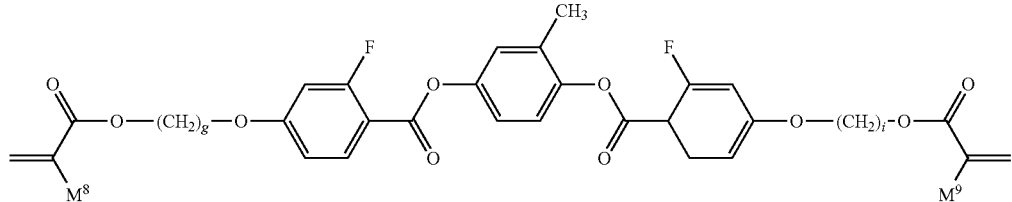
(10-3)
(10-4)
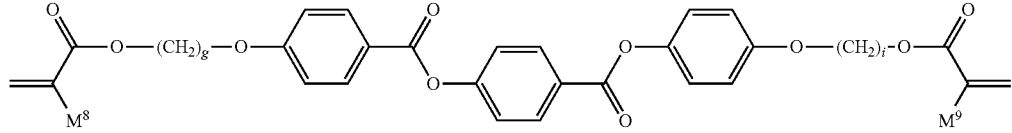
(10-5)
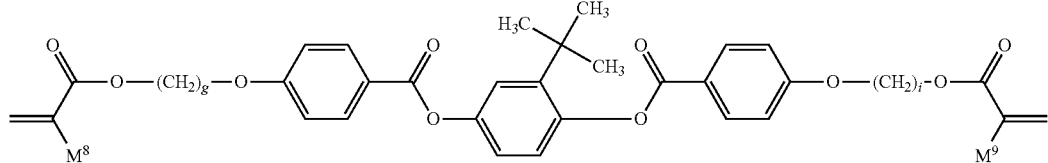
(10-6)
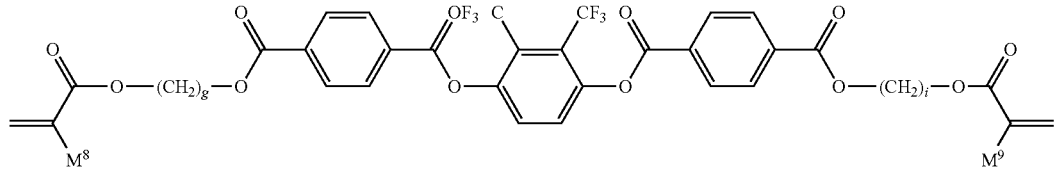
(10-7)
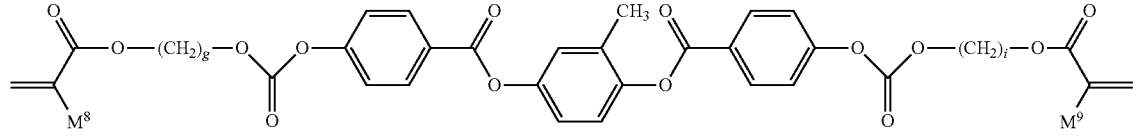
(10-8)
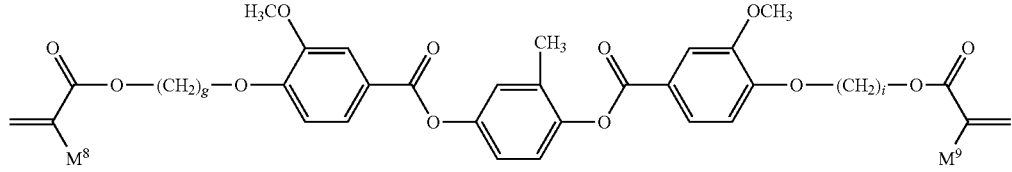
(10-9)
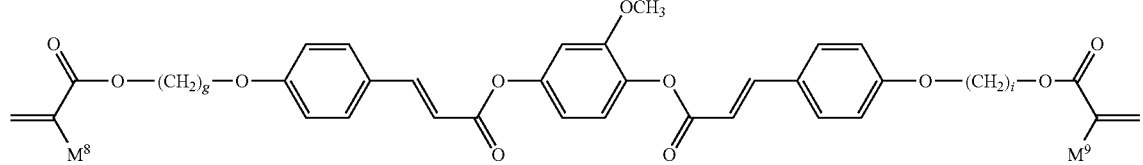

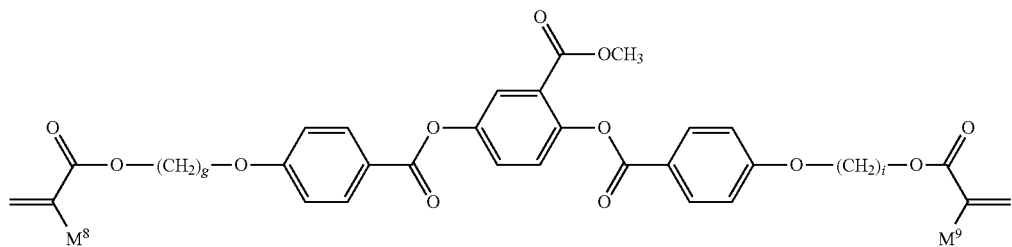
(10-10)
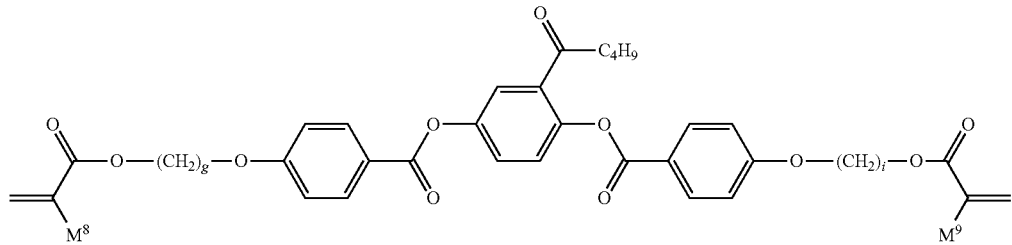
(10-11)
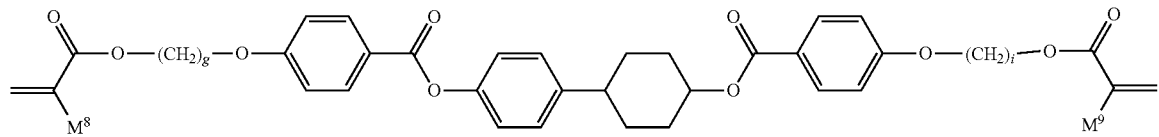
(10-12)
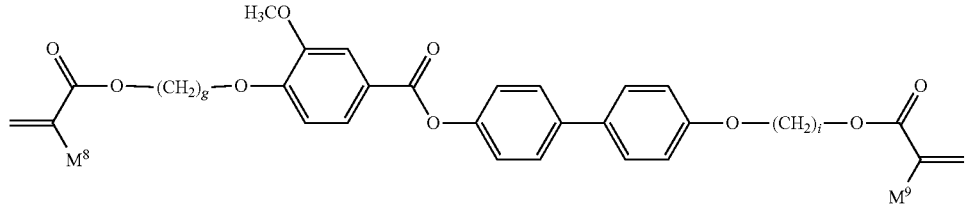
(10-13)
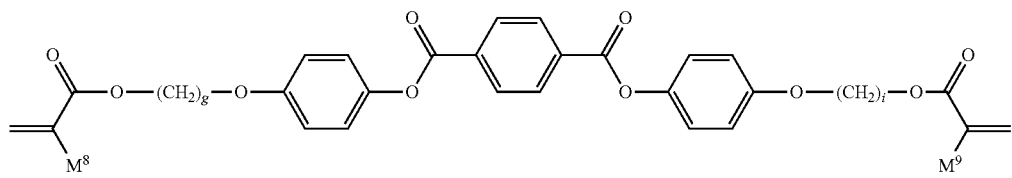
(10-14)
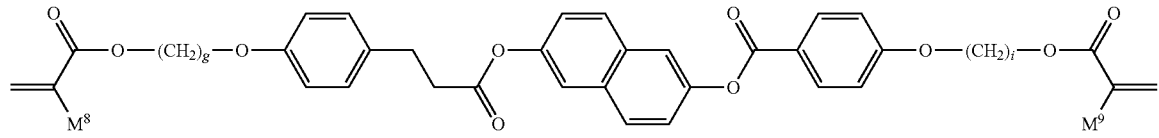
(10-15)
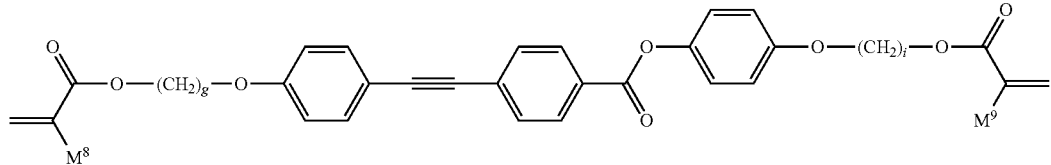
(10-16)
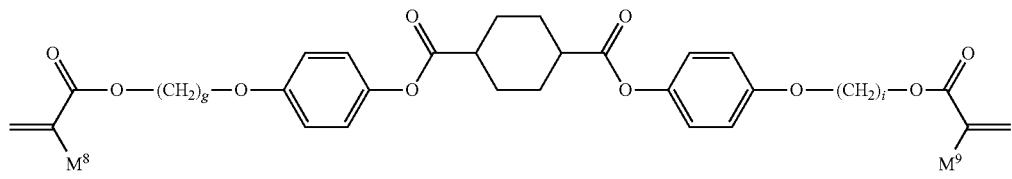
(10-17)

-continued
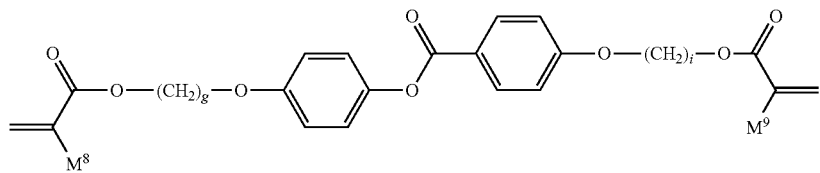
(10-18)
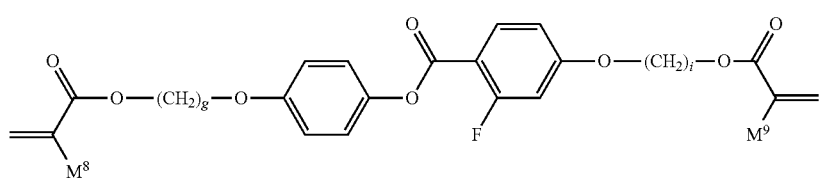
(10-19)
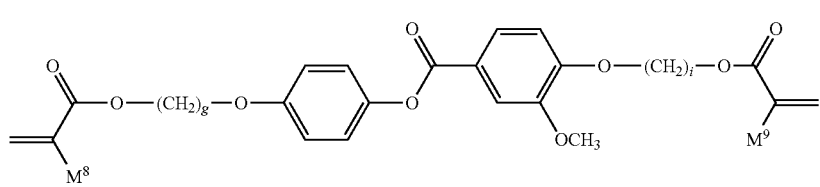
(10-20)
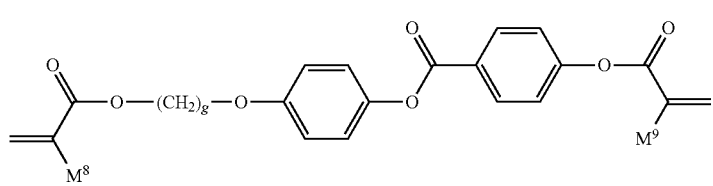
(10-21)
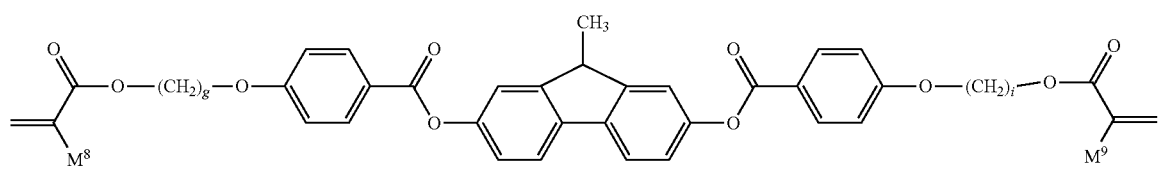
(10-22)
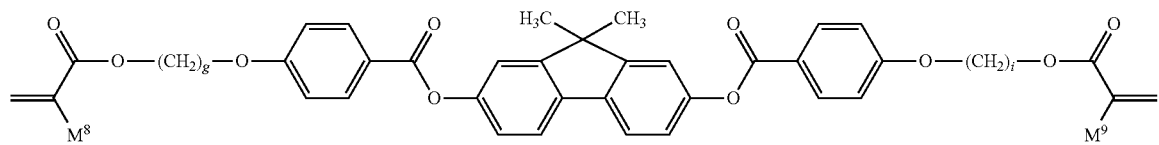
(10-23)
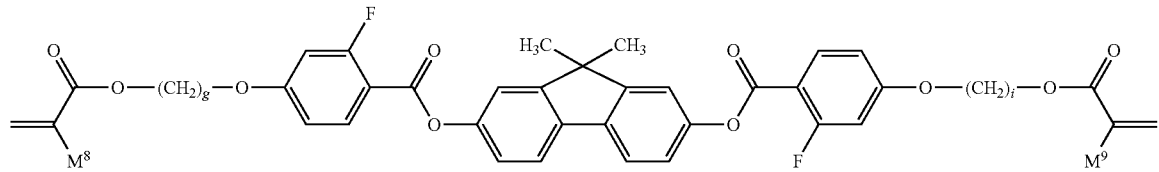
(10-24)
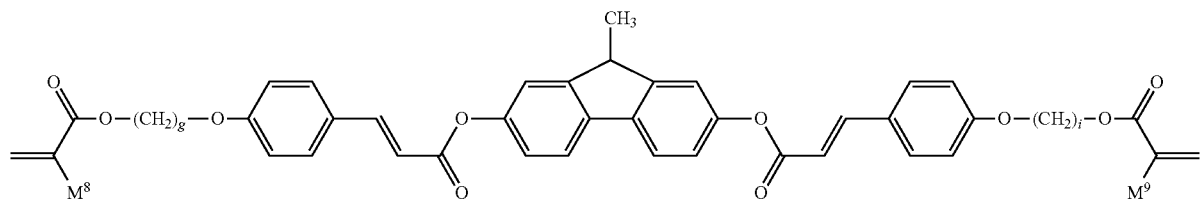
(10-25)

(10-26)
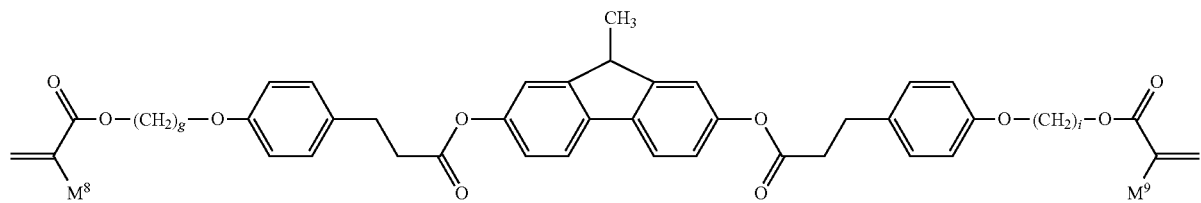
(10-27)
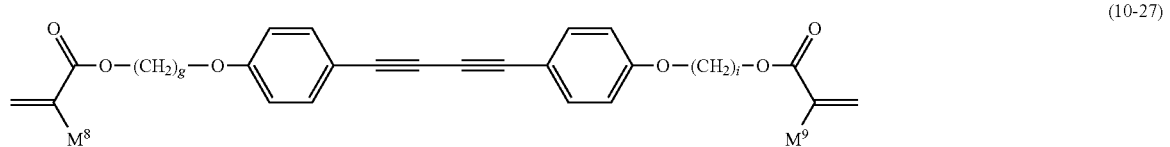
(10-28)
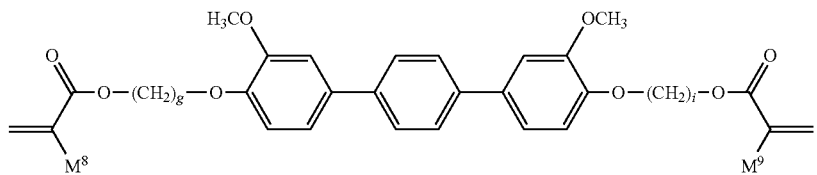
(10-29)
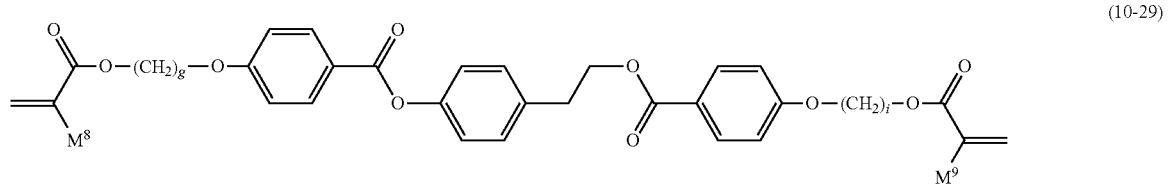
(10-30)
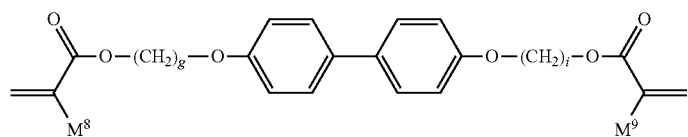
(10-31)
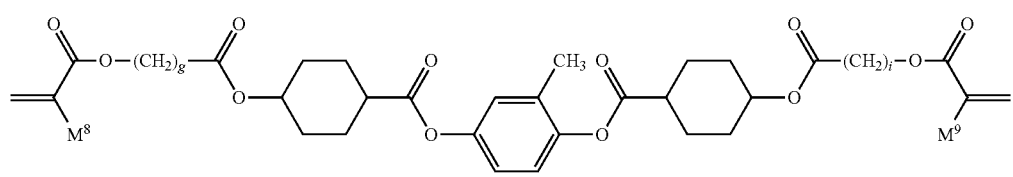
In formula (10-1) to formula (10-31), $M^8$ and $M^9$ are independently hydrogen or methyl, and g and i are independently an integer from 1 to 20.
Compound (11) is typically compound (11-1) to compound (11-10).
(11-1)
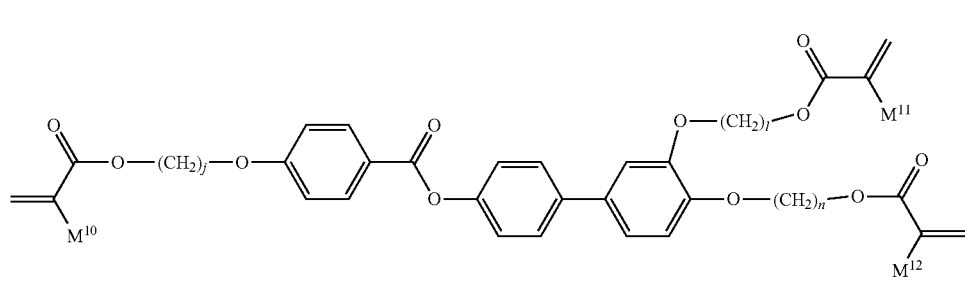

(11-2)
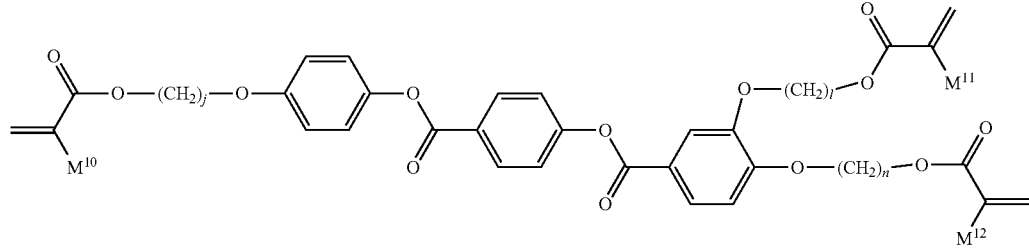
(11-3)
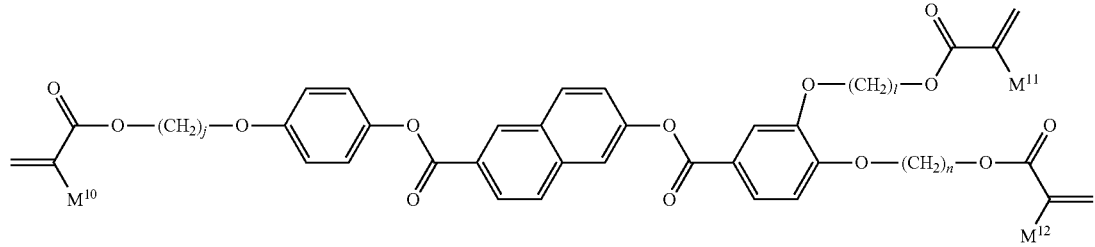
(11-4)
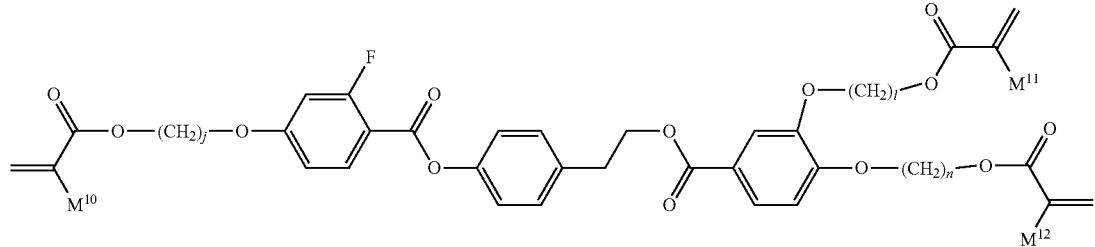
(11-5)
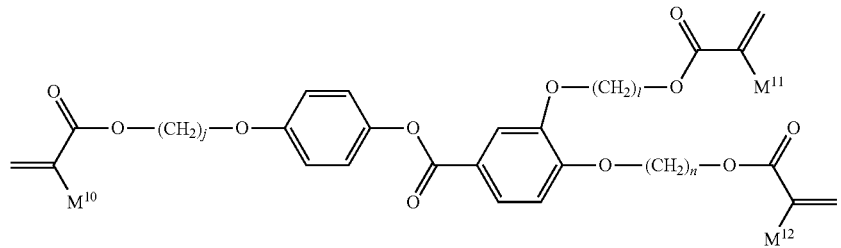
(11-6)
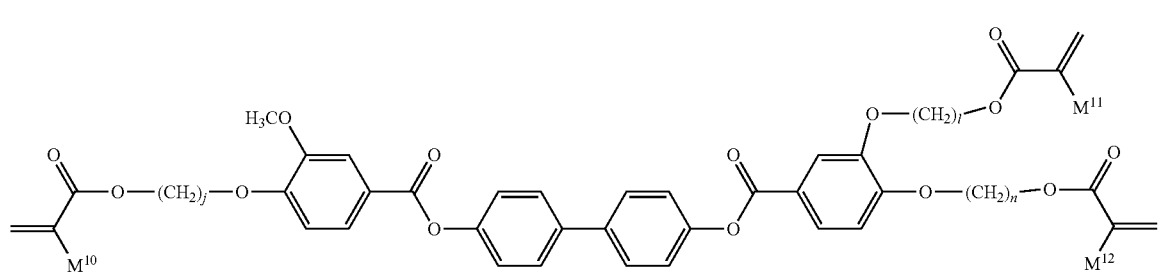
(11-7)
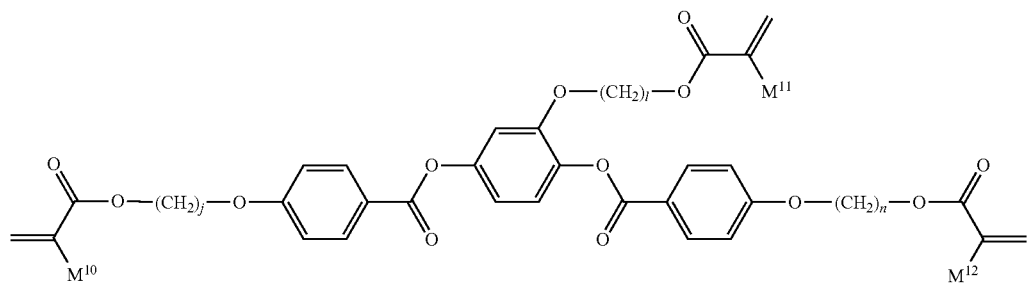

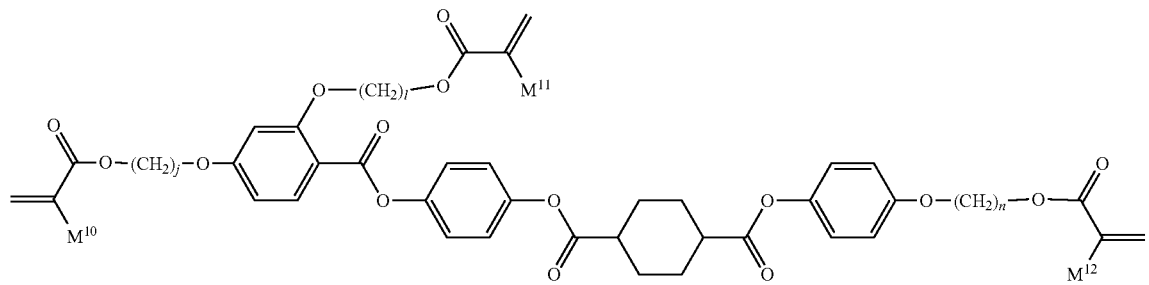
(11-8)

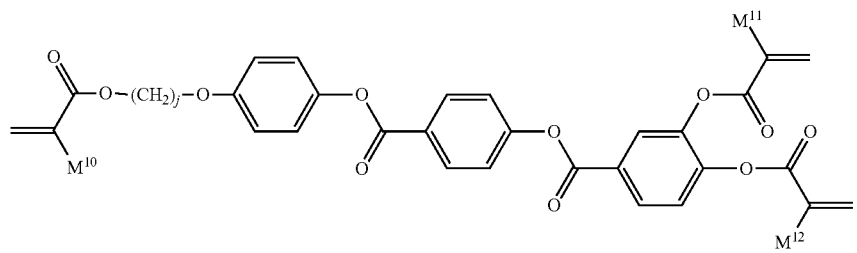
(11-9)

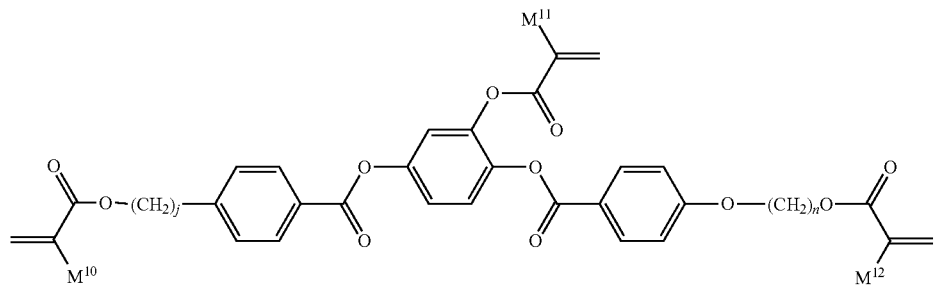
(11-10)

In formula (11-1) to formula (11-10), $M^{10}$, $M^{11}$ and $M^{12}$ are independently hydrogen or methyl, and j, l and n are independently an integer from 1 to 20.

Compound (3-9) and compound (3-16) can be prepared according to the method described in JP H2-233626 A. Compound (5-1) can be prepared according to the method described in JP S59-176221 A. Compound (4-1) can be prepared according to the method described in JP H2-503441 A. The antioxidant is commercially available. A compound represented by formula (13) in which n is 1 as described later is available from Aldrich (Sigma-Aldrich Corporation). Compound (13) in which n is 7, or the like can be prepared according to the method described in U.S. Pat. No. 3,660,505 B. The polymerizable compound is commercially available or can be prepared according to a known method.

Any compounds whose synthetic methods are not described above can be prepared according to the methods described in books such as Organic Syntheses (John Wiley & Sons, Inc.), Organic Reactions (John Wiley & Sons, Inc.), Comprehensive Organic Synthesis (Pergamon Press) and New Experimental Chemistry Course (Shin Jikken Kagaku Koza in Japanese) (Maruzen Co., Ltd.). The composition can be prepared according to a method of mixing component compounds and dissolving the compounds into each other by heating.

Eighth, an additive that may be added to the composition will be described. Specific examples of such an additive include an optically active compound, an antioxidant, an ultraviolet light absorber, a dye, an antifoaming agent, a polymerizable compound, a polymerization initiator, a polymerization inhibitor and a vertical alignment agent. The optically active compound is added to the composition for the purpose of inducing a helical structure in the liquid crystal molecules to give a twist angle. Specific examples of such a compound include compound (12-1) to compound (12-6). A preferred proportion of the optically active compound is about 5% by weight or less. A further preferred proportion is in the range of about 0.01% by weight to about 2% by weight.

(12-1)

(12-2)

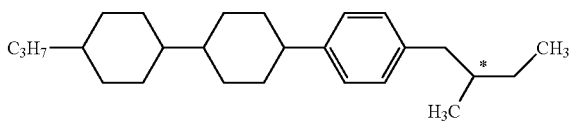
(12-3)

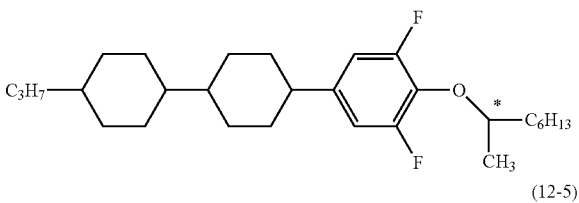
(12-4)

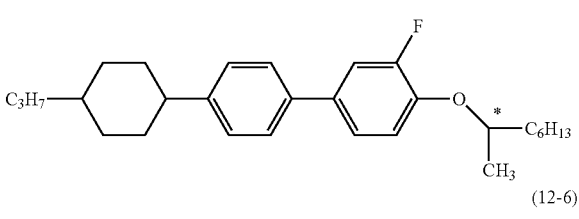
(12-5)

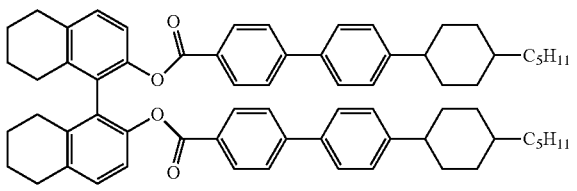
(12-6)

The antioxidant is added to the composition for preventing reduction of the specific resistance caused by heating in air, or for maintaining a large voltage holding ratio not only at room temperature but also at the temperature close to the maximum temperature even after the device has been used for a long period of time. Preferred examples of the antioxidant include compound (13) where n is an integer from 1 to 9.

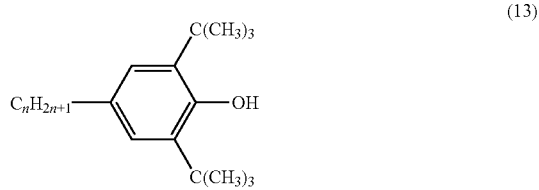
(13)

Because volatility is small, the large voltage holding ratio can be maintained not only at room temperature but also at the temperature close to the maximum temperature even after the device has been used for a long period of time, and therefore n of compound (13) is preferably 1, 3, 5, 7 or 9, and further preferably 7. For maintaining an antioxidant effect and a temperature range in which the liquid crystal phase is exhibited, a proportion of the antioxidant is preferably about 50 to about 600 ppm, and further preferably about 100 ppm to about 300 ppm.

For maintaining quality, the ultraviolet light absorber is preferably a benzophenone derivative, a benzoate derivative, a triazole derivative and a light stabilizer. Specific examples of the light stabilizer include amine having steric hindrance. For maintaining the effect and the temperature range in which the liquid crystal is exhibited, a proportion of the ultraviolet light absorber and the stabilizer is preferably about 50 ppm to about 10,000 ppm, and further preferably about 100 ppm to about 10,000 ppm.

In a device having a guest host (GH) mode, the liquid crystal composition contains a dichroic dye. Specific examples of the dichroic dye include an azo-based dye and an anthraquinone-based dye. A proportion of the dichroic dye is about 0.01% by weight to about 10% by weight. For preventing foaming, the liquid crystal composition contains the antifoaming agent. Specific examples of the antifoaming agent include dimethyl silicone oil and methylphenyl silicone oil. From a viewpoint of foaming and poor display, a proportion of the antifoaming agent is preferably about 1 ppm to 1000 ppm, and further preferably about 1 ppm to about 500 ppm.

The polymerizable compound such as compound (6) is polymerized by irradiation with ultraviolet light. The polymerizable compound may be polymerized in the presence of a suitable initiator such as a photopolymerization initiator. Suitable conditions for polymerization, suitable types of the initiator and suitable amounts thereof are known to those skilled in the art and are described in literature. A radical polymerization photoinitiator is preferably Irgacure 651 (registered trademark; BASF), Irgacure 184 (registered trademark; BASF) or Darocur 1173 (registered trademark; BASF). A preferred proportion of the photopolymerization initiator is in the range of about 0.1% by weight to about 5% by weight based on the total amount of the polymerizable compound. A further preferred proportion is in the range of about 1% by weight to about 3% by weight based thereon.

Upon storing the polymerizable compound, the polymerization inhibitor may be added thereto for preventing polymerization. The polymerizable compound is ordinarily added to the composition without removing the polymerization inhibitor. Specific examples of the polymerization inhibitor include hydroquinone, a hydroquinone derivative such as methylhydroquinone, 4-t-butylcatechol, 4-methoxyphenol and phenothiazine.

In a light scattering liquid crystal light control device having a reverse mode, the vertical alignment agent may be added for aligning liquid crystals perpendicularly to the substrate. For obtaining a transparent state during no voltage application, in the light scattering liquid crystal light control device having the reverse mode, an alignment film prepared by using polyimide as a material is ordinarily applied to the substrate to align the liquid crystals perpendicularly to the substrate. Addition of the vertical alignment agent to the liquid crystal composition eliminates a need for application of the alignment film on the substrate. Specific examples of the vertical alignment agent preferably include compound (14-1) to compound (14-2).

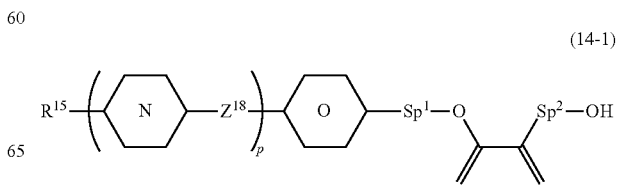
(14-1)

(14-2)

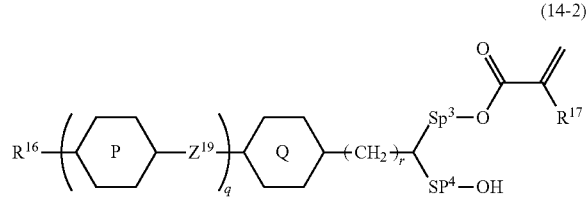

In formula (14-1) and formula (14-2), $R^{15}$, $R^{16}$ and $R^{17}$ are independently hydrogen, halogen, alkyl having 1 to 12 carbons, alkoxy having 1 to 12 carbons, alkenyl having 2 to 12 carbons, alkyl having 1 to 12 carbons in which at least one hydrogen is replaced by fluorine or chlorine or alkenyl having 2 to 12 carbons in which at least one hydrogen is replaced by fluorine or chlorine, ring N, ring O, ring P and ring Q are independently 1,4-cycloxylene, 1,4-phenylene, naphthalene-2,6-diyl, tetrahydropyran-2,5-diyl, 1,3-dioxane-2,5-diyl, pyrimidine-2,5-diyl, pyridine-2,5-diyl or fluorene-2,7-diyl, and in the groups, at least one hydrogen may be replaced by fluorine, chlorine, alkyl having 1 to 12 carbons, alkoxy having 1 to 12 carbons, or alkyl having 1 to 12 carbons in which at least one hydrogen is replaced by fluorine or chlorine, $Z^{18}$ and $Z^{19}$ are independently a single bond, $-(CH_2)_2-$, $-CH=CH-$, $-C\equiv C-$, $-COO-$, $-OCO-$, $-CF_2O-$, $-OCF_2-$, $-CH_2O-$, $-OCH_2-$ or $-CF=CF-$, $Sp^1$, $Sp^2$, $Sp^3$ and $Sp^4$ are independently a single bond or alkylene having 1 to 7 carbons, and in the alkylene, at least one piece of $-CH_2-$ may be replaced by $-O-$, $-COO-$ or $-OCO-$, and at least one piece of $-(CH_2)_2-$ may be replaced by $-CH=CH-$, and in the groups, at least one hydrogen may be replaced by fluorine, and p and q are independently 0, 1, 2 or 3, and r is 1, 2, 3, 4 or 5.

A preferred polymerizable compound has at least one acryloyloxy or methacryloiloxy. The liquid crystal composition is polymerized by compound (6). A preferred polymer is colorless and transparent, and is insoluble in the liquid crystal composition. The preferred polymer is excellent in adhesion with the substrate of the device to reduce a driving voltage. For improving the above-described effect, a polymerizable compound different from compound (6) may be simultaneously used.

Compound (7) is diacrylate or dimethacrylate. $Z^6$ is alkylene or the like, and therefore the polymer easily forms a network structure. When a molecular chain of $Z^6$ is short, crosslinked sites of the polymer are adjacent, and therefore a network becomes small. When the molecular chain of $Z^6$ is long, the crosslinked sites of the polymer are separated to improve a degree of freedom of molecular movement, and therefore the driving voltage is reduced. When $Z^6$ has a branched form, the degree of freedom is further improved, and therefore the driving voltage is further reduced. For improving the above-described effect, a polymerizable compound different from compound (7) may be simultaneously used.

Compound (8) is acrylate or methacrylate. When $R^7$ is alkylene, the polymer easily forms the network structure. In the polymer, the degree of freedom of the molecular movement is improved by alkylene, and therefore the driving voltage is reduced. For further improving the above-described effect, a polymerizable compound different from compound (8) may be simultaneously used.

Compound (9), compound (10) and compound (11) have at least one acryloyloxy ($-OCO-CH=CH_2$) or methacryloiloxy ($-OCO-(CH_3)C=CH_2$). The liquid crystal compound has a mesogen (such a rigid site as developing liquid crystallinity), and the above-described compounds also have the mesogen. Accordingly, the above-described compounds are aligned together with the liquid crystal compound in the same direction by action of an alignment layer. The alignment is maintained even after polymerization. Such a liquid crystal composite has high transparency. For improving other characteristics, a polymerizable compound different from compound (9), compound (10) and compound (11) may be simultaneously used.

A polar compound may be added to the liquid crystal composition. The polar compound adsorbs on a surface of the substrate to control alignment of liquid crystal molecules. The polar compound controls not only the liquid crystal molecules, but also the polymerizable compound in several cases.

A method of preparing the liquid crystal composite from the polymerizable composition is as described below. First, the polymerizable composition is interposed between the pair of substrates. Then, the polymerizable compound is polymerized by heat or light. For polymerization, irradiation with ultraviolet light is preferred. The polymer causes phase separation from the polymerizable composition by polymerization. Thus, the liquid crystal layer (namely, the light control layer) having the light control function is formed between the substrates. The light control layer is classified into a polymer-dispersed type, a polymer-network type and a mixed type of both. The network in the network structure is preferably smaller. A size of a preferred network is about 0.2 micrometer to about 2 micrometers, further preferably about 0.2 micrometer to about 1 micrometer, and particularly preferably about 0.3 micrometer to about 0.7 micrometer.

Last, an application of the liquid crystal device will be described. The invention can be adapted to a liquid crystal device having an operating mode having counter electrodes. The device can be used for an AM device. The device can also be used for a PM device. The device may be of a reflective type, a transmissive type or a transflective type. Use for the transmissive device is preferred.

The device can also be used for a nematic curvilinear aligned phase (NCAP) device prepared by microencapsulating the composition, or for a polymer dispersed (PD) device in which a three-dimensional network-polymer is formed in the composition. Such a device has a function as a light control film or light control glass. When the device has a film shape, the device can be fixed to an existing window, or can be sandwiched between a pair of glass plates into laminated glass. Such a device is used for a window installed in an outer wall, or a partition between a conference room and a passageway. More specifically, the device can be used for an electronic blind, a light control window, a smart window or the like. Further, a function as an optical switch can be utilized for a liquid crystal shutter or the like.

EXAMPLES

Examples are provided for specifically describing the invention, and the invention is not limited by the Examples.

Specific examples of a typical application method of the thermosetting polymer composition include a spin coating method, a slit coating method, a slit and spin coating method, a bar coating method, a spray coating method and a roller coating method. The thermosetting polymer composition was applied according to the spin coating method in a state of 50 Pa or less. Then, the composition was heat-treated at 100° C., and then was cured by heating at 230° C. to prepare an insulating film.

A liquid crystal device having a liquid crystal light control layer of a liquid crystal composite between substrates, in which a first substrate and a second substrate are faced with each other in such a manner that electrodes are faced inward, is produced according to the procedure and the method as described below. Specific examples of a production method for the liquid crystal device in a light control window include a vacuum injection method, a rolling method and a dropping method.

Pattern 1 (Vacuum Injection Method)

In the vacuum injection method, the device is typically prepared according to the method described below.

(1) A first substrate is placed with an electrode plane thereof upside, (2) a spacer is spread on the electrode, (3) a UV curable sealant is applied to an outer circumference of the substrate excluding a portion of a sealing port by using a dispenser, (4) both substrates are bonded with the first substrate upward and a second substrate downward into a substrate group, (5) the substrate group is exposed by a UV irradiation machine to cure the sealant, (6) a space between the substrates is brought into negative pressure to immerse a polymerizable composition thereinto from the sealing port, (7) an outside of the substrates is returned to atmospheric pressure to inject the polymerizable composition into a gap between the substrates, (8) the substrate group is exposed by the UV irradiation machine to polymerize a polymerizable compound in the polymerizable composition to obtain a liquid crystal layer of a liquid crystal composite, and (9) a liquid crystal device is obtained.

Pattern 2 (Rolling Method)

In the rolling method, the device is typically prepared according to the method described below.

(1) A spacer is added to a polymerizable composition to uniformly mix the composition, (2) a first transparent film substrate is placed with an electrode plane thereof upside, (3) a mixture (the polymerizable composition containing the spacer) is applied to the electrode plane, (4) the first substrate, the applied mixture and a second transparent film substrate are clamped in the order according to a roll bonding method, (5) both substrates are bonded while being compression-bonded into a substrate group, (6) the substrate group is exposed by a UV irradiation machine, to polymerize a polymerizable compound in the mixture to obtain a liquid crystal layer of a liquid crystal composite, and (7) a liquid crystal device is obtained.

Pattern 3 (Dropping Method)

In the dropping method, the device is typically prepared according to the method described below.

(1-1) A first substrate is placed with an electrode plane thereof upside, (1-2) a thermally adhesive spacer is spread on the electrode plane, (1-3) the first substrate is heated to adhere the spacer on a surface of the substrate to form the first substrate, and meanwhile, (2-1) a second substrate is placed with an electrode plane thereof upside, (2-2) a UV curable sealant is applied to an outer circumference of the substrate by using a dispenser, (2-3) a droplet of a polymerizable composition is added onto the second substrate at a uniform distance interval by using a one-drop-fill (ODF) apparatus, (3-1) the substrate prepared according to procedure (1-3) is placed with the electrode plane upward and the substrate prepared according to procedure (2-3) is placed with the electrode plane downward to bond both substrates into a substrate group, (3-2) the substrate group is exposed by a UV irradiation machine to polymerize a polymerizable compound in the polymerizable composition to obtain a liquid crystal layer of a liquid crystal composite, and (3-3) a liquid crystal device is obtained.

The liquid crystal composition used for the device of the invention will be described. The invention includes a composition in Examples. The thus prepared compound was identified by NMR or the like. Characteristics of the compound, the composition and a device were measured by methods described below.

NMR analysis: For measurement, DRX-500 made by Bruker BioSpin Corporation was used. In $^1$H-NMR measurement, a sample was dissolved in a deuterated solvent such as $CDCl_3$, and measurement was carried out under conditions of room temperature, 500 MHz and 16 times of accumulation. Tetramethylsilane was used as an internal standard. In $^{19}$F-NMR measurement, $CFCl_3$ was used as an internal standard, and measurement was carried out under conditions of 24 times of accumulation. In explaining nuclear magnetic resonance spectra obtained, s, d, t, q, quin, sex and m stand for a singlet, a doublet, a triplet, a quartet, a quintet, a sextet and a multiplet, and br being broad, respectively.

Gas chromatographic analysis: For measurement, GC-14B Gas Chromatograph made by Shimadzu Corporation was used. A carrier gas was helium (2 mL/per minute). A sample vaporizing chamber and a detector (FID) were set to 280° C. and 300° C., respectively. A capillary column DB-1 (length 30 m, bore 0.32 mm, film thickness 0.25 μm; dimethylpolysiloxane as a stationary phase, non-polar) made by Agilent Technologies, Inc. was used for separation of component compounds. After the column was kept at 200° C. for 2 minutes, the column was heated to 280° C. at a rate of 5° C. per minute. A sample was prepared in an acetone solution (0.1% by weight), and then 1 microliter of the solution was injected into the sample vaporizing chamber. A recorder was C-R5A Chromatopac made by Shimadzu Corporation or the equivalent thereof. The resulting gas chromatogram showed a retention time of a peak and a peak area corresponding to each of the component compounds.

As a solvent for diluting the sample, chloroform, hexane or the like may also be used. The following capillary columns may also be used for separating component compounds: HP-1 (length 30 m, bore 0.32 mm, film thickness 0.25 μm) made by Agilent Technologies, Inc., Rtx-1 (length 30 m, bore 0.32 mm, film thickness 0.25 μm) made by Restek Corporation and BP-1 (length m, bore 0.32 mm, film thickness 0.25 μm) made by SGE International Pty. Ltd. A capillary column CBP1-M50-025 (length 50 m, bore 0.25 mm, film thickness 0.25 μm) made by Shimadzu Corporation may also be used for the purpose of preventing an overlap of peaks of the compounds.

A proportion of each liquid crystal compound in the liquid crystalline composition was measured by gas chromatography equipped with FID. On the occasion, an area ratio of a peak is regarded as a weight ratio of the liquid crystal compound.

Sample for measurement: When characteristics of the composition and the device were measured, the composition was used as was. Upon measuring characteristics of a compound, a sample for measurement was prepared by mixing the compound (15% by weight) with a base liquid crystal (85% by weight). Values of characteristics of the compound were calculated, according to an extrapolation method, using values obtained by measurement. (Extrapolated value)={(measured value of a sample for measurement)−0.85×(measured value of a base liquid crystal)}/0.15. When a smectic phase (or crystals) precipitates at the ratio thereof at 25° C., a ratio of the compound to the base liquid crystal was changed step by step in the order of (10% by weight:90% by weight), (5% by weight:95% by weight) and (1% by weight:99% by weight). Values of maximum temperature, optical anisotropy, viscosity and dielectric anisotropy with regard to the compound were determined according to the extrapolation method.

A base liquid crystal described below was used. A proportion of the component compound was expressed in terms of weight percent (% by weight).

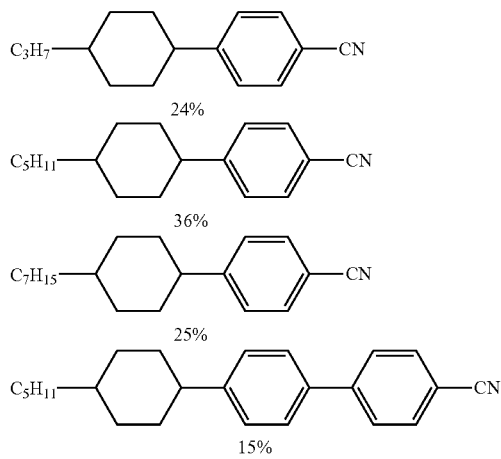

Measuring method: Characteristics were measured according to the methods described below. Most of the measuring methods are applied as described in the Standard of Japan Electronics and Information Technology Industries Association (JEITA ED-2521B) discussed and established by JEITA, or modified thereon. No thin film transistor (TFT) was attached to a TN device used for measurement.

(1) Maximum temperature of the nematic phase (NI; ° C.): A sample was placed on a hot plate in a melting point apparatus equipped with a polarizing microscope, and heated at a rate of 1° C. per minute. Temperature when part of the sample began to change from a nematic phase to an isotropic liquid was measured. A maximum temperature of the nematic phase may be occasionally abbreviated as "maximum temperature."

(2) Minimum temperature of a nematic phase ($T_C$; ° C.): Samples each having a nematic phase were put in glass vials and kept in freezers at temperatures of 0° C., −10° C., −20° C., −30° C. and −40° C. for 10 days, and then liquid crystal phases were observed. For example, when the sample was maintained in the nematic phase at −20° C. and changed to crystals or a smectic phase at −30° C., $T_C$ was expressed as $T_C$<−20° C. A minimum temperature of the nematic phase may be occasionally abbreviated as "minimum temperature."

(3) Viscosity (bulk viscosity; η; measured at 20° C.; mPa·s): For measurement, a cone-plate (E type) rotational viscometer made by Tokyo Keiki Inc. was used.

(4) Viscosity (rotational viscosity; γ1; measured at 25° C.; mPa·s): Measurement was carried out according to the method described in M. Imai et al., Molecular Crystals and Liquid Crystals, Vol. 259, p. 37 (1995). A sample was put in a TN device in which a twist angle was 0 degrees and a distance (cell gap) between two glass substrates was 5 micrometers. Voltage was applied stepwise to the device in the range of 16 V to 19.5 V at an increment of 0.5 V. After a period of 0.2 second with no voltage application, voltage was repeatedly applied under conditions of only one rectangular wave (rectangular pulse; 0.2 second) and no voltage application (2 seconds). A peak current and a peak time of transient current generated by the applied voltage were measured. A value of rotational viscosity was obtained from the measured values and calculation equation (8) described on page 40 of the paper presented by M. Imai et al. A value of dielectric anisotropy required for the calculation was determined using the device by which the rotational viscosity was measured and by a method described below.

(5) Optical anisotropy (refractive index anisotropy; Δη; measured at 25° C.): Measurement was carried out by an Abbe refractometer with a polarizing plate mounted on an ocular, using light at a wavelength of 589 nanometers. A surface of a main prism was rubbed in one direction, and then a sample was added dropwise onto the main prism. A refractive index (n∥) was measured when a direction of polarized light was parallel to a direction of rubbing. A refractive index (n⊥) was measured when the direction of polarized light was perpendicular to the direction of rubbing. A value of optical anisotropy was calculated from an equation:

$$\Delta n = n\| - n\perp.$$

(6) Dielectric anisotropy (Δε; measured at 25° C.): A sample was put in a TN device in which a distance (cell gap) between two glass substrates was 9 micrometers and a twist angle was 80 degrees. Sine waves (10 V, 1 kHz) were applied to the device, and after 2 seconds, a dielectric constant (ε∥) of liquid crystal molecules in a major axis direction was measured. Sine waves (0.5 V, 1 kHz) were applied to the device, and after 2 seconds, a dielectric constant (ε⊥) of liquid crystal molecules in a minor axis direction was measured. A value of dielectric anisotropy was calculated from an equation: Δε=ε∥−ε⊥.

(7) Threshold voltage (Vth; measured at 25° C.; V): For measurement, an LCD-5100 luminance meter made by Otsuka Electronics Co., Ltd. was used. A light source was a halogen lamp. A sample was put in a normally white mode TN device in which a distance (cell gap) between two glass substrates was 0.45/Δn (μm) and a twist angle was 80 degrees. A voltage (32 Hz, rectangular waves) to be applied to the device was stepwise increased from 0 V to 10 V at an increment of 0.02 V. On the occasion, the device was irradiated with light from a direction perpendicular to the device, and an amount of light transmitted through the device was measured. A voltage-transmittance curve was prepared, in which the maximum amount of light corresponds to 100% transmittance and the minimum amount of light corresponds to 0% transmittance. A threshold voltage is expressed in terms of voltage at 90% transmittance.

(8) Voltage holding ratio (VHR-1; measured at 25° C.; %): A TN device used for measurement had a polyimide alignment film, and a distance (cell gap) between two glass substrates was 5 micrometers. A sample was injected into the device, and then the device was sealed with an ultraviolet-curable adhesive. A pulse voltage (60 microseconds at 5 V) was applied to the TN device and the device was charged. A decaying voltage was measured for 16.7 milliseconds with a high-speed voltmeter, and area A between a voltage curve and a horizontal axis in a unit cycle was determined. Area B is an area without decay. A voltage holding ratio is expressed in terms of a percentage of area A to area B.

(9) Voltage holding ratio (VHR-2; measured at 80° C.; %): A voltage holding ratio was measured according to procedures identical with the procedures described above except that measurement was carried out at 80° C. in place of 25° C. The thus obtained value was expressed in terms of VHR-2.

(10) Voltage holding ratio (VHR-3; measured at 25° C.; %): Stability to ultraviolet light was evaluated by measuring a voltage holding ratio after a device was irradiated with ultraviolet light. A TN device used for measurement had a polyimide alignment film and a cell gap was 5 micrometers. A sample was injected into the device, and then the device was irradiated with light for 20 minutes. A light source was an ultra high-pressure mercury lamp USH-500D (made by Ushio, Inc.), and a distance between the device and the light source was 20 centimeters. In measurement of VHR-3, a decaying voltage was measured for 16.7 milliseconds. A composition having large VHR-3 has large stability to ultraviolet light. A value of VHR-3 is preferably 90% or more, and further preferably 95% or more.

(11) Voltage holding ratio (VHR-4; measured at 25° C.; %): Stability to heat was evaluated by measuring a voltage holding ratio after a TN device into which a sample was injected was heated in a constant-temperature bath at 80° C. for 500 hours. In measurement of VHR-4, a decaying voltage was measured for 16.7 milliseconds. A composition having large VHR-4 has large stability to heat.

(12) Response time (τ; measured at 25° C.; ms): For measurement, an LCD-5100 luminance meter made by Otsuka Electronics Co., Ltd. was used. A light source was a halogen lamp. A low-pass filter was set to 5 kHz. A sample was put in a normally white mode TN device in which a distance (cell gap) between two glass substrates was 5.0 micrometers and a twist angle was 80 degrees. A voltage (rectangular waves; 60 Hz, 5 V, 0.5 second) was applied to the device. On the occasion, the device was irradiated with light from a direction perpendicular to the device, and an amount of light transmitted through the device was measured. The maximum amount of light corresponds to 100% transmittance, and the minimum amount of light corresponds to 0% transmittance. A rise time (τr; millisecond) was expressed in terms of time required for a change from 90% transmittance to 10% transmittance. A fall time (τf; millisecond) was expressed in terms of time required for a change from 10% transmittance to 90% transmittance. A response time was expressed by a sum of the rise time and the fall time thus determined.

(13) Elastic constant (K; measured at 25° C.; pN): For measurement, HP4284A LCR Meter made by Yokogawa-Hewlett-Packard Co. was used. A sample was put in a horizontal alignment device in which a distance (cell gap) between two glass substrates was 20 micrometers. An electric charge of 0 V to 20 V was applied to the device, and electrostatic capacity and applied voltage were measured. The measured values of electrostatic capacity (C) and applied voltage (V) were fitted to equation (2.98) and equation (2.101) on page 75 of "Liquid Crystal Device Handbook" (Ekisho Debaisu Handobukku in Japanese; The Nikkan Kogyo Shimbun, Ltd.) and values of K11 and K33 were obtained from equation (2.99). Next, K22 was calculated using the previously determined values of K11 and K33 in equation (3.18) on page 171. Elastic constant K was expressed in terms of a mean value of the thus determined K11, K22 and K33.

(14) Specific resistance (ρ; measured at 25° C.; Ωcm): In a vessel equipped with electrodes, 1.0 milliliter of a sample was put. A direct current voltage (10 V) was applied to the vessel, and a direct current after 10 seconds was measured. Specific resistance was calculated from the following equation:

(Specific resistance)={(voltage)×(electric capacity of a vessel)}/{(direct current)×(dielectric constant of vacuum)}  (Formula 1).

(15) Helical pitch (P; measured at room temperature; μm): A helical pitch was measured according to a wedge method. Refer to page 196 in "Handbook of Liquid Crystals (Ekisho Binran in Japanese)" (issued in 2000, Maruzen Co., Ltd.). A sample was injected into a wedge cell and left to stand at room temperature for 2 hours, and then a gap (d2−d1) between disclination lines was observed by a polarizing microscope (trade name: MM40/60 Series, Nikon Corporation). A helical pitch (P) was calculated according to the following formula in which an angle of the wedge cell was expressed as θ: P=2×(d2−d1)×tan θ.

(16) Dielectric constant in a minor axis direction (ε⊥; measured at 25° C.): A sample was put in a TN device in which a distance (cell gap) between two glass substrates was 9 micrometers and a twist angle was 80 degrees. Sine waves (0.5 V, 1 kHz) were applied to the device, and after 2 seconds, a dielectric constant (ε⊥) of liquid crystal molecules in a minor axis direction was measured.

(17) Alignment stability (liquid crystal alignment axis stability): A change in a liquid crystal alignment axis of an FFS device on an electrode side was evaluated. A liquid crystal alignment angle φ (before) on the electrode side before stress application was measured, and then rectangular waves of 60 Hz at 4.5 V were applied to the device for 20 minutes, and then short-circuited for 1 second, and a liquid crystal alignment angle φ (after) on the electrode side was measured again after 1 second and 5 minutes. A change Δφ (deg) in the liquid crystal alignment angle after 1 second and after 5 minutes was calculated from the above values using the formula described below.

Δφ(deg)=φ(after)−φ(before)  (Formula 2)

The measurements were carried out with reference to J. Hilfiker, B. Johs, C. Herzinger, J. F. Elman, E. Montbach, D. Bryant, and P. J. Bos, Thin Solid Films, 455-456, (2004) 596-600. As Δφ is smaller, a change rate of the liquid crystal alignment axis is reasonably smaller, and stability of the liquid crystal alignment axis is reasonably better.

(18) Flicker rate (measured at 25° C.; %): For measurement, 3298F Multimedia Display Tester made by Yokogawa Electric Corporation was used. A light source was an LED. A sample was put in a normally black mode device in which a distance (cell gap) between two glass substrates was 3.5 micrometers, and a rubbing direction was anti-parallel. The device was sealed with an ultraviolet-curable adhesive. Voltage was applied to the device, and a voltage having a maximum amount of light transmitted through the device was measured. A sensor unit was brought close to the device while the voltage was applied, and a flicker rate displayed thereon was read.

(19) Haze ratio (%): For measurement of a haze ratio, Haze Meter NDH5000 (made by NIPPON DENSHOKU INDUSTRIES CO., LTD.) was used.

(20) Weight average molecular weight: Weight average molecular weight was determined by GPC. Here, a standard reference material of molecular weight is a material of a polystyrene calibration kit PL2010-0102 obtained from Agilent Technologies Japan, Ltd., unless otherwise stated.

A mobile phase of GPC is THF. A column temperature of GPC is 35° C. A flow rate of GPC is 1 mL/min. A column of GPC is PLgel MIXED-D of Agilent Technologies Japan, Ltd.

Components of compositions in Examples were expressed using symbols according to definitions described in Table 2 below. In Table 2, a configuration of 1,4-cyclohexylene is trans. Parenthesized numbers described after the symbolized compounds represent formulas to which the compounds belong. A symbol (-) means any other liquid crystal compound. A proportion (percentage) of the liquid crystal compound is expressed in terms of weight percent (% by weight) based on the weight of the liquid crystal composition containing no additives. Values of the characteristics of the composition were summarized in a last part.

TABLE 2

Method for description of compounds using symbols
R—(A₁)—Z₁— . . . —Zₙ—(Aₙ)—R'

| | Symbol |
|---|---|
| 1) Left-terminal group R— | |
| $C_nH_{2n+1}$— | n- |
| $C_nH_{2n+1}O$— | nO— |
| $C_mH_{2m+1}OC_nH_{2n}$— | mOn— |
| $CH_2=CH$— | V— |
| $C_nH_{2n+1}$—CH=CH— | nV— |
| $CH_2=CH$—$C_nH_{2n}$— | Vn— |
| $C_mH_{2m+1}$—CH=CH—$C_nH_{2n}$— | mVn— |
| $CF_2=CH$— | VFF— |
| $CF_2=CH$—$C_nH_{2n}$— | VFFn— |
| F—$C_nH_{2n}$— | Fn— |
| 2) Right-terminal groups —R' | |
| —$C_nH_{2n+1}$ | -n |
| —$OC_nH_{2n+1}$ | —On |
| —CH=$CH_2$ | —V |
| —CH=CH—$C_nH_{2n+1}$ | —Vn |
| —$C_nH_{2n}$—CH=$CH_2$ | —nV |
| —$C_mH_{2m}$—CH=CH—$C_nH_{2n+1}$ | —mVn |
| —CH=$CF_2$ | —VFF |
| —$COOCH_3$ | —EMe |
| —F | —F |
| —Cl | —CL |
| —$OCF_3$ | —$OCF_3$ |
| —$CF_3$ | —$CF_3$ |
| —CN | —C |
| 3) Bonding group —$Z_n$— | |
| —$C_nH_{2n}$— | n |
| —COO— | E |
| —CH=CH— | V |
| —C≡C— | T |
| —$CF_2O$— | X |
| —$CH_2O$— | 1O |
| 4) Ring structure —$A_n$— | |
| 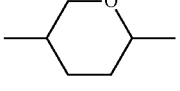 | H |

TABLE 2-continued

Method for description of compounds using symbols
R—(A₁)—Z₁— . . . —Zₙ—(Aₙ)—R'

| | Symbol |
|---|---|
|  | dh |
| 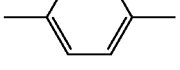 | Dh |
| 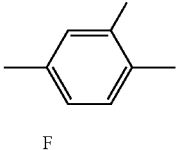 | B |
| 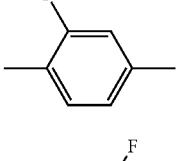 | B(F) |
| 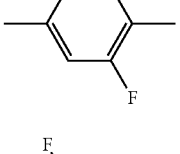 | B(2F) |
| 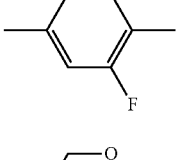 | B(F,F) |
| 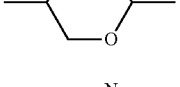 | B(2F,5F) |
| 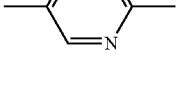 | G |
| 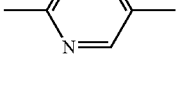 | Py |
| 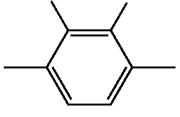 | PY |
|  | B(2F,3F) |

TABLE 2-continued

Method for description of compounds using symbols
R—(A₁)—Z₁— ... —Zₙ—(Aₙ)—R'

| | Symbol |
|---|---|
| 5) Examples of description | |
| Example 1 | 3-HH-V |
| Example 2 | 3-HHB(2F,3F)-O2 |
| Example 3 | 4-GB(F)B(F,F)XB(F,F)-F |
| Example 4 | 2-BB(F)B(F,F)-F |

Preparation of a Thermosetting Polymer Composition

Synthesis Example 1-1

Synthesis of a Polyester Amide Acid Solution

Into a four-neck flask equipped with a stirrer, methyl 3-methoxypropionate (hereinafter, referred to as "MMP"), 3,3',4,4'-diphenyl ether tetracarboxylic dianhydride (hereinafter, referred to as "ODPA"), 1,4-butanediol and benzyl alcohol were charged in the weight described below, and the resulting mixture was stirred under a dry nitrogen flow at 125° C. for 2 hours (first synthesis stage).

| MMP | 49.00 g |
|---|---|
| ODPA | 20.36 g |
| 1,4-Butanediol | 3.55 g |
| Benzyl alcohol | 2.84 g |

Then, the reaction mixture was cooled to 25° C., and 3,3'-diaminodiphenylsulfone (hereinafter, referred to as "DDS") and MMP were charged thereto in the weight described below, and the resulting mixture was stirred at 20 to 30° C. for 2 hours, and stirred at 125° C. for 1 hour (second synthesis stage).

| DDS | 3.26 g |
|---|---|
| MMP | 21.00 g |

(Z/Y = 3.0, (Y + Z)/X = 0.8)

The solution was cooled to room temperature to obtain a light yellow transparent 30 wt % solution of polyester amide acid (A1). A part of the solution was sampled, and weight average molecular weight was measured by GPC analysis. As a result, weight average molecular weight of polyester amide acid (A1) obtained was 4,200.

Synthesis Example 2-1

Synthesis of an Epoxy Compound

Into a four-neck flask equipped with a stirrer, diethylene glycol methyl ethyl ether (hereinafter, referred to as "EDM") was charged in the amount described below (reactor liquid). As dropping liquid 1, N-phenylmaleimide, butyl methacrylate, glycidyl methacrylate and EDM, and as dropping liquid 2, a mixture of 2,2-azobis(isobutyric acid)dimethyl (hereinafter, referred to as V-601, in which "V-601" is a trade name of Wako Pure Chemical Corporation. The same shall apply hereinafter.) and EDM were charged to a dropping apparatus in the composition described below. Each dropping liquid is added dropwise thereto at a reactor liquid temperature of 84° C. for 3 hours, and after completion of dropwise addition, the resulting mixture was further heated for 1 hour. The reactor liquid temperature was increased to 100° C., and the resulting mixture was further heated for 1 hour.

(Reactor Liquid)

| EDM | 37.8 g |
|---|---|

(Dropping Liquid 1)

| N-phenylmaleimide | 10.0 g |
|---|---|
| Butyl methacrylate | 5.0 g |
| Glycidyl methacrylate | 35.0 g |
| EDM | 28.6 g |

(Dropping Liquid 2)

| V-601 | 0.4 g |
|---|---|
| EDM | 3.6 g |

The solution after completion of reaction was cooled to 70° C., and propylene glycol monoethyl ether acetate (hereinafter, abbreviated as "PGMEA") was charged in amount described below to obtain a 25.0 wt % solution of an epoxy compound.

(Diluted Solution)

| PGMEA | 750.0 g |
|---|---|

Weight average molecular weight determined by GPC analysis was 42,500.

In addition, here, a term "25.0 wt % solution of the epoxy compound" means that a concentration converted from weight of a solid and weight of a solvent, to be determined by deeming that all of charged compounds reacted, is 25.0% by weight.

Preparation of a Thermosetting Polymer Composition

Preparation Example 1

An atmosphere in a four-neck flask equipped with a stirrer was replaced by nitrogen, and into the flask, 4.62 g of the polyester amide acid solution obtained in Synthesis Example 1-1, 6.66 g of solution of the epoxy compound obtained in Synthesis Example 2-1, 0.37 g of trimellitic anhydride as a curing agent, 0.22 g of Sila-Ace 5510 (trade name; JNC Corporation) as an adhesion improver, 0.02 g of ADK STAB AO-60 (trade name; ADEKA Corporation) as an antioxidant, 0.04 g of BYK-342 (trade name; BYK Japan KK) as a surfactant, 2.15 g of MMP, 7.42 g of EDM and 18.54 g of PGMEA as a solvent were charged, and the resulting mixture was stirred at room temperature for 3 hours to uniformly dissolve the components.

Then, the resulting mixture was filtrated by using a membrane filter (0.2 μm) to prepare a thermosetting polymer composition (hereinafter, occasionally referred to an application liquid).

Preparation of a Substrate

For further facilitating evaluation of an effect of applying a transparent insulating film, a substrate in which a glass substrate was flattened and to which inorganic coating treatment with $SiO_2$ or the like was not applied was used. An ITO glass substrate having a comparatively large area with a dimension of 305 mm×375 mm and a thickness of 0.5 mm was used because an effect of arcing was difficult to be verified with a substrate having a small size. As the ITO glass substrate, products in the same production lot were used. The liquid crystal device of the invention has a transparent insulating film obtained by heating the thermosetting polymer composition on one plane or both planes on a side of transparent electrodes of a first transparent substrate and a second transparent substrate. As a method of placing the transparent insulating film on a surface of the transparent substrate, the transparent insulating film was prepared as described below.

The insulating film was provided on the electrode plane according to the method described below:

(1) an application liquid containing the thermosetting polymer composition was spin-coated on the electrode plane of the ITO glass substrate for 30 seconds;

(2) the ITO glass substrate was left to stand for 10 to 15 minutes;

(3) the ITO glass substrate was heated on a hot plate at 100° C. for 100 seconds to remove the solvent to form a coating, and then;

(4) the ITO glass substrate was heated on the hot plate at 230° C. for 20 minutes to cure the coating to obtain the insulating film having a thickness of 0.9 to 1.5 micrometers.

However, the number of revolutions for spin coating was initially 900 rpm, and finally 1200 rpm.

No alignment film was applied to the substrate.
Preparation of a Polymerizable Composition
Preparation of Polymerizable Composition A Liquid crystal composition (A-1) was prepared by mixing compounds in the proportion described below.

| | | | |
|---|---|---|---|
| 1V2-BEB(F,F)-C | (3-8) | 27% | |
| 2-BEB(F)-C | (3-8) | 3% | |
| 3-BEB(F)-C | (3-8) | 3% | |
| 3-HB(F)-C | (3-1) | 4% | |
| 2-HHB(F)-C | (3-9) | 8% | |
| 3-HHB(F)-C | (3-9) | 8% | |
| 3-HBB(F)-F | (3-16) | 8% | |
| 3-H2BTB-2 | (5-15) | 5% | |
| 3-H2BTB-3 | (5-15) | 5% | |
| 3-H2BTB-4 | (5-15) | 5% | |
| 3-HB(F)TB-2 | (5-16) | 8% | |
| 3-HB(F)TB-3 | (5-16) | 8% | |
| 3-HB(F)TB-4 | (5-16) | 8% | |

NI = 108.2° C.; Tc < −20° C.; Δn = 0.194; Δε = 29.5; Vth = 1.09 V.

Liquid crystal composition (A-1) described above and chiral agent (12-2) were mixed at a weight ratio of 100:1.0, and the resulting mixture was named as liquid crystal composition (A-2). A helical pitch of liquid crystal composition (A-2) was 9.0 micrometers.

Liquid crystal composition (A-2), and tripropylene glycol diacrylate as polymerizable compound (7), and dodecyl acrylate as polymerizable compound (8-1) described below and Irgacure (trade mark) 651 were mixed at a weight ratio of 70:5:25:0.3, and the resulting mixture was named as polymerizable composition A. Irgacure (trade mark) 651 is 2,2-dimethoxy-1,2-diphenylethane-1-one, which is a polymerization initiator.

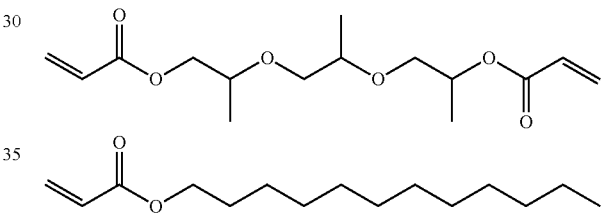

Preparation of Polymerizable Composition B

Liquid crystal composition (B-1) was prepared by mixing compounds in the proportion described below.

| | | |
|---|---|---|
| 5-BB-C | (3-2) | 15% |
| 5-BEB(F,F)-C | (3-8) | 12% |
| 2-BEB(F)-C | (3-8) | 5% |
| 3-BEB(F)-C | (3-8) | 5% |
| 4-BEB(F)-C | (3-8) | 8% |
| 2-HHB(F)-C | (3-9) | 10% |
| 3-HHB(F)-C | (3-9) | 11% |
| 3-BB(F)B(F,F)XB(F,F)-F | (3-41) | 2% |
| 2-BB(F)B-3 | (5-8) | 10% |
| 2-BB(F)B-5 | (5-8) | 9% |
| 3-BB(F)B-5 | (5-8) | 9% |
| 5-HBB(F)B-2 | (5-13) | 2% |
| 5-HBB(F)B-3 | (5-13) | 2% |

NI=89.1° C.; Tc<−20° C.; Δn=0.193; Δε=25.8; Vth=1.01 V.

Liquid crystal composition (B-1) described above, and tripropylene glycol diacrylate as polymerizable compound (7), and isobornyl acrylate as polymerizable compound (8-6) described below and Irgacure (trade mark) 651 were mixed at a weight ratio of 70:8:32:0.3, and the resulting mixture was named as polymerizable composition B. Irgacure (trade mark) 651 is 2,2-dimethoxy-1,2-diphenylethane-1-one, which is a polymerization initiator.

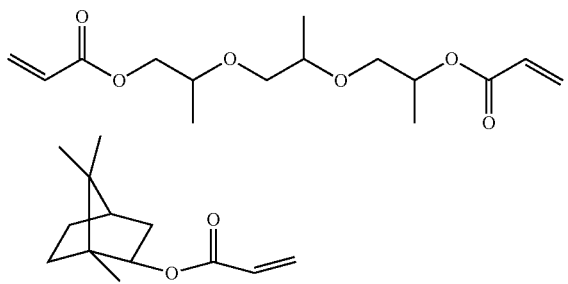

Preparation of Polymerizable Composition C

Liquid crystal composition (C-1) was prepared by mixing compounds in the proportion described below.

| | | |
|---|---|---|
| 5-HB-CL | (3-1) | 12% |
| 3-BB(F)B(F,F)-F | (3-24) | 6% |
| 3-BB(F,F)XB(F,F)-F | (3-28) | 20% |
| 3-BB(F)B(F,F)XB(F,F)-F | (3-41) | 4% |
| 4-BB(F)B(F,F)XB(F,F)-F | (3-41) | 4% |
| 3-BB(F,F)XB(F)B(F,F)-F | (3-42) | 13% |
| 1-BB-3 | (5-3) | 10% |
| V-HHB-1 | (5-5) | 8% |
| 1-BB(F)B-2V | (5-8) | 3% |
| 2-BB(F)B-2V | (5-8) | 4% |
| 3-BB(F)B-2V | (5-8) | 4% |
| 5-HBB(F)B-2 | (5-13) | 2% |
| 5-HBB(F)B-3 | (5-13) | 2% |

NI=79.7° C.; Tc<−20° C.; $\Delta n$=0.179; $\Delta\varepsilon$=13.2.

Liquid crystal composition (C-1) described above and chiral agent (12-6) were mixed at a weight ratio of 100:0.92, and the resulting mixture was named as liquid crystal composition (C-2). A helical pitch of liquid crystal composition (C-2) was 1.0 micrometer.

Liquid crystal composition (C-2) described above, and polymerizable compound (7) described below and Irgacure (trademark) 651 were mixed at a weight ratio of 96:6:0.3, and the resulting mixture was named as polymerizable composition C. Irgacure (trademark) 651 is 2,2-dimethoxy-1,2-diphenylethane-1-one, which is a polymerization initiator. The polymerizable compound described below is a polymer-forming monomer having two acrylate groups, and has a liquid crystal phase.

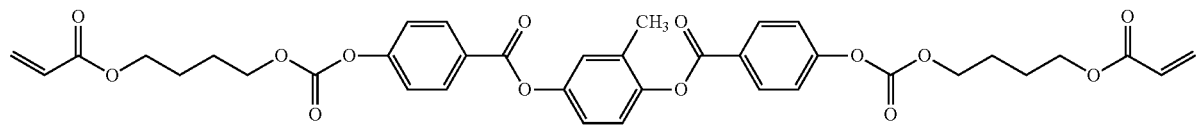 [SMILES: C=CC(=O)OCCCCOC(=O)Oc1ccc(C(=O)Oc2ccc(OC(=O)c3ccc(OC(=O)OCCCCOC(=O)C=C)cc3)c(C)c2)cc1]

Preparation of Polymerizable Composition D

Liquid crystal composition (D-1) was prepared by mixing compounds in the proportion described below.

| | | |
|---|---|---|
| 3-HB(2F,3F)-O2 | (4-1) | 9% |
| 5-HB(2F,3F)-O2 | (4-1) | 7% |
| 2-BB(2F,3F)-O2 | (4-4) | 6% |
| 3-BB(2F,3F)-O2 | (4-4) | 10% |
| 5-BB(2F,3F)-O2 | (4-4) | 10% |
| 3-HDhB(2F,3F)-O2 | (4-16) | 7% |
| 3-HHB(2F,3F)-O2 | (4-6) | 5% |
| V-HHB(2F,3F)-O1 | (4-6) | 3% |
| V-HHB(2F,3F)-O2 | (4-6) | 11% |
| 2-HBB(2F,3F)-O2 | (4-10) | 3% |
| 3-HBB(2F,3F)-O2 | (4-10) | 8% |
| 4-HBB(2F,3F)-O2 | (4-10) | 3% |
| 5-B(F)BB-2 | (5-7) | 9% |
| 5-B(F)BB-3 | (5-7) | 9% |

NI=79.5° C.; Tc<−20° C.; $\Delta n$=0.156; $\Delta\varepsilon$=−5.5.

Liquid crystal composition (D-1), and polymerizable compound (10-1) and vertical alignment agent (14-1) described below and Irgacure (trademark) 651 were mixed at a weight ratio of 94:4:2:0.3. The resulting mixture was named as polymerizable composition D. Irgacure (trademark) 651 is 2,2-dimethoxy-1,2-diphenylethane-1-one, which is a polymerization initiator.

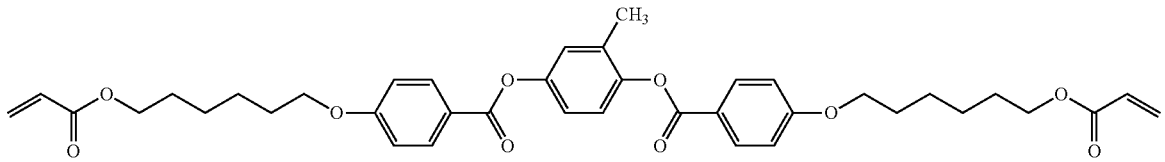

-continued

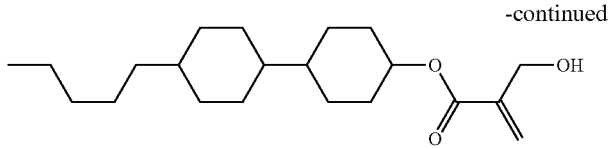

Preparation of a Liquid Crystal Device having a Liquid Crystal Composite

In the invention, a liquid crystal device having a liquid crystal composite was prepared according to a procedure described below. The polymerizable composition was added dropwise onto substrates by using a one-drop-fill (ODF) apparatus to bond the substrates to prepare the device. The device has electrodes on both the first and second substrates. The substrate having no insulating film applied thereon was prepared together with the substrate having no insulating film applied thereon.

(1) The first substrate was placed with an electrode plane thereof upside, and a thermally adhesive spacer having a thickness of 15 micrometers was spread. Density of the spacer was adjusted to be 30 to 50 pillars/mm$^2$. After spreading, the substrate was heated at 150° C. for 6 minutes to adhere the spacer onto a surface of the substrate.

(2) The second substrate was placed with an electrode plane thereof upside, and a UV curing sealant was applied to an outer circumference of the substrate by using a dispenser. Further, the polymerizable composition was added dropwise onto the second substrate uniformly in an amount of one droplet of about 5.7 mg at an interval of about 20 millimeters by using the one-drop-fill (ODF) apparatus. A total amount of the liquid crystal to be added dropwise to the substrate was adjusted to be about 1.7 g in total so as to be 15 micrometers in a thickness of a cell.

(3) Both substrates were bonded and arranged with the first substrate upward and the second substrate downward. Conductive paste such as silver paste was applied to an end portion of an ITO film, and a conductive tape was further attached to each electrode from above, and a lead wire was connected thereto and connected to a driving circuit.

(4) The polymerizable composition between the substrates bonded was irradiated with UV light from an upper part of the substrate by using a UV irradiation machine, in which UV intensity was 1.5 mW/cm$^2$ and an irradiation time was for 600 seconds. In performing UV exposure, the polymerizable compound in the polymerizable composition was polymerized by heating and/or applying voltage according to a material of a mixed solution and a light control mode to prepare the liquid crystal composite.

For voltage application, an electric field application unit and a bipolar power supply were used. As the electric field application unit, Waveform Generator 3320A made by Keysight Technologies was used. As the bipolar power supply, ELECTRONIC INSTRUMENTS 4010 made by NF Corporation was used.

The liquid crystal device was able to be prepared as described above. In the liquid crystal device utilizing light control, cloudiness caused by light scattering and a transparent state caused by alignment of liquid crystals were able to be confirmed by applying no voltage and applying a suitable voltage, respectively.

Evaluation of Arcing of a Liquid Crystal Device (1) An alternating current of a rectangular wave at 60 V was applied between the electrodes of the liquid crystal device for 10 minutes, and the voltage was turned off.

(2) The number of arcing generated in a plane of the liquid crystal device was counted.

Example 1

A device was prepared based on preparation of the liquid crystal device.

Preparation of Liquid Crystal Device PDLC-A1

A substrate having no insulating film and a substrate to which an insulating film was applied were used as a first substrate and a second substrate, respectively. According to the preparation method described above, polymerizable composition A was added dropwise thereto to bond both the substrates. When polymerizable composition A was polymerized by irradiation with UV light, the composition was irradiated with light having a wavelength of 365 nanometers with 1.5 mWcm$^{-2}$ for 600 seconds in a state of applying a rectangular wave of 100 Hz at a voltage of 60 V between electrodes to prepare a liquid crystal device having a liquid crystal composite in a liquid crystal layer. The thus prepared liquid crystal device was named as PDLC-A1. The rectangular wave at a voltage of 60 V was applied to the device. The device was cloudy during no current flow, but the device was turned transparent during current flow. The results show that the device has a normal mode.

As described above, 14 sheets of liquid crystal device PDLC-A1 in which the insulating film was applied to only one substrate were prepared. The number of arcing generation after the rectangular waves of 100 Hz at a voltage of 60 V was applied to each liquid crystal device PDLC-A1 for 10 minutes was 0 to 4.

Preparation of Liquid Crystal Device PDLC-A2

Substrates in which the insulating films were applied to the first and the second substrate were used. According to the preparation method, polymerizable composition A was added dropwise thereto to bond both the substrates to prepare a liquid crystal device having a liquid crystal composite under the above-described conditions. The thus prepared liquid crystal device was named as PDLC-A2.

As described above, two sheets of liquid crystal device PDLC-A2 having the insulating films on both the substrates were prepared. The number of arcing generation after rectangular waves of 100 Hz at a voltage of 60 V was applied to each liquid crystal device PDLC-A2 for 10 minutes was 0 or 1.

Comparative Example 1

As Comparative Example, a liquid crystal device in which no insulating film was applied to both a first substrate and a second substrate was prepared. According to the preparation method described above, polymerizable composition A was added dropwise thereon to bond both the substrates to prepare a liquid crystal device having a liquid crystal composite under the above-described conditions. The thus prepared liquid crystal device was named as PDLC-AO.

As described above, 14 sheets of liquid crystal device PDLC-AO having no insulating film on both the substrates were prepared. The number of arcing generation after a rectangular wave of 100 Hz at a voltage of 60 V was applied to each liquid crystal device PDLC-AO for 10 minutes was as large as 15 or more in all devices. In the device in which the number is large, 65 faults having an arcing size of about 2 to about 20 millimeters were observed. Arcing was also observed even during polymerization by irradiation with UV light while applying the rectangular wave at a voltage of 60 V.

The results of arcing generation in liquid crystal device PDLC-A in Example 1 and Comparative Example 1 are shown in Table 3 below.

TABLE 3

Results of arcing generation of liquid crystal device utilizing light control

| | Application state of insulating film of substrate | | |
|---|---|---|---|
| | PDLC-A2<br>Example 1 | PDLC-A1 | PDLC-A0<br>Comparative Example 1 |
| | Both surfaces | One surface | No application |
| State of arcing generation (number) | 0 to 1 | 0 to 4 | 15 or more |

Example 2

Preparation of Liquid Crystal Device PDLC-B1

A substrate having no insulating film and a substrate to which an insulating film was applied were used as a first substrate and a second substrate, respectively. According to the preparation method described above, polymerizable composition B was added dropwise thereon to bond both the substrates. When polymerizable composition B was polymerized by irradiation with UV light, the composition was irradiated with light having a wavelength of 365 nanometers with 1.5 mWcm$^{-2}$ for 600 seconds in a state of applying no voltage between electrodes to prepare a liquid crystal device having a liquid crystal composite in a liquid crystal layer. The thus prepared liquid crystal device was named as PDLC-B1. A rectangular wave of 60 Hz at a voltage of 40 V was applied to the device. The device was cloudy during no current flow, but the device turned transparent during current flow. The results show that the device has a normal mode.

As described above, one sheet of liquid crystal device PDLC-B1 having a transparent insulating film only on one substrate was prepared. The number of arcing generation after a rectangular wave of 60 Hz at a voltage of 60 V was applied to liquid crystal device PDLC-B1 for 10 minutes was 1.

Comparative Example 2

As Comparative Example, a liquid crystal device in which no insulating film was applied to both a first substrate and a second substrate was prepared. According to the preparation method in Example 2, polymerizable composition B was added dropwise thereon to bond both the substrates to prepare a liquid crystal device having a liquid crystal composite under the above-described conditions. The thus prepared liquid crystal device was named as PDLC-B0.

As described above, one sheet of liquid crystal device PDLC-B0 having no transparent insulating film on both the substrates was prepared. The number of arcing generation after a rectangular wave of 60 Hz at a voltage of 60 V was applied to liquid crystal device PDLC-B0 for 10 minutes was as large as 25.

Example 3

Preparation of Liquid Crystal Device PDLC-C1

A substrate having no insulating film and a substrate to which an insulating film was applied were used as a first substrate and a second substrate, respectively. According to the preparation method described above, polymerizable composition C was added dropwise thereon to bond both substrates.

When polymerizable composition C was polymerized by irradiation with UV light, the composition was irradiated with light having a wavelength of 365 nanometers with 1.5 mWcm$^{-2}$ for 600 seconds in a state of applying rectangular waves of 60 Hz at a voltage of 40 V between electrodes to prepare a liquid crystal device having a liquid crystal composite in a liquid crystal layer. The thus prepared liquid crystal device was named as PDLC-C1. A rectangular wave of 60 Hz at a voltage of 40 V was applied to the device. The device was cloudy during no current flow, but the device turned transparent during current flow. The results show that the device has a normal mode.

As described above, two sheets of liquid crystal device PDLC-C1 having a transparent insulating film only on one substrate was prepared. The number of arcing generation after a rectangular wave of 60 Hz at a voltage of 60 V was applied to each liquid crystal device PDLC-C1 for 10 minutes was 0 or 1.

Comparative Example 3

As Comparative Example, a liquid crystal device in which no insulating film was applied to both a first substrate and a second substrate was prepared. According to the preparation method in Example 3, polymerizable composition C was added dropwise thereon to bond both the substrates to prepare a liquid crystal device having a liquid crystal composite under the above-described conditions. The thus prepared liquid crystal device was named as PDLC-C0.

As described above, one piece of liquid crystal device PDLC-C0 having no transparent insulating film on both the substrates was prepared. The number of arcing generation after a rectangular wave of 60 Hz at a voltage of 60 V was applied to liquid crystal device PDLC-C0 for 10 minutes was 12.

Example 4

Preparation of Liquid Crystal Device PDLC-D1

A substrate having no insulating film and a substrate to which an insulating film was applied were used as a first substrate and a second substrate, respectively. No alignment treatment was applied to both substrates. According to the preparation method described above, polymerizable composition D was added dropwise thereon to bond both the substrates.

The device was heated until polymerizable composition D was formed into an isotropic phase, and then cooled to room temperature. On the occasion, a liquid crystal layer within the device was confirmed to be aligned perpendicularly to the substrate by phase observation using a polarizing microscope.

When polymerizable composition D was polymerized by irradiation with UV light, the composition was irradiated with light having a wavelength of 365 nanometers with 1.5 mWcm$^{-2}$ for 600 seconds from a side of the first substrate in a state of applying no voltage between the electrodes to prepare a liquid crystal device having a liquid crystal composite in a liquid crystal layer. After a polymerization reaction, the liquid crystal layer between glass substrates was confirmed to maintain a nematic liquid crystal phase and be aligned perpendicularly to the substrate. The thus prepared liquid crystal device was named as PDLC-D1.

A rectangular wave of 60 Hz at a voltage of 20 V was applied to the device. The device was transparent during no voltage application, but the device turned cloudy during voltage application. The results show that the device has a reverse mode.

As described above, one sheet of liquid crystal device PDLC-D1 having a transparent insulating film only on one substrate was prepared. The number of arcing generation after a rectangular wave of 60 Hz at a voltage of 60 V was applied to liquid crystal device PDLC-D1 for 10 minutes was 0.

Comparative Example 4

As Comparative Example, a liquid crystal device in which neither alignment treatment nor an insulating film was applied to both substrates was prepared. According to the preparation method in Example 4, polymerizable composition D was added dropwise thereon to bond both the substrates to prepare a liquid crystal device having a liquid crystal composite under the above-described conditions. The thus prepared liquid crystal device was named as PDLC-D0.

As described above, one sheet of liquid crystal device PDLC-D0 in which both the substrates had no transparent insulating film was prepared. The number of arcing generation after a rectangular wave of 60 Hz at a voltage of 60 V was applied to liquid crystal device PDLC-D1 for 10 minutes was 16.

With regard to an effect of applying the insulating film on one substrate, the results of arcing generation in Example 1 to Example 4 and Comparative Example 1 to Comparative Example 4 are shown in Table 4 below.

TABLE 4

Results of arcing generation of liquid crystal device utilizing light control (2)

| | | Application state of insulating film on substrate | |
|---|---|---|---|
| | | One surface | No application |
| State of arcing generation (number) | Example 1 Comparative Example 1 | 0 to 4 | 15 or more |
| | Example 2 Comparative Example 2 | 1 | 25 |
| | Example 3 Comparative Example 3 | 0 to 1 | 12 |
| | Example 4 Comparative Example 4 | 0 | 16 |

Examples show that the liquid crystal device according to the first to nineteenth aspects of the invention can prevent destruction of the liquid crystal device caused by arcing.

Examples show that the liquid crystal device according to the twentieth to twenty first aspects of the invention can prevent destruction of the liquid crystal device caused by arcing.

Examples show that the liquid crystal device produced according to the twenty second to twenty seventh aspects can prevent destruction of the liquid crystal device caused by arcing.

What is claimed is:
1. A liquid crystal device, comprising:
a liquid crystal layer,
a first substrate,
a second substrate,
an insulating film, and
no alignment films, wherein:
the liquid crystal layer is arranged between the first substrate and the second substrate,
the first substrate includes electrode 1,
the second substrate includes electrode 2,
the insulating film is arranged between electrode 1 and electrode 2, adjacent to and in contact with the liquid crystal layer and at least one of electrode 1 and electrode 2,
the liquid crystal layer contains a polymer-network structure, a polymer-dispersed structure, or a mixture of both, and
the insulating film has no alignment control properties and is a cured product of a thermosetting polymer composition, wherein:
the thermosetting polymer composition is a composition containing polyester amide acid, an epoxy compound, an epoxy curing agent and a solvent,
the polyester amide acid is obtained by allowing a mixture of tetracarboxylic dianhydride, diamine and a polyhydroxy compound to react,
the thermosetting polymer composition satisfies expressions: 1.0<Z/Y<5.0 and 0.6<(Y+Z)/X<2.0, in which X represents a molar concentration of the tetracarboxylic dianhydride, Y represents a molar concentration of the diamine and Z represents a molar concentration of the polyhydroxy compound,
the epoxy compound is contained in 20 to 400 parts by weight based on 100 parts by weight of the polyester amide acid, and
the insulating film is obtained by (a) applying the thermosetting polymer composition to either one of the first substrate or the second substrate, and (b) heating the resulting material.
2. The liquid crystal device according to claim 1, wherein the insulating film is in contact with electrode 1.
3. The liquid crystal device according to claim 2, wherein the insulating film is also in contact with electrode 2.
4. The liquid crystal device according to claim 1, wherein the polyester amide acid comprises a compound having a constitutional unit represented by formula (1) or (2) in the thermosetting polymer composition:

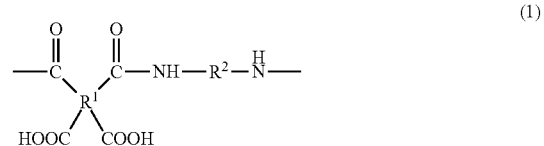

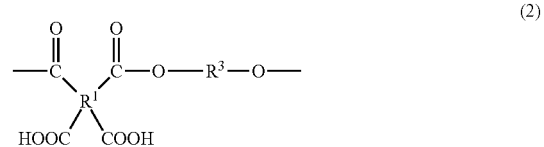

wherein, in formulas (1) and (2), $R^1$ is a residue obtained by eliminating two pieces of —CO—O—CO— from the tetracarboxylic dianhydride, and in formula (1), $R^2$ is a residue obtained by eliminating two pieces of —NH$_2$ from the diamine, and in formula (2), $R^3$ is a residue obtained by eliminating two pieces of —OH from the polyhydroxy compound.

5. The liquid crystal device according to claim 4, wherein the tetracarboxylic dianhydride is one or more kinds of compounds selected from 3,3',4,4'-diphenyl ether tetracarboxylic dianhydride, 3,3',4,4'-diphenylsulfone tetracarboxylic dianhydride and 1,2,3,4-butanetetracarboxylic dianhydride.

6. The liquid crystal device according to claim 4, wherein the diamine is one or more kinds of compounds selected from 3,3'-diaminodiphenyl sulfone and bis(4-(3-aminophenoxy)phenylsulfone.

7. The liquid crystal device according to claim 4, wherein the polyhydroxy compound is one or more kinds of compounds selected from diethylene glycol, triethylene glycol, 1,4-butanediol, 1,5-pentanediol, 1,6-hexanediol, 2-hydroxybenzyl alcohol, 4-hydroxybenzyl alcohol, 4,4'-isopropylidene bis(2-phenoxyethanol), 2-(4-hydroxyphenyl)ethanol, a (meth)acrylic acid-modified product of ethylene glycol diglycidyl ether, a (meth)acrylic acid-modified product of propylene glycol diglycidyl ether, a (meth)acrylic acid-modified product of tripropylene glycol diglycidyl ether, a (meth)acrylic acid-modified product of glycerol diglycidyl ether, a (meth)acrylic acid-modified product of bisphenol A diglycidyl ether and a (meth)acrylic acid-modified product of propylene oxide-modified bisphenol A diglycidyl ether.

8. The liquid crystal device according to claim 1, wherein the liquid crystal layer includes compound (3) represented by formula (3), and is positive in dielectric anisotropy:

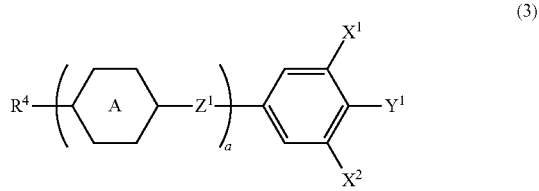

wherein, in formula (3),
ring A is 1,4-cyclohexylene, 1,4-phenylene, 2-fluoro-1,4-phenylene, 2,3-difluoro-1,4-phenylene, 2,6-difluoro-1,4-phenylene, pyrimidine-2,5-diyl, 1,3-dioxane-2,5-diyl or tetrahydropyran-2,5-diyl,
$Z^1$ is a single bond, ethylene, carbonyloxy or difluoromethyleneoxy,
$R^4$ is alkyl having 1 to 12 carbons, alkoxy having 1 to 12 carbons or alkenyl having 2 to 12 carbons,
$X^1$ and $X^2$ are independently hydrogen or fluorine,
$Y^1$ is fluorine, chlorine, cyano, alkyl having 1 to 12 carbons in which at least one hydrogen is replaced by fluorine or chlorine, alkoxy having 1 to 12 carbons in which at least one hydrogen is replaced by fluorine or chlorine, or alkenyloxy having 2 to 12 carbons in which at least one hydrogen is replaced by fluorine or chlorine, and
a is 1, 2, 3 or 4.

9. The liquid crystal device according to claim 1, wherein the liquid crystal layer includes compound (4) represented by formula (4), and is negative in dielectric anisotropy:

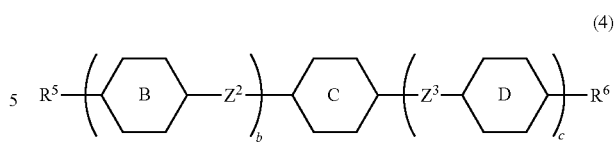

wherein, in formula (4),
ring B and ring D are independently 1,4-cyclohexylene, 1,4-cyclohexenylene, tetrahydropyran-2,5-diyl, 1,4-phenylene, 1,4-phenylene in which at least one hydrogen is replaced by fluorine or chlorine, naphthalene-2,6-diyl, naphthalene-2,6-diyl in which at least one hydrogen is replaced by fluorine or chlorine, chroman-2,6-diyl, or chroman-2,6-diyl in which at least one hydrogen is replaced by fluorine or chlorine,
ring C is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl,
$Z^2$ and $Z^3$ are independently a single bond, ethylene, carbonyloxy or methyleneoxy,
$R^5$ and $R^6$ are independently alkyl having 1 to 12 carbons, alkoxy having 1 to 12 carbons or alkenyl having 2 to 12 carbons,
b is 1, 2 or 3,
c is 0 or 1, and
a sum of b and c is 3 or less.

10. The liquid crystal device according to claim 1, wherein the liquid crystal layer includes compound (5) represented by formula (5):

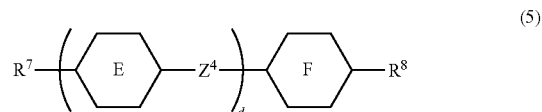

wherein, in formula (5),
ring E and ring F are independently 1,4-cyclohexylene, 1,4-phenylene, 2-fluoro-1,4-phenylene, 2,5-difluoro-1,4-phenylene or pyrimidine-2,5-diyl,
$Z^4$ is a single bond, ethylene or carbonyloxy,
$R^7$ and $R^8$ are independently alkyl having 1 to 12 carbons, alkoxy having 1 to 12 carbons, alkenyl having 2 to 12 carbons, or alkenyl having 2 to 12 carbons in which at least one hydrogen is replaced by fluorine or chlorine, and
d is 1, 2 or 3.

11. The liquid crystal device according to claim 1, wherein the liquid crystal layer includes
a liquid crystal composition, and
a polymer obtained by polymerizing a composition containing compound (6) represented by formula (6):

wherein, in formula (6),
$Z^5$ is alkylene having 1 to 80 carbons, and in the alkylene, at least one hydrogen may be replaced by alkyl having 1 to 5 carbons, fluorine, chlorine or $P^3$, and at least one piece of —CH$_2$— may be replaced by —O—, —CO—, —COO—, —OCO—, —NH—, —N(R$^9$)—, —CH=CH—, —C≡C— or a divalent group having 5 to 35 carbons obtained by eliminating hydrogen from monocyclic hydrocarbon, fused polycyclic hydrocarbon, a heteromonocyclic compound or a fused heterocyclic compound, and in the divalent group, at least one hydrogen may be replaced by $R^9$ or $P^3$, $R^9$ is alkyl having 1 to 12 carbons, and in the alkyl, at least one piece of —$CH_2$— may be replaced by —O—, —CO—, —COO— or —OCO—, and in the alkyl, at least one piece of —$CH_2$— may be replaced by —O—, —CO—, —COO— or —OCO—, $P^1$, $P^2$ and $P^3$ are independently a polymerizable group, hydrogen, fluorine, chlorine, trifluoromethyl, trifluoromethoxy, cyano, alkyl having 1 to 20 carbons or alkenyl having 2 to 20 carbons, and in the alkyl and the alkenyl, at least one hydrogen may be replaced by fluorine or chlorine, and at least one piece of —$CH_2$— may be replaced by —O—, —CO—, —COO— or —OCO—, and at least one hydrogen may be replaced by alkyl having 1 to 12 carbons, and in the alkyl, at least one piece of —$CH_2$— may be replaced by —O—, —CO—, —COO— or —OCO—, and at least one of $P^1$ and $P^2$ is a polymerizable group.

12. The liquid crystal device according to claim 11, wherein $P^1$, $P^2$ and $P^3$ are independently any one of formula (P-1) to formula (P-6):

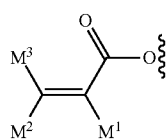
(P-1)

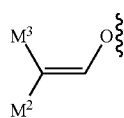
(P-2)

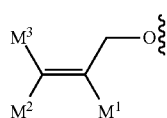
(P-3)

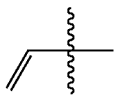
(P-4)

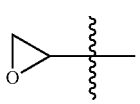
(P-5)

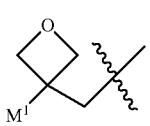
(P-6)

wherein, in formula (P-1) to formula (P-6), $M^1$, $M^2$ and $M^3$ are independently hydrogen, fluorine, alkyl having 1 to 5 carbons, or alkyl having 1 to 5 carbons in which at least one hydrogen is replaced by fluorine or chlorine.

13. The liquid crystal device according to claim 1, wherein the thermosetting polymer composition contains a photopolymerization initiator.

14. The liquid crystal device according to claim 1, wherein the liquid crystal layer includes a liquid crystal light control layer, and is cloudy during no current flow.

15. The liquid crystal device according to claim 1, wherein the liquid crystal layer includes a liquid crystal light control layer, and is cloudy during current flow.

16. The liquid crystal device according to claim 1, wherein the first substrate is a glass plate, an acrylic plate or a plastic film, and the second substrate is a glass plate, an acrylic plate or a plastic film.

17. A light control window, comprising the liquid crystal device according to claim 1.

18. A liquid crystal display apparatus, comprising the liquid crystal device according to claim 1, and a light source apparatus.

\* \* \* \* \*